(12) United States Patent
Mase

(10) Patent No.: US 9,679,221 B2
(45) Date of Patent: Jun. 13, 2017

(54) OBJECT IDENTIFICATION APPARATUS, OBJECT IDENTIFICATION METHOD, AND PROGRAM

(71) Applicant: NEC Corporation, Tokyo (JP)

(72) Inventor: Ryota Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 14/422,842

(22) PCT Filed: May 21, 2013

(86) PCT No.: PCT/JP2013/063995
§ 371 (c)(1),
(2) Date: Feb. 20, 2015

(87) PCT Pub. No.: WO2014/030400
PCT Pub. Date: Feb. 27, 2014

(65) Prior Publication Data
US 2015/0220810 A1    Aug. 6, 2015

(30) Foreign Application Priority Data

Aug. 23, 2012    (JP) .................................. 2012-184534

(51) Int. Cl.
*G06K 9/46*    (2006.01)
*G06K 9/62*    (2006.01)
(Continued)

(52) U.S. Cl.
CPC ............. *G06K 9/6202* (2013.01); *G06K 9/46* (2013.01); *G06K 9/52* (2013.01); *G06K 9/6211* (2013.01);
(Continued)

(58) Field of Classification Search
None
See application file for complete search history.

(56) References Cited

U.S. PATENT DOCUMENTS

| 6,711,293 B1 | 3/2004 | Lowe |
| 2008/0013836 A1 | 1/2008 | Nakamura et al. |

(Continued)

FOREIGN PATENT DOCUMENTS

| CN | 1620099 A | 5/2005 |
| CN | 101561874 A | 10/2009 |

(Continued)

OTHER PUBLICATIONS

Taiwan Office Action corresponding to Taiwanese Application No. 102129837, dated Mar. 23, 2015, 5 pages.

(Continued)

*Primary Examiner* — Fred Hu
(74) *Attorney, Agent, or Firm* — Wilmer Cutler Pickering Hale and Dorr LLP

(57) ABSTRACT

An input image showing a same object as an object shown in a reference image is identified more accurately. A difference area in the input image is determined by converting a difference area in the reference image, on a basis of geometric transformation information calculated by an analysis using a local descriptor. By matching a descriptor extracted from the difference area in the input image with the difference area in the reference image, fine differences that cannot be identified by conventional matching using only a local descriptor can be distinguished and images showing a same object can be exclusively identified.

9 Claims, 45 Drawing Sheets

(51) Int. Cl.
  *G06K 9/52* (2006.01)
  *G06T 3/00* (2006.01)
  *G06T 5/00* (2006.01)

(52) U.S. Cl.
  CPC ............... *G06T 3/00* (2013.01); *G06T 5/006* (2013.01); *G06K 9/4671* (2013.01); *G06K 2009/4666* (2013.01); *G06K 2009/6213* (2013.01)

(56) References Cited

U.S. PATENT DOCUMENTS

| | | | |
|---|---|---|---|
| 2009/0141984 A1 | 6/2009 | Nakamura et al. | |
| 2010/0290708 A1* | 11/2010 | Magai .................. | G06K 9/6211 382/195 |
| 2013/0121535 A1 | 5/2013 | Matsukawa | |
| 2015/0213328 A1 | 7/2015 | Mase | |

FOREIGN PATENT DOCUMENTS

| | | |
|---|---|---|
| CN | 101571698 A | 11/2009 |
| CN | 102388392 A | 3/2012 |
| EP | 2889835 A1 | 7/2015 |
| JP | 2009-116385 A | 5/2009 |
| JP | 2010-079545 A | 4/2010 |
| JP | 2010-266964 A | 11/2010 |
| JP | 2011-113197 A | 6/2011 |
| JP | 2011113197 A * | 6/2011 |
| JP | 2012-033022 A | 2/2012 |
| TW | 200744020 A | 12/2007 |
| TW | 201123027 A | 7/2011 |
| WO | WO-2012-014403 A1 | 2/2012 |

OTHER PUBLICATIONS

International Search Report corresponding to PCT/JP2013/063995, dated Jul. 2, 2013 (5 pages).
David G. Lowe, "Distinctive Image Features from Scale-Invariant Keypoints," International Journal of Computer Vision, 60(2), 2004, pp. 91-110.
Kyota Higa, et al., "Multiple Object Detection Using Local Descriptor Clustering Based on Keypoint Locations," FIT 2012, The 11th Forum on Information Technology, vol. 3, Aug. 21, 2012, pp. 129-130, English translation pp. 1-7.
Chinese Office Action issued by The Patent Office of the People's Republic of China for Application No. 2013800438645 dated Jul. 6, 2016 (22 pages).
Extended European Search Report issued by the European Patent Office for Application No. 13830883.8 dated Sep. 12, 2016 (8 pages).

* cited by examiner

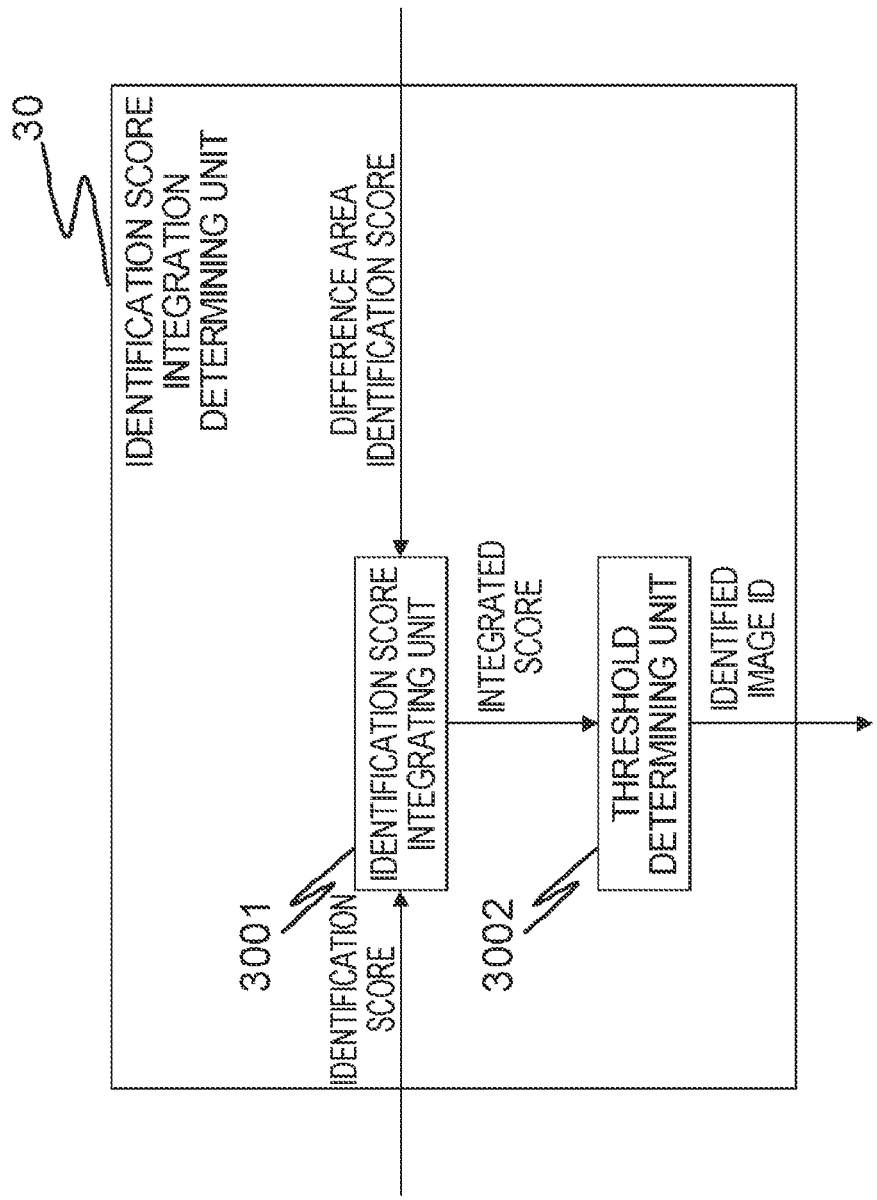

OBJECT IDENTIFICATION APPARATUS, OBJECT IDENTIFICATION METHOD, AND PROGRAM

CROSS-REFERENCE TO RELATED APPLICATIONS

This application is a national stage application of International Application No. PCT/JP2013/063995 entitled "Object Identification Apparatus, Object Identification Method, and Program," filed on May 21, 2013, which claims the benefit of the priority of Japanese patent application No. 2012-184534, filed on Aug. 23, 2012, the disclosures of each of which are hereby incorporated by reference in their entirety.

BACKGROUND

The present invention relates to an apparatus, a method, and a program for accurately identifying an object in an image.

To enable robust identification of a subject in an image with respect to variations in photographed size and angle and to occlusion, systems are proposed which detect a large number of characteristic points (feature points) in the image and which extract a descriptor of a local area (a local descriptor) around each feature point. As representative systems thereof, Patent Document 1 and Non-Patent Document 1 disclose local descriptor extraction apparatuses that use a SIFT (Scale Invariant Feature Transform) descriptor.

Conventionally, with a local descriptor extraction apparatus, information related to brightness is first exclusively extracted from each pixel in an image, a large number of characteristic points (feature points) are detected from the extracted brightness information, and feature point information that is information related to each feature point is outputted. In this case, feature point information indicates, for example, a coordinate position or a scale of a detected local feature point or an orientation of a feature point. Subsequently, a local area from which descriptor extraction is to be performed is acquired from the feature point information that is a coordinate position, a scale, an orientation, or the like of each detected feature point to generate (describe) a local descriptor.

For example, as described in Non-Patent Document 1, in order to identify an image showing a same subject as a subject in a photographed image, a local descriptor 1 extracted from the photographed image or, in other words, an input image is compared with a local descriptor 2 generated from a reference image. Specifically, distance calculations on a feature space are performed on all combinations of respective descriptors of areas in a vicinity of feature points constituting the local descriptor 1 and respective descriptors of areas in a vicinity of feature points constituting the local descriptor 2. A nearest descriptor is determined as a corresponding descriptor. The corresponding descriptor is determined so as to also correspond to a feature point that is a source of descriptor generation. Subsequently, regarding a combination of feature points determined to be corresponding feature points, whether the corresponding feature points are correct or erroneous is determined based on whether or not coordinate positions resulting from moving coordinate positions of the feature points in the input image in accordance with a specific geometric transformation are consistent with coordinate positions of the feature points in the reference image. When the number of feature points determined to be correctly corresponding feature points is equal to or larger than a prescribed value, it is determined that a same subject is shown (in other words, the subject in the input image and the subject in the reference image are consistent with each other).

Patent Document 1: U.S. Pat. No. 6,711,293
Patent Document 2: Patent Publication JP2010-79545A
Non-Patent Document 1: David G. Lowe, "Distinctive image features from scale-invariant keypoints", USA, International Journal of Computer Vision, 60 (2), 2004, pages. 91-110

Conventional object identification systems that utilize local descriptors identify an object based on a correspondence relationship between a local descriptor extracted from brightness information of an input image and a local descriptor extracted from brightness information of a reference image. With such an identification method, when an object shown in the input image and an object shown in the reference image differ from each other but the difference between the two objects is minute, there is a problem that the images are erroneously identified to show a same object due to the existence of a large number of corresponding feature points.

SUMMARY

The present invention has been made in consideration of the problem described above and an object thereof is to provide a technique for more accurately identifying an image showing a same object as an object shown in another image.

An object identification apparatus according to the present invention includes: a local descriptor matching unit for determining whether or not respective descriptors of feature points extracted from an input image and respective descriptors of feature points extracted from a reference image correctly correspond to one another; an input image difference area descriptor extracting unit for extracting a descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly by the local descriptor matching unit is equal to or larger than a prescribed value; and a descriptor matching unit for matching the descriptor extracted by the input image difference area descriptor extracting unit with a descriptor extracted from the prescribed area of the reference image, and for outputting a matching result.

An object identification method according to the present invention includes: a local descriptor matching step of determining whether or not respective descriptors of feature points extracted from an input image and respective descriptors of feature points extracted from a reference image correctly correspond to one another; an input image difference area descriptor extracting step of extracting a descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly in the determining step is equal to or larger than a prescribed value; and a descriptor matching step of matching the descriptor extracted in the extracting step with a descriptor extracted from the prescribed area of the reference image, and outputting a matching result.

A program according to the present invention causes a computer to function as: a local descriptor matching unit for determining whether or not respective descriptors of feature points extracted from an input image and respective descriptors of feature points extracted from a reference image correctly correspond to one another; input image difference area descriptor extracting for extracting a descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly by the local descriptor matching unit is equal to or larger than a prescribed value; and a descriptor matching unit for matching the descriptor extracted by the input image difference area descriptor extracting unit with a descriptor extracted from the prescribed area of the reference image, and for outputting a matching result.

According to the present invention, a technique for more accurately identifying an image showing a same object as an object shown in another image can be provided.

DESCRIPTION OF DRAWINGS

FIG. 45 is a block diagram representing a configuration example of an identification score integration determining unit 30.

DETAILED DESCRIPTION

First Embodiment

A first embodiment of the present invention will be described with reference to the drawings.

Figure 1:
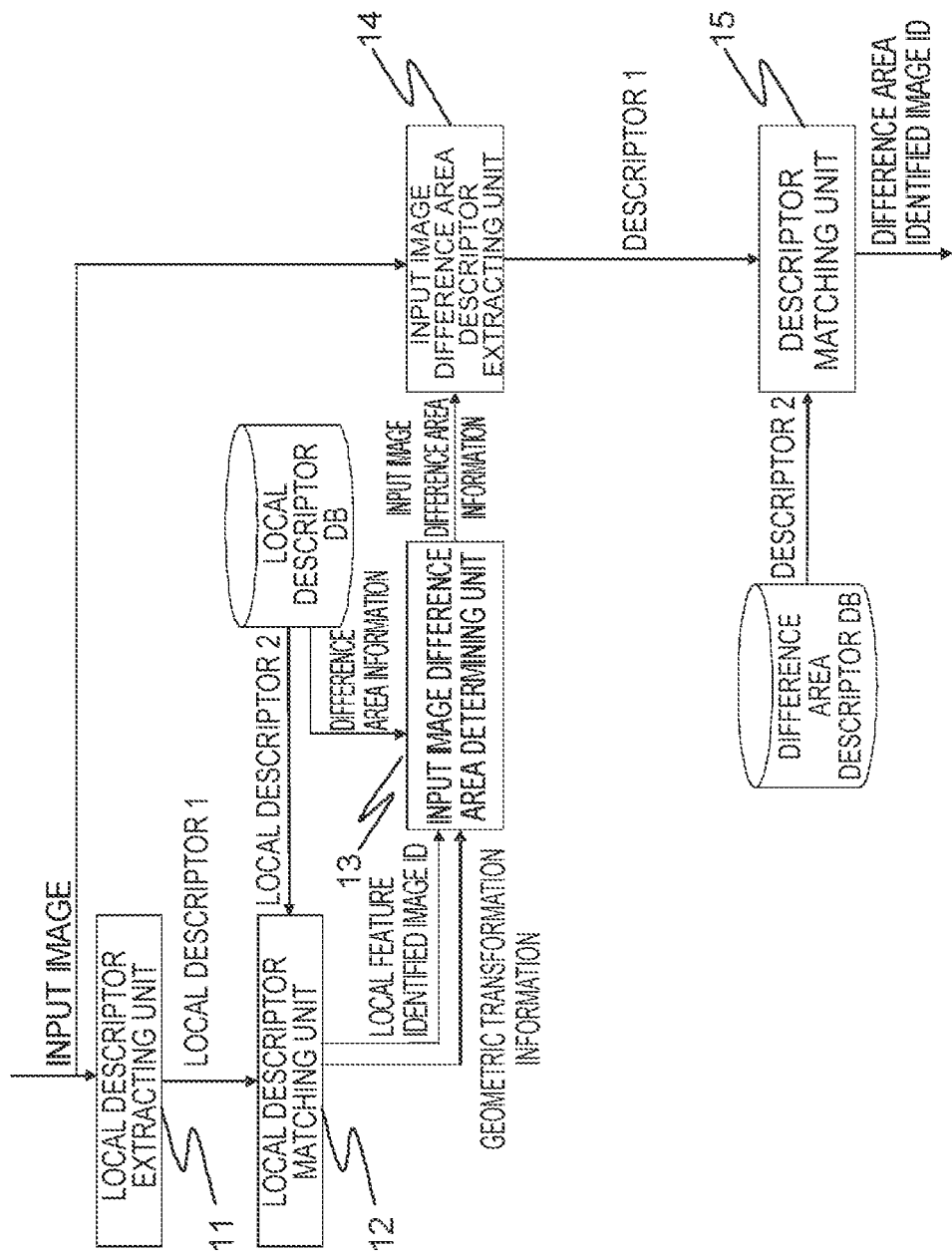
FIG. 1 is a block diagram representing a configuration example of an object identification apparatus according to a first embodiment.

FIG. 1 is a block diagram showing a configuration of an object identification apparatus according to the first embodiment. The object identification apparatus includes a local descriptor extracting unit 11, a local descriptor matching unit 12, an input image difference area determining unit 13, an input image difference area descriptor extracting unit 14, and a descriptor matching unit 15. For example, the object identification apparatus can be configured using an information processing apparatus such as a personal computer or a mobile information terminal. In addition, functions of respective units that constitute the object identification apparatus are realized by having, for example, a processor expand a program stored in a storage area onto a memory and execute the program. Moreover, components of other embodiments to be described later can be realized in a similar manner.

The local descriptor extracting unit 11 detects a feature point from an input image and extracts a descriptor of the detected feature point and a local area that is an area near the feature point as a local descriptor. Details of a process performed by the local descriptor extracting unit 11 will be described later.

The local descriptor matching unit 12 matches a local descriptor 1 extracted from the input image by the local descriptor extracting unit 11 and a local descriptor 2 extracted from a reference image with each other and identifies a corresponding local descriptor. Details of a method for identifying a corresponding local descriptor will be described later with reference to FIG. 4. The local descriptor matching unit 12 identifies a corresponding local area between the input image and the reference image in accordance with a position at which a local area to which the local descriptor corresponds is geometrically converted. For example, when a coordinate position of a local area in the input image after being rotationally moved by a prescribed angle around a center of the image is consistent with a coordinate position of a local area to which the local descriptor corresponds in the reference image, the local areas with consistent coordinate positions in the input image and the reference image are identified as corresponding local areas. In other words, the geometric transformation described above is performed so as to correct a geometric deviation between the reference image and the input image. In addition, when a corresponding local area is identified, the local descriptor matching unit 12 outputs information on the used geometric transformation (geometric transformation information) and a local feature identified image ID that is an image ID of the reference image to which the local area is determined to correspond.

The local descriptor 2 extracted from the reference image may be extracted from a plurality of reference images in advance and stored in a database such as a local descriptor DB shown in FIG. 1 or may be extracted on the fly from the reference image using the local descriptor extracting unit 11. When storing local descriptors in a database, local descriptors extracted from reference images including similar objects (showing similar objects as subjects) may be registered in association with each other. Details of the local descriptor matching unit 12 will be described later.

The input image difference area determining unit 13 performs a geometric transformation indicated by the geometric transformation information outputted from the local descriptor matching unit 12 on a reference image corresponding to the local feature identified image ID outputted from the local descriptor matching unit 12 or on a difference area of a reference image group associated with the local feature identified image ID and outputs input image difference area information.

In the present embodiment, when it is predicted that a slight difference may occur between an object shown in the input image and an object shown in the reference image, a difference area of the reference image refers to an area showing a portion in the reference image where the difference may occur. For example, when a difference area of the reference image is rectangular, information on the difference area may be coordinate value information of four corners of the rectangle. Alternatively, information on the difference area of the reference image may be information representing coordinate values of a pixel group in a reference image that constitutes the difference area.

As the input image difference area information, a coordinate value in an input image obtained by respectively performing a geometric transformation on coordinate values of four corners of a difference area in the reference image may be adopted. Alternatively, when information on a difference area in the reference image is coordinate value information of a pixel group constituting the difference area, a geometric transformation corresponding to the geometric transformation information can be performed on each pixel in the pixel group and coordinate value information of a pixel group constituting a difference area in the input image can be adopted as input image difference area information.

Difference area information of the reference image is stored in a database in advance. For example, when the local descriptor 2 is stored in a database such as the local descriptor DB shown in FIG. 1, the difference area information of the reference image may be stored in the local descriptor DB together with the local descriptor 2.

The input image difference area descriptor extracting unit 14 extracts a descriptor from an area in an input image (difference area in the input image) indicated by the input image difference area information outputted from the input image difference area determining unit 13. Details of the input image difference area descriptor extracting unit 14 will be described later.

The descriptor matching unit 15 matches a descriptor 1 extracted from the difference area in the input image by the input image difference area descriptor extracting unit 14 with a descriptor 2 extracted from the difference area in the reference image and outputs a matching result. In the matching, the descriptor matching unit 15 determines whether an object included in the input image and an object included in the reference image are the same (whether the input image and the reference image show a same object as a subject). When the objects are determined to be the same, the descriptor matching unit 15 outputs an image ID of the input image determined to be the same as a difference area identified image ID.

The local descriptor 2 may be extracted from a plurality of reference images in advance and stored in a database as shown in FIG. 1 or may be extracted on the fly from a reference image. When storing the local descriptor 2 in a database, a similar object may be associated and registered with the local descriptor 2. Details of the descriptor matching unit 15 will be described later.

Figure 2:
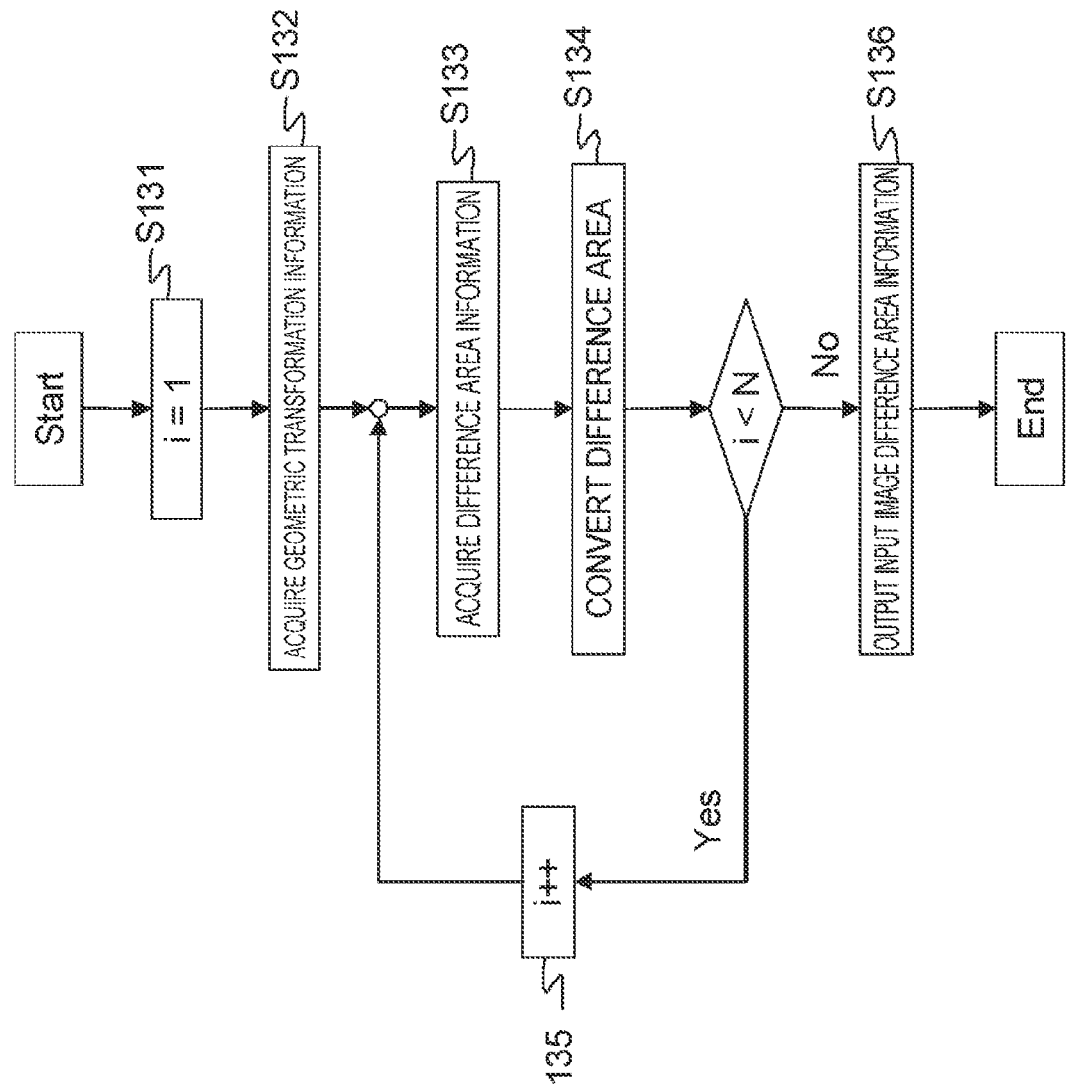
FIG. 2 is a flow chart showing an operation example of an input image difference area determining unit 13.

FIG. 2 is a flow chart showing a flow of processes by the input image difference area determining unit 13 shown in FIG. 1. As shown in FIG. 2, first, a variable i for controlling the processes is initialized in S131.

In S132, geometric transformation information outputted from the local descriptor matching unit 12 is acquired. In S133, difference area information of a reference image is acquired from the local descriptor DB. When a difference area of the reference image is rectangular, the difference area information acquired at this point may be coordinate value information of four corners of the rectangle or may be information representing coordinate values of a pixel group in a reference image constituting the difference area.

In S134, a geometric transformation indicated by the geometric transformation information acquired in S132 is performed on the difference area information acquired in S133. In this case, if the difference area information is coordinate value information of the four corners, the geometric transformation is performed on one of the four coordinate values. In addition, if the difference area information is coordinate value information of a pixel group in a reference image constituting the difference area, the geometric transformation is performed on one pixel among the pixel group. At this point, when the variable i is smaller than a prescribed number N, the value of the variable i is updated in S135 and processes of S133 and S134 are continued until the value of the variable i equals or exceeds N. N=4 is set when the difference area information acquired in S133 is coordinate value information of the four corners in the reference image, and the number of pixels of a pixel group in a reference image constituting a difference area is set as the value of N when the difference area information is coordinate value information of the pixel group in the reference image constituting the difference area. Finally, in S136, the input image difference area information calculated in S134 is outputted and the process is finished.

Figure 3:
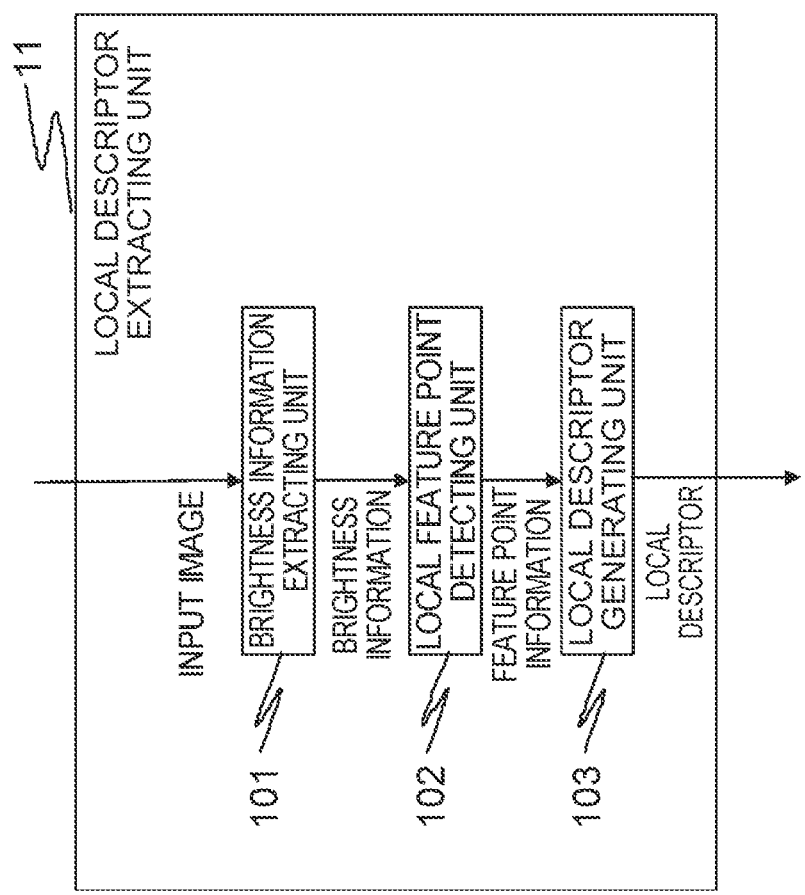
FIG. 3 is a block diagram representing a configuration example of a local descriptor extracting unit 11.

Next, the local descriptor extracting unit 11 will be described in detail with reference to FIG. 3. FIG. 3 is a block diagram representing a configuration example of the local descriptor extracting unit 11. The local descriptor extracting unit 11 includes a brightness information extracting unit 101, a local feature point detecting unit 102, and a local descriptor generating unit 103.

The brightness information extracting unit 101 receives an input image and extracts and exclusively outputs information regarding brightness from each pixel in the input image. In this case, the accepted input image is an image photographed by an imaging device such as a digital camera, a digital video camera, and a mobile phone, an image imported through a scanner, and the like. In addition, the image may be a compressed image such as a JPEG (Joint Photographic Experts Group) image or an uncompressed image such as a TIFF (Tagged Image File Format) image.

The local feature point detecting unit 102 detects a large number of characteristic points (feature points) from an image and outputs feature point information that is information related to each feature point. In this case, for example, feature point information refers to a coordinate position or a scale of a detected feature point, an orientation of a feature point, a "feature point number" that is a unique ID (Identification) assigned to a feature point, or the like. Moreover, the local feature point detecting unit 102 may output the feature point information as a separate piece of feature point information for each direction of an orientation of each feature point. For example, the local feature point detecting unit 102 may be configured to output feature point information only with respect to a direction of a main orientation of each feature point or to also output feature point information with respect to directions of secondary and subsequent orientations. In addition, when the local feature point detecting unit 102 is configured to also output feature point information with respect to directions of secondary and subsequent orientations, the local feature point detecting unit 102 can attach a different feature point number to each direction of an orientation of each feature point. For example, the local feature point detecting unit 102 can use a DoG (Difference-of-Gaussian) process when detecting a feature point from an image and extracting feature point information. Specifically, the local feature point detecting unit 102 can determine a position and a scale of a feature point by using a DoG process to perform an extreme value search in a scale space. Furthermore, the local feature point detecting unit 102 can calculate an orientation of each feature point using a determined position and scale of a feature point and gradient information of a peripheral area. Moreover, the local feature point detecting unit 102 may use other methods such as the Fast-Hessian Detector method instead of DoG to detect a feature point from an image and extract feature point information. The local feature point detecting unit 102 may exclusively select important feature points from the internally detected feature points and exclusively output information related to the selected feature points as feature point information.

The local descriptor generating unit 103 receives the feature point information outputted from the local feature point detecting unit 102 and generates (describes) a local descriptor that is a descriptor of a local area with respect to each feature point (an area including a feature point and a periphery thereof). Moreover, the local descriptor generating unit 103 may output a local descriptor in a lossless compression format such as ZIP and LZH. When an importance of detected feature points is determined by the local feature point detecting unit 102, the local descriptor generating unit 103 can generate and output a local descriptor in an order of importance of the feature points. Alternatively, the local descriptor generating unit 103 may generate and output a local descriptor in an order of coordinate positions of feature points. First, based on descriptor information, the local descriptor generating unit 103 acquires a local area from which a descriptor is to be extracted based on a coordinate position, a scale, and an orientation of each detected feature point. Moreover, when a plurality of pieces of feature point information with different orientations exist for one feature point, a local area can be acquired with respect to each piece of feature point information. Next, after normalizing a local area by rotating the local area in accordance with an orientation direction of a feature point, the local area is divided into sub-areas. For example, a local area can be divided into 16 blocks (4×4 blocks). Next, a feature vector is generated for each sub-area of the local area. For example, a gradient direction histogram can be used as a feature vector of a sub-area. Specifically, a gradient direction histogram is generated by calculating a gradient direction for each pixel in each sub-area, quantizing the gradient direction into eight directions, and summing up frequencies of the eight quantized directions for each sub-area. At this point, a feature vector constituted by a gradient direction histogram of 16 blocks×8 directions which is generated with respect to each feature point is outputted as a local descriptor. The outputted local descriptor is outputted so as to include coordinate position information of a feature point.

Figure 4:
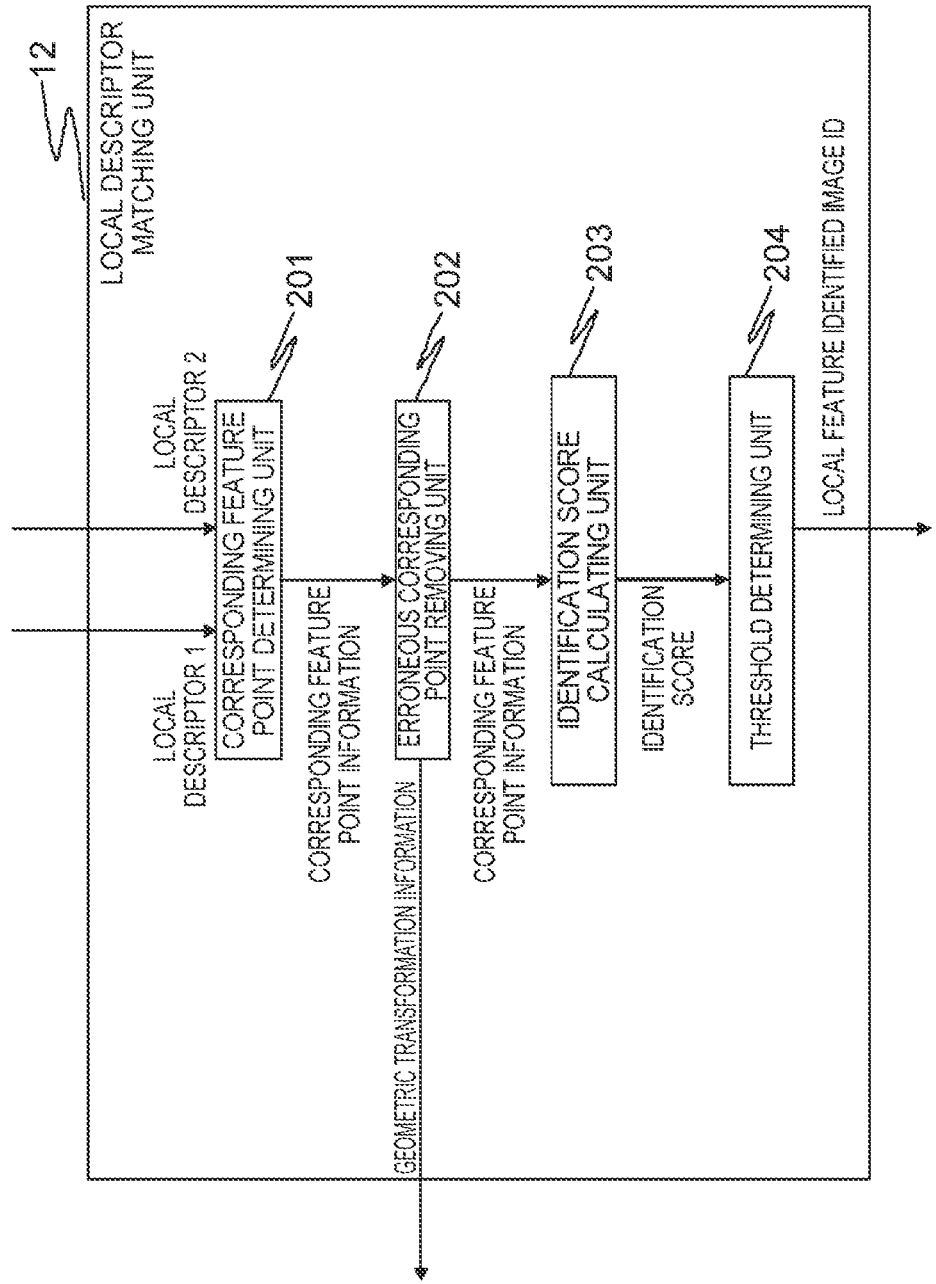
FIG. 4 is a block diagram representing a configuration example of a local descriptor matching unit 12.

Next, the local descriptor matching unit 12 will be described in detail with reference to FIG. 4. FIG. 4 is a block diagram representing a configuration example of the local descriptor matching unit 12. As shown in FIG. 4, the local descriptor matching unit 12 includes a corresponding feature point determining unit 201, an erroneous corresponding point removing unit 202, an identification score calculating unit 203, and a threshold determining unit 204.

The corresponding feature point determining unit 201 receives the local descriptor 1 extracted from an input image by the local descriptor extracting unit 11 and the local descriptor 2 extracted from a reference image. The corresponding feature point determining unit 201 determines whether or not the local descriptor 1 and the local descriptor 2 correspond to each other and, if so, outputs corresponding feature point information describing that the local descriptor 1 and the local descriptor 2 correspond to each other. For example, when the local descriptor 1 and the local descriptor 2 are, respectively, sets of a descriptor describing a gradient histogram of a periphery of a feature point, distance calculations in a descriptor space are first performed for all combinations of local descriptors. Only when a minimum distance value is significantly smaller than a next small distance value, with respect to a combination of a local descriptor that produces the minimum distance value, a determination is made that the local descriptor and a local feature area of the local descriptor correspond to each other and position information of the local feature area and position information of the corresponding local feature area are outputted as corresponding feature point information.

The erroneous corresponding point removing unit 202 receives the corresponding feature point information from the corresponding feature point determining unit 201, distinguishes correctly corresponding feature points from erroneously-corresponding feature points among the corresponding feature points, and respectively outputs distinguished feature point information together with geometric transformation information used for the distinguishment. For example, a method such as RANSAC is applied to corresponding feature point information received from the corresponding feature point determining unit 201 and information on a geometric transformation that moves a coordinate in the reference image to a coordinate in the input image is estimated as geometric transformation information. The geometric transformation information estimated at this point is respectively applied to feature points in the reference image among the corresponding feature points, a determination of a correctly corresponding feature point is made when a feature point in the reference image is substantially consistent with a feature point in the input image, and a determination of an erroneously-corresponding feature point is conversely made when a feature point in the reference image is not consistent with a feature point in the input image.

The identification score calculating unit 203 receives the corresponding feature point information from the erroneous corresponding point removing unit 202 and outputs an identification score. As the outputted identification score, for example, the number of combinations of correctly corresponding feature points may be counted from among the corresponding feature point information received from the erroneous corresponding point removing unit 202, a table for mapping the number of combinations to a score ranging from 0 to 1 may be prepared in advance, and the identification score may be outputted by referring to the table. Alternatively, when the number of combinations of correctly corresponding feature points is denoted by c, by denoting a minimum number of corresponding feature points set in advance as m, m/(c+m) may be calculated as the identification score. The threshold determining unit 204 performs a threshold process on the identification score outputted from the identification score calculating unit 203, makes a determination that the images show a same object when the identification score is equal to or higher than the threshold, and outputs the ID of the reference image as a local feature identified image ID. The threshold set by the threshold determining unit 204 may be a value determined and internally stored in advance or a value provided from the outside.

Figure 5:
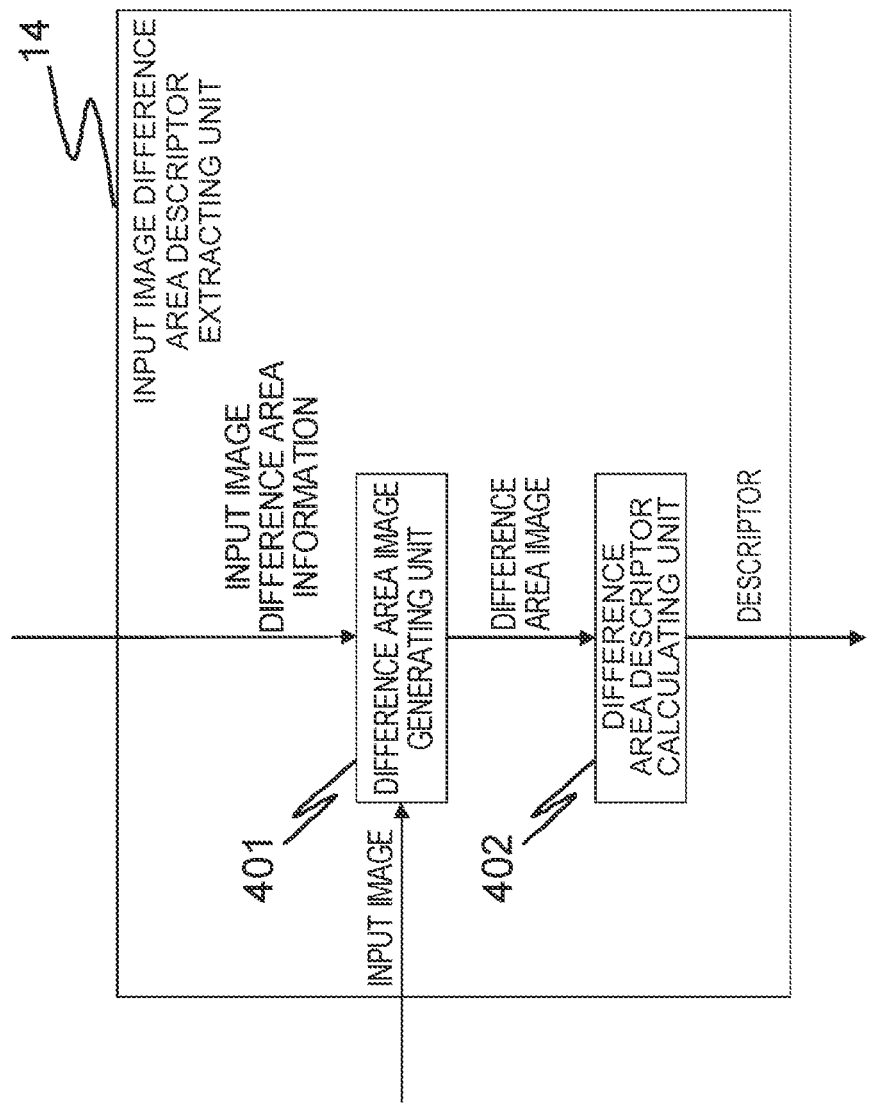
FIG. 5 is a block diagram representing a configuration example of an input image difference area descriptor extracting unit 14.

Next, the input image difference area descriptor extracting unit 14 will be described in detail with reference to FIG. 5. FIG. 5 is a block diagram representing a configuration example of the input image difference area descriptor extracting unit 14. As shown in FIG. 5, the input image difference area descriptor extracting unit 14 includes a difference area image generating unit 401 and a difference area descriptor calculating unit 402.

The difference area image generating unit 401 receives an input image and receives input image difference area information from the input image difference area determining unit 13, and when the input image difference area information is coordinate value information of four corners of a difference area in the input image, respectively connects two adjacent corners among the four corners by straight lines and sequentially reads pixels on the straight lines. A difference area image in the input image is generated and outputted by determining pixels for which a value is to be read and an order in which the pixels are to be read from the input image with respect to an area enclosed by a read pixel group. Alternatively, when the input image difference area information received from the input image difference area determining unit 13 is information representing coordinate values of a pixel group constituting a difference area in the input image, the difference area image generating unit 401 reads the input image in the order of coordinate values and outputs the read results as a difference area information in the input image.

The difference area descriptor calculating unit 402 extracts a descriptor from the difference area image generated by the difference area image generating unit 401 and outputs the descriptor. As the descriptor extracted by the difference area descriptor calculating unit 402, for example, a descriptor such as "color arrangement" and a "color histogram" may be extracted in order to perform an analysis on color information of a difference area in the input image and a difference area in the reference image. Alternatively, a descriptor capable of expressing "character-likeness" may be extracted in order to analyze minute differences in characters between a difference area in the input image and a difference area in the reference image.

Figure 6:
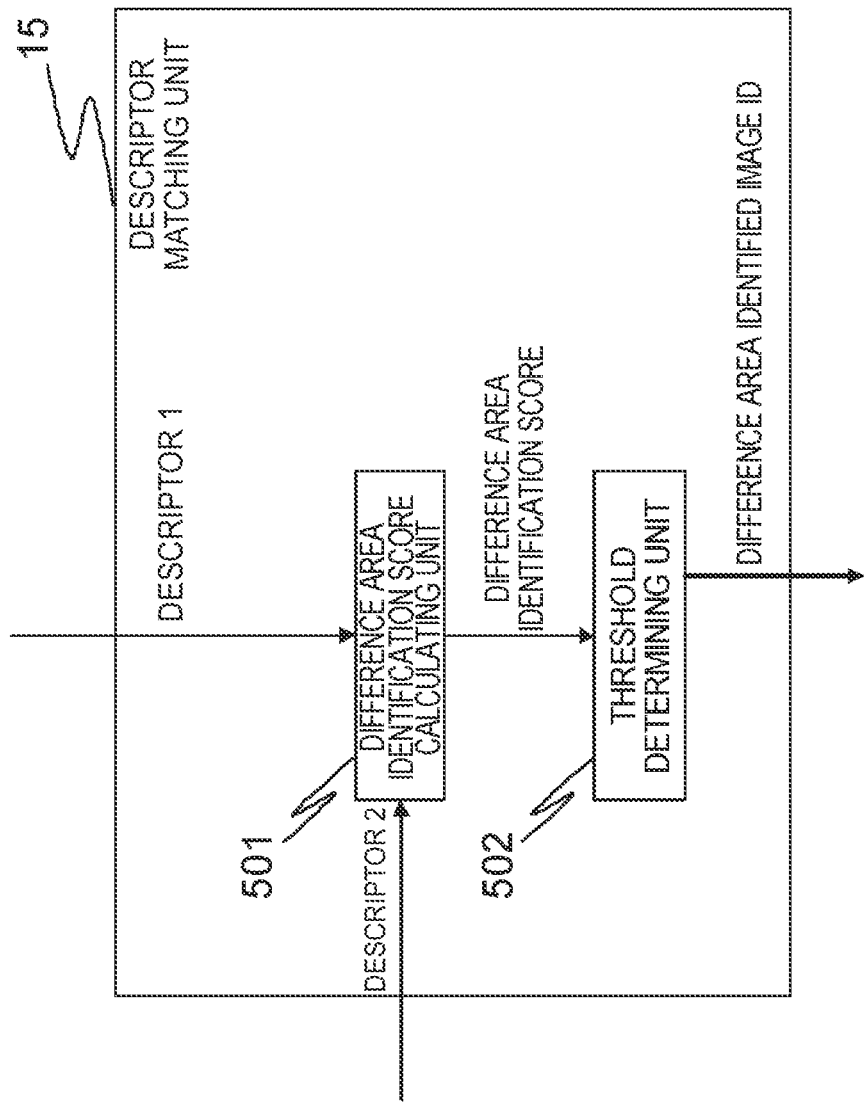
FIG. 6 is a block diagram representing a configuration example of a descriptor matching unit 15.

Next, the descriptor matching unit 15 will be described in detail with reference to FIG. 6. FIG. 6 is a block diagram representing a configuration example of the descriptor matching unit 15. As shown in FIG. 6, the descriptor matching unit 15 includes a difference area identification score calculating unit 501 and a threshold determining unit 502.

The difference area identification score calculating unit 501 respectively receives a descriptor 1 as a descriptor extracted from a difference area of the input image and a descriptor 2 as a descriptor extracted from a difference area of the reference image. The difference area identification score calculating unit 501 outputs an identification score determined from the two received descriptors as a difference area identification score. The difference area identification score is a scale whose value increases as the similarity between the descriptor 1 and the descriptor 2 increases. For example, a distance between the descriptor 1 and the descriptor 2 on a descriptor space may be calculated and an inverse thereof may be outputted as a difference area identification score. Alternatively, when matching the descriptor 1 with descriptors 2 respectively extracted from a plurality of reference image groups, a minimum value of distances on the descriptor space among all descriptor combinations may be found and an inverse of a value obtained by dividing distances on the descriptor space for all descriptor combinations by the minimum value may be outputted as a difference area identification score. Alternatively, a table for mapping distance values between the descriptor 1 and the descriptor 2 on the descriptor space to scores ranging from 0 to 1 may be prepared in advance and a difference area identification score may be outputted by referring to the table.

The threshold determining unit 502 compares the difference area identification score outputted from the difference area identification score calculating unit 501 with a threshold, makes a determination that images show a same object when the identification score is equal to or higher than the threshold, and outputs the ID of the reference image as a difference area identified image ID. The threshold set by the threshold determining unit 502 may be a value determined and internally stored in advance or a value provided from the outside.

Figure 7:
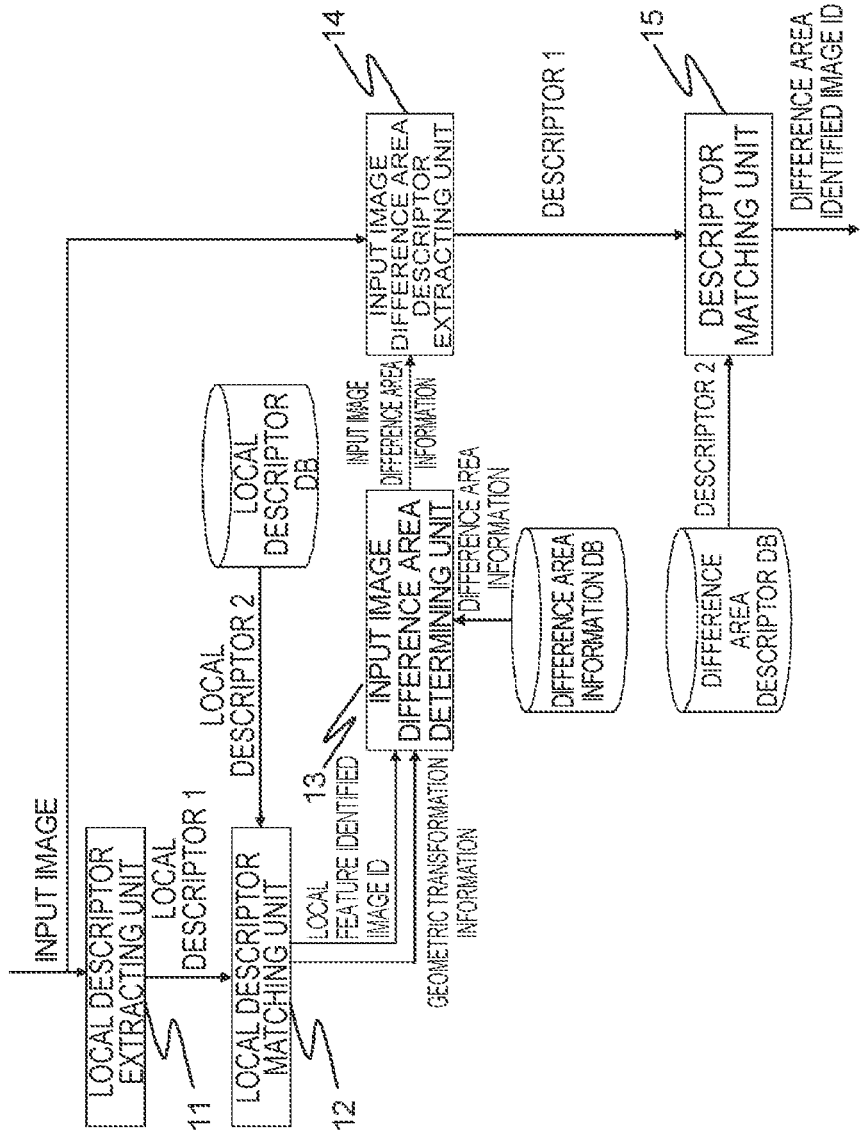
FIG. 7 is a block diagram representing a configuration example of an object identification apparatus according to a modification of the first embodiment.

FIG. 7 shows a configuration of an object identification apparatus according to a modification of the present embodiment. The object identification apparatus shown in FIG. 7 differs from the object identification apparatus shown in FIG. 1 in that a difference area information DB that is a database exclusively storing difference area information is provided. The present embodiment can be realized by the configuration shown in FIG. 7 when the local descriptor 2 is not stored in the form of a database and can be extracted on the fly from a reference image.

FIGS. 8 to 11 are conceptual diagrams showing patterns that are conceivable as relationships between a difference area in a reference image and a difference area in an input image.

Figure 8:
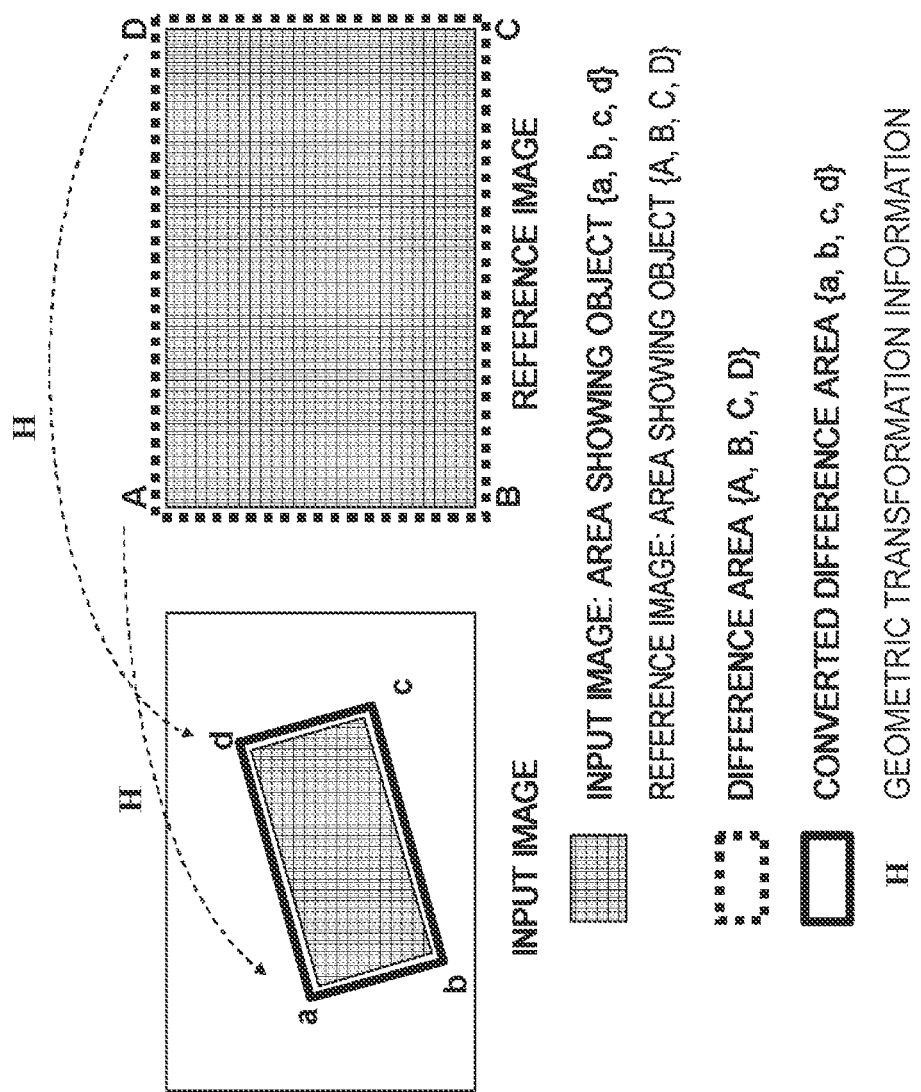
FIG. 8 is a conceptual diagram showing relationships of a difference area with respect to a reference image and an input image difference area with respect to an input image.

FIG. 8 shows an example of a case in which an object is displayed across an entire reference image and a difference area is set with respect to the entire reference image. This example corresponds to cases in which, for example, characters, patterns, or the like inscribed on objects are substantially the same but colors of the objects differ from each other as often seen in a case of, for example, packages of candy that belong to a same brand but have different flavors. In other words, in this example, since it is conceivable that an entire input image may differ from an entire reference image, the entire reference image is set as a difference area.

Figure 9:
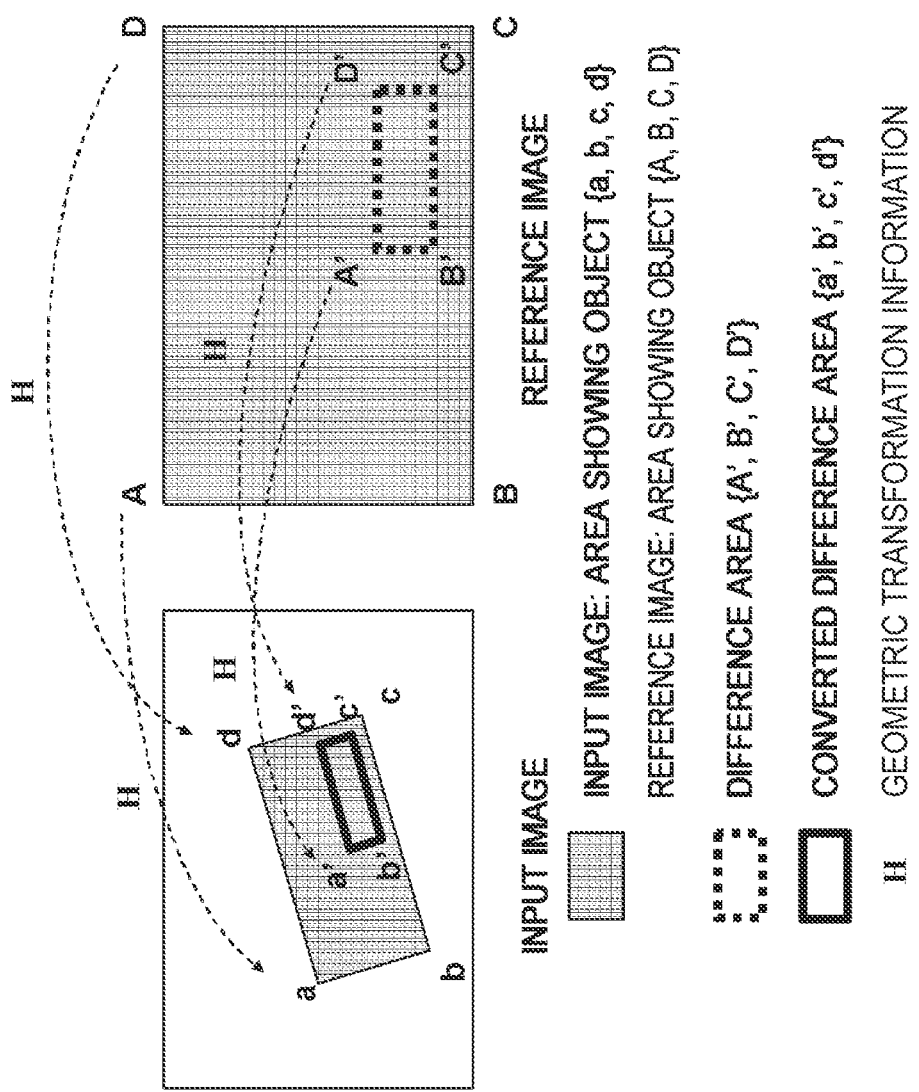
FIG. 9 is a conceptual diagram showing relationships of a difference area with respect to a reference image and an input image difference area with respect to an input image.
Figure 10:
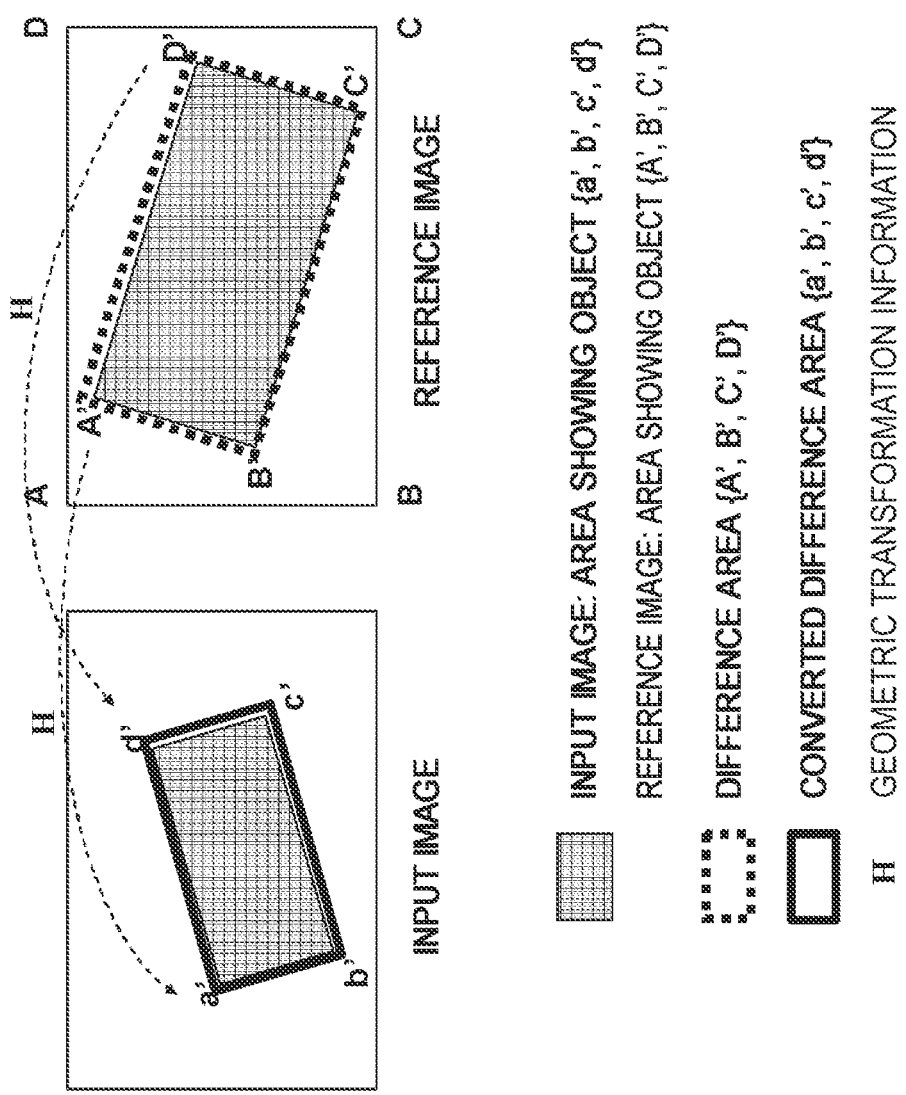
FIG. 10 is a conceptual diagram showing relationships of a difference area with respect to a reference image and an input image difference area with respect to an input image.
Figure 11:
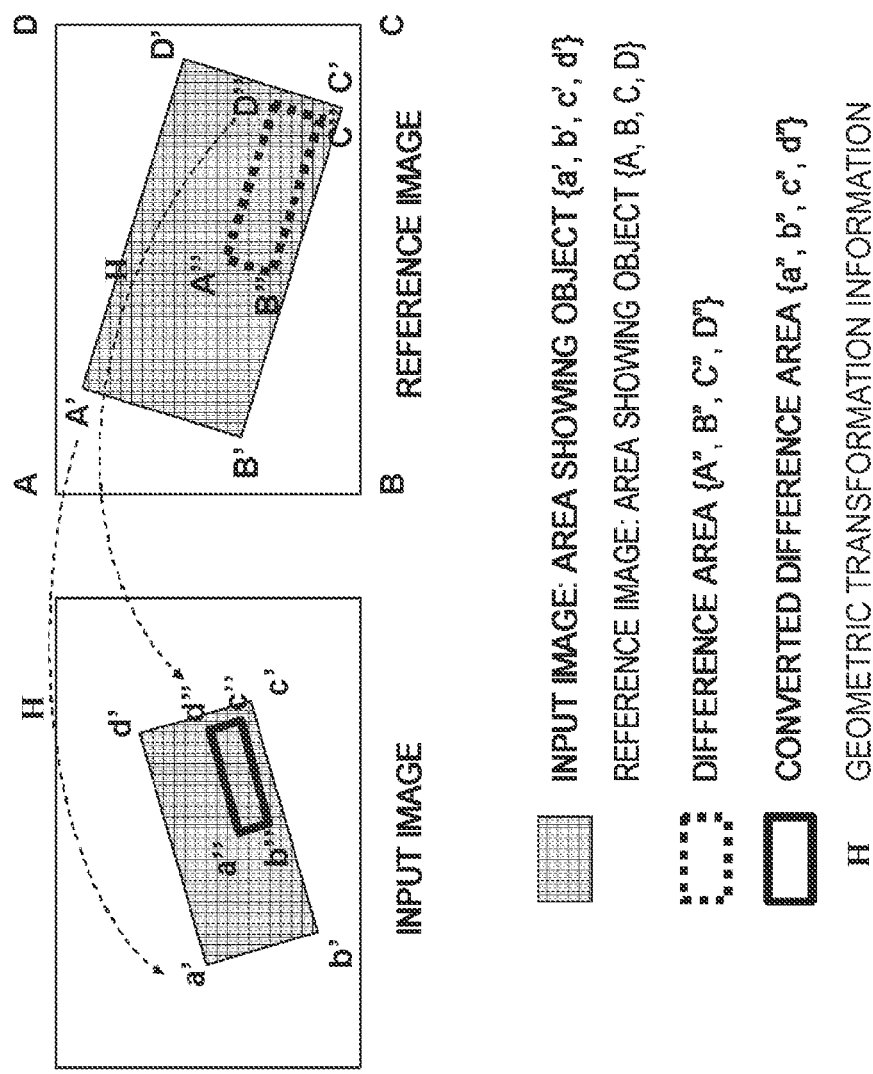
FIG. 11 is a conceptual diagram showing relationships of a difference area with respect to a reference image and an input image difference area with respect to an input image.

FIG. 9 shows an example of a case in which an object is displayed across an entire reference image and a difference area is set with respect to a part of the reference image. This example corresponds to cases in which, for example, objects are substantially the same but colors, characters, patterns, or the like differ from each other only in a certain part of the objects as often seen in a case of, for example, spines of books representing different volumes of a same series. In other words, in this example, since it is conceivable that a part of an input image may differ from a part of a reference image, a part of the reference image is set as a difference area. The examples shown in FIGS. 10 and 11 are substantially similar to the examples shown in FIGS. 8 and 9 but differ in that, instead of showing a reference image in its entirety, only a part of a reference image is shown.

In every case, in the present embodiment, information on an area set as the difference area is registered in a database in advance. In the present embodiment, a registered difference area in a reference image and a registered difference area in an input image are respectively obtained by extracting minimum required areas in which it is predicted that a difference may occur from the reference image and the input image. Therefore, even in a case where a local descriptor of the entire reference image and a local descriptor of the entire input image are compared to each other and the images are determined to be the same since there is only a slight difference, by once again exclusively comparing descriptors of difference images of the reference image and the input image, a minute difference attributable to a difference between objects can be distinguished. As a result, erroneous determinations that have been a problem when only using local descriptors can be suppressed.

As described above, according to the present embodiment, the local descriptor matching unit 12 determines whether or not a descriptor of each feature point extracted from an input image corresponds to a descriptor of each feature point extracted from a reference image. When a score based on the number of combinations of descriptors determined to be corresponding descriptors by the local descriptor matching unit 12 is equal to or higher than a prescribed value, the input image difference area descriptor extracting unit 14 extracts a descriptor from an area of the input image corresponding to a position of an image area obtained by performing a geometric transformation for correcting a geometric deviation between the input image and the reference image on a prescribed area (difference area) of the reference image. Moreover, in the present embodiment, a difference area of the reference image is determined by the input image difference area determining unit 13. The descriptor matching unit 15 matches a descriptor extracted by the input image difference area descriptor extracting unit 14 with a descriptor extracted from the difference area of the reference image and outputs a matching result. As a result, an input image showing a same object as an object shown in a reference image can be identified more accurately.

Second Embodiment

A second embodiment of the present invention will be described with reference to the drawings. In the second embodiment, a difference area in a reference image is estimated and identification is performed without registering the difference area in the reference image in a database in advance.

Figure 12:
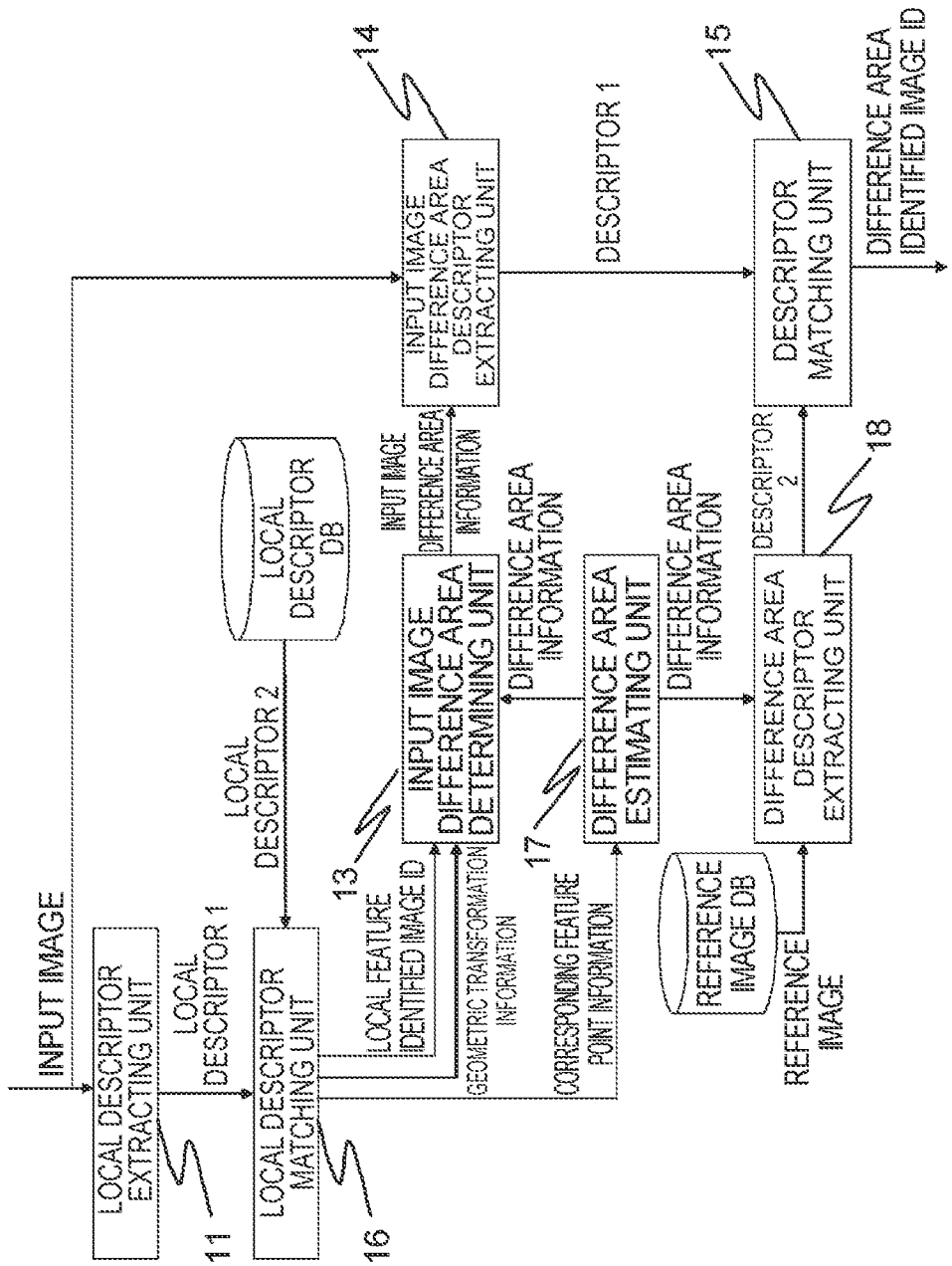
FIG. 12 is a block diagram representing a configuration example of an object identification apparatus according to a second embodiment.

FIG. 12 is a block diagram showing a configuration of an object identification apparatus according to the second embodiment of the present invention. As shown in FIG. 12, the object identification apparatus according to the present embodiment includes a local descriptor extracting unit 11, a local descriptor matching unit 16, an input image difference area determining unit 13, an input image difference area descriptor extracting unit 14, a difference area estimating unit 17, a difference area descriptor extracting unit 18, and a descriptor matching unit 15. As shown, the object identification apparatus according to the second embodiment differs from the object identification apparatus according to the first embodiment in that the local descriptor matching unit 12 has been changed to the local descriptor matching unit 16 and the difference area information DB that is a database storing difference area information has been changed to the difference area estimating unit 17 and the difference area descriptor extracting unit 18. Details of the local descriptor matching unit 16, the difference area estimating unit 17, and the difference area descriptor extracting unit 18 will be described later. Since other components are similar to those of the first embodiment, the components will be denoted by same reference symbols and a detailed description thereof will be omitted.

Figure 13:
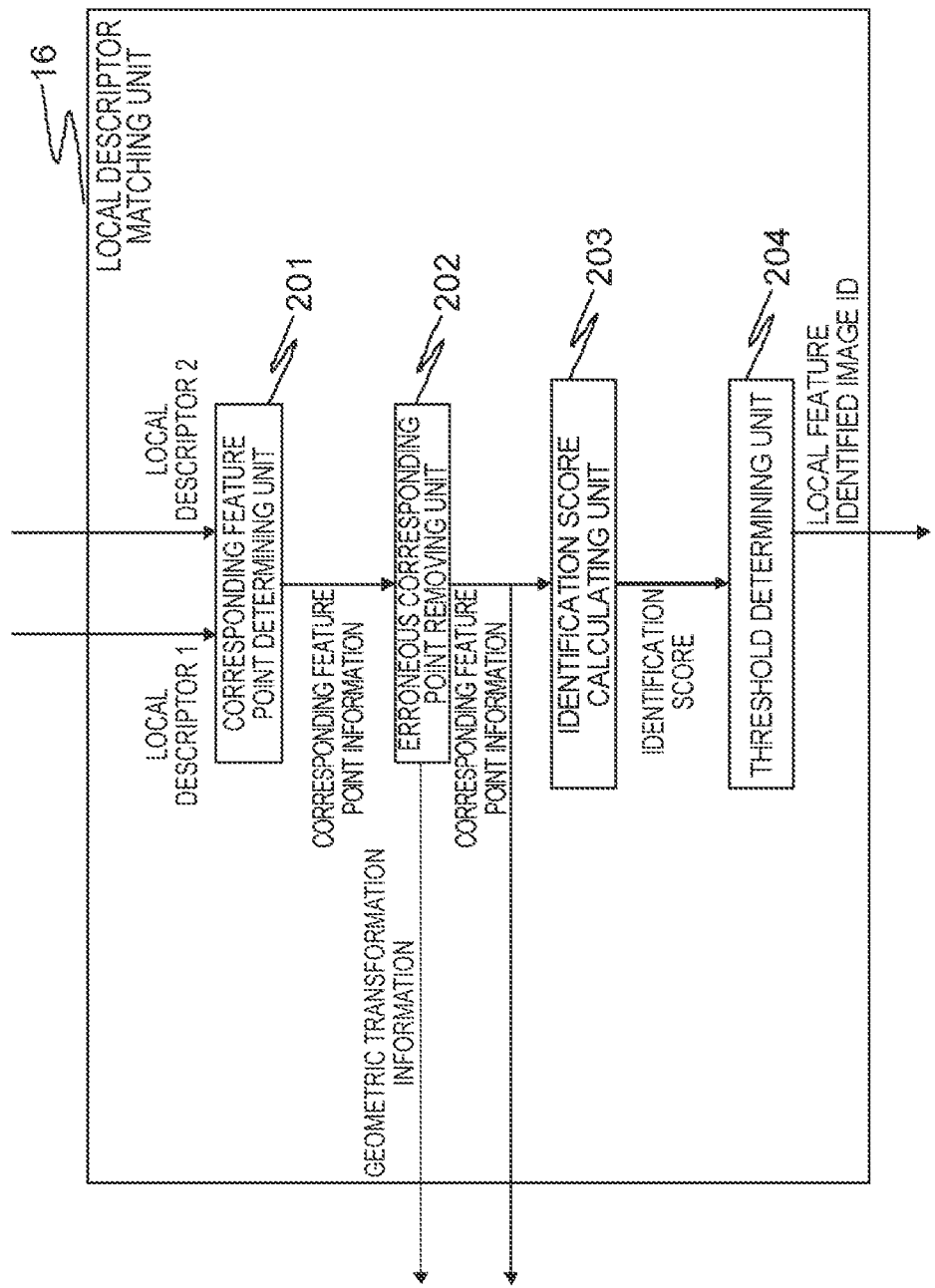
FIG. 13 is a block diagram representing a configuration example of a local descriptor matching unit 16.

FIG. 13 is a block diagram representing a configuration example of the local descriptor matching unit 16. As shown in FIG. 13, the local descriptor matching unit 16 includes a corresponding feature point determining unit 201, an erroneous corresponding point removing unit 202, an identification score calculating unit 203, and a threshold determining unit 204. In other words, the components of the local descriptor matching unit 16 shown in FIG. 13 are the same as the components of the local descriptor matching unit 12 shown in FIG. 4. However, the local descriptor matching unit 16 shown in FIG. 13 differs from the local descriptor matching unit 12 shown in FIG. 4 in that, in addition to geometric transformation information being outputted from the erroneous corresponding point removing unit 202 and a local feature identified image ID being outputted from the threshold determining unit 204, corresponding feature point information outputted from the erroneous corresponding point removing unit 202 is now outputted from the local descriptor matching unit 16.

Figure 14:
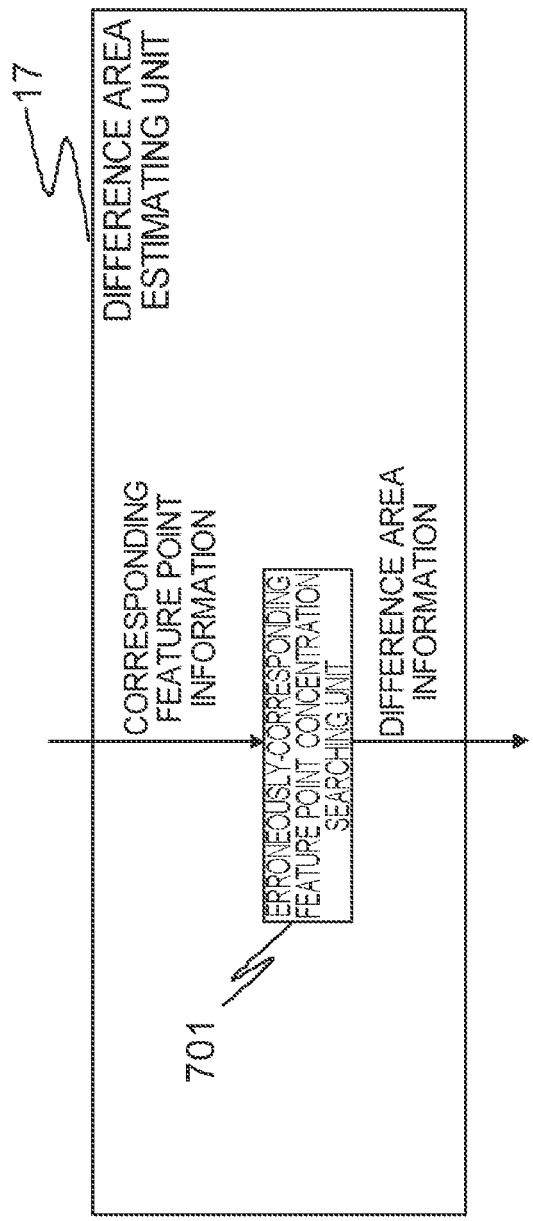
FIG. 14 is a block diagram representing a configuration example of a difference area estimating unit 17.

FIG. 14 is a block diagram representing a configuration example of the difference area estimating unit 17. As shown in FIG. 14, the difference area estimating unit 17 includes an erroneously-corresponding feature point concentration searching unit 701. The erroneously-corresponding feature point concentration searching unit 701 receives corresponding feature point information from the local descriptor matching unit 16 and outputs difference area information that is information regarding a difference area in a reference image. The corresponding feature point information received from the local descriptor matching unit 16 includes information on correctly corresponding feature points and information on erroneously-corresponding feature points. Therefore, by searching an area with a concentration of erroneously-corresponding feature points from the reference image using information on the erroneously-corresponding feature points included in the corresponding feature point information, a difference area in the reference image can be estimated. To search an area with a concentration of erroneously-corresponding feature points, for example, when a rectangular window with a certain size is defined, the rectangular window is moved in the difference image, and the number of erroneously-corresponding feature points in the rectangular window is equal to or larger than a certain number, an area of the rectangular window can be assumed to be a difference area. A method of estimating a difference area in a reference image is not limited thereto and any estimation method can be used as long as the estimation is based on an area with a concentration of erroneously-corresponding feature points. In other words, a difference area (prescribed area) of a reference image is an area including an area of the reference image that is determined by the local descriptor matching unit 16 to have a concentration of erroneously-corresponding feature points.

Figure 15:
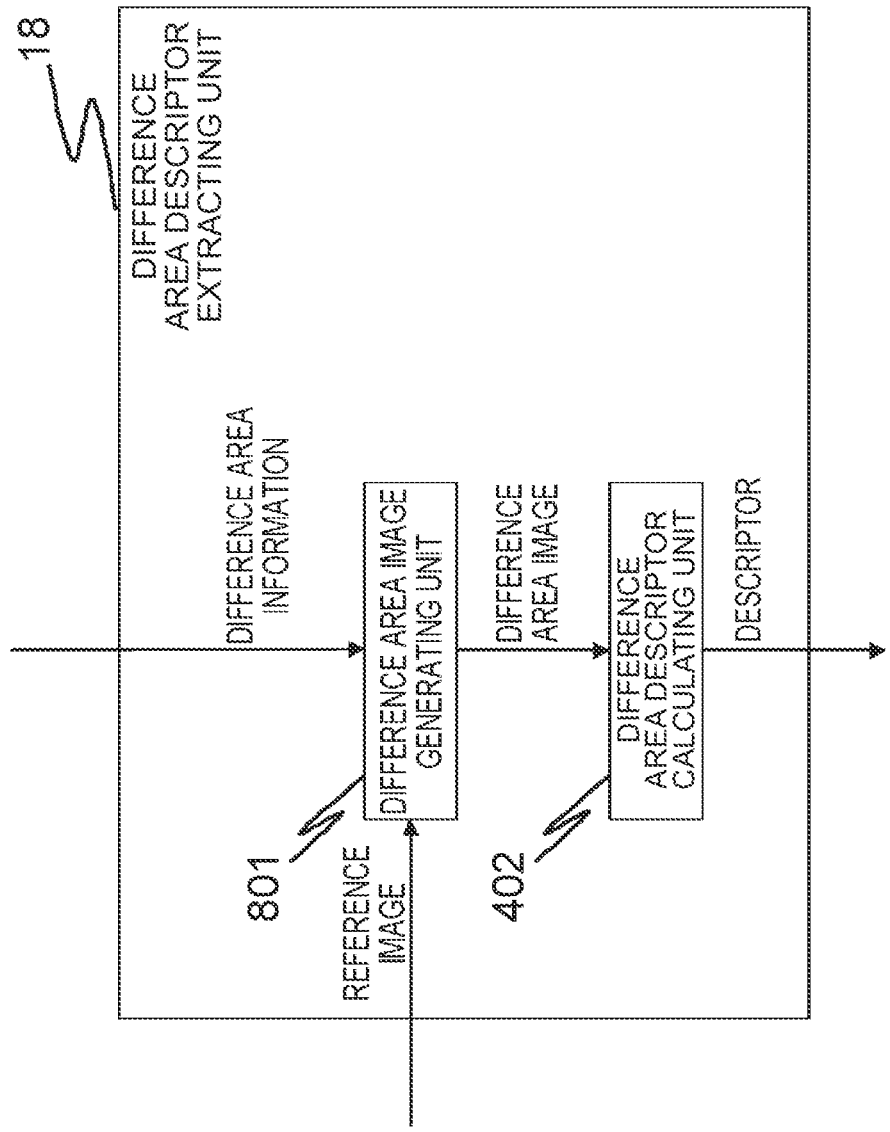
FIG. 15 is a block diagram representing a configuration example of a difference area descriptor extracting unit 18.

FIG. 15 is a block diagram representing a configuration example of the difference area descriptor extracting unit 18. As shown in FIG. 15, the difference area descriptor extracting unit 18 includes a difference area image generating unit 801 and a difference area descriptor calculating unit 402.

The difference area image generating unit 801 is substantially the same as the difference area image generating unit 401 that is a component of the input image difference area descriptor extracting unit 14 shown in FIG. 5. However, the difference area image generating unit 801 differs from the difference area image generating unit 401 in that a reference image and difference area information are respectively inputted instead of an input image and input image difference area information. Another difference is that a difference image generated by the difference area image generating unit 801 is generated from a reference image based on difference area information in the reference image instead of being generated from an input image based on input image difference area information.

Since the difference area descriptor calculating unit 402 is the same as the difference area descriptor calculating unit 402 that is a component of the input image difference area descriptor extracting unit 14 shown in FIG. 5, a detailed description thereof will be omitted. Moreover, descriptors calculated by the difference area descriptor calculating units 402 in FIGS. 5 and 15 must be descriptors calculated by a same process.

As described above, according to the present embodiment, since a difference area in a reference image can be estimated even without having to register the difference area in the reference image in a database in advance, the present embodiment is effective when an area in which it is predicted that a difference may occur cannot be registered in advance as a difference area in an article inspection system that utilizes object identification (for example, when exclusively distinguishing products with a defect in one part or another from among a large number of products). In addition, since estimation of a difference area in the reference image according to the present embodiment can be performed regardless of whether the difference area covers an entire object or the difference area corresponds to a part of the object, the present embodiment is effective with respect to any of the examples shown in FIGS. 8 to 11.

Third Embodiment

A third embodiment of the present invention will be described with reference to the drawings.

Figure 16:
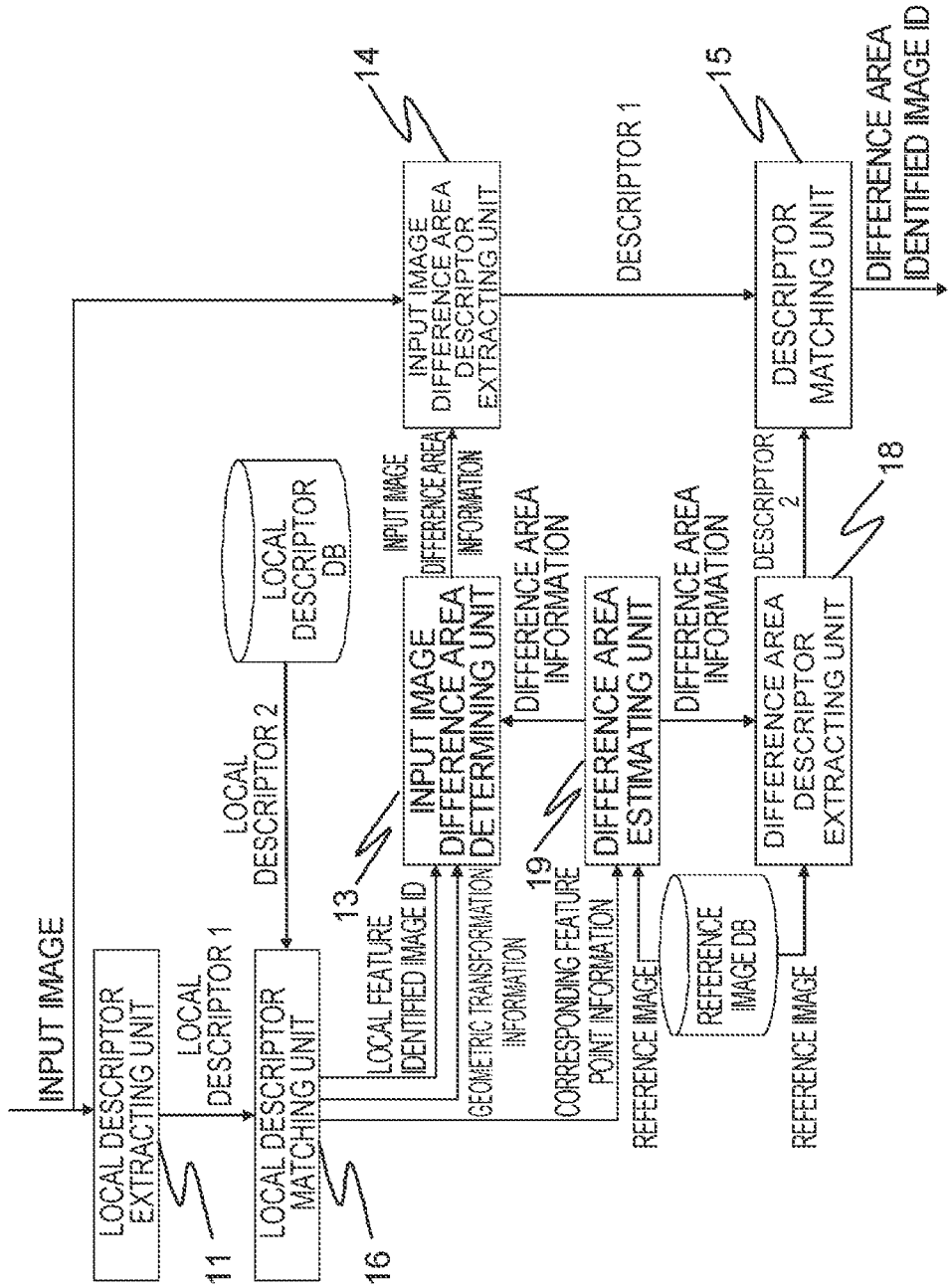
FIG. 16 is a block diagram representing a configuration example of an object identification apparatus according to a third embodiment.

FIG. 16 is a block diagram showing a configuration of an object identification apparatus according to the third embodiment of the present invention. As shown in FIG. 16, the object identification apparatus according to the third embodiment includes a local descriptor extracting unit 11, a local descriptor matching unit 16, an input image difference area determining unit 13, an input image difference area descriptor extracting unit 14, a descriptor matching unit 15, a difference area estimating unit 19, and a difference area descriptor extracting unit 18.

As described above, the object identification apparatus according to the third embodiment differs from the second embodiment in that the difference area estimating unit 17 of the object identification apparatus according to the second embodiment has been changed to the difference area estimating unit 19. Details of the difference area estimating unit 19 will be described later. Since other components are similar to those of the second embodiment, the components will be denoted by same reference symbols and a detailed description thereof will be omitted.

Figure 17:
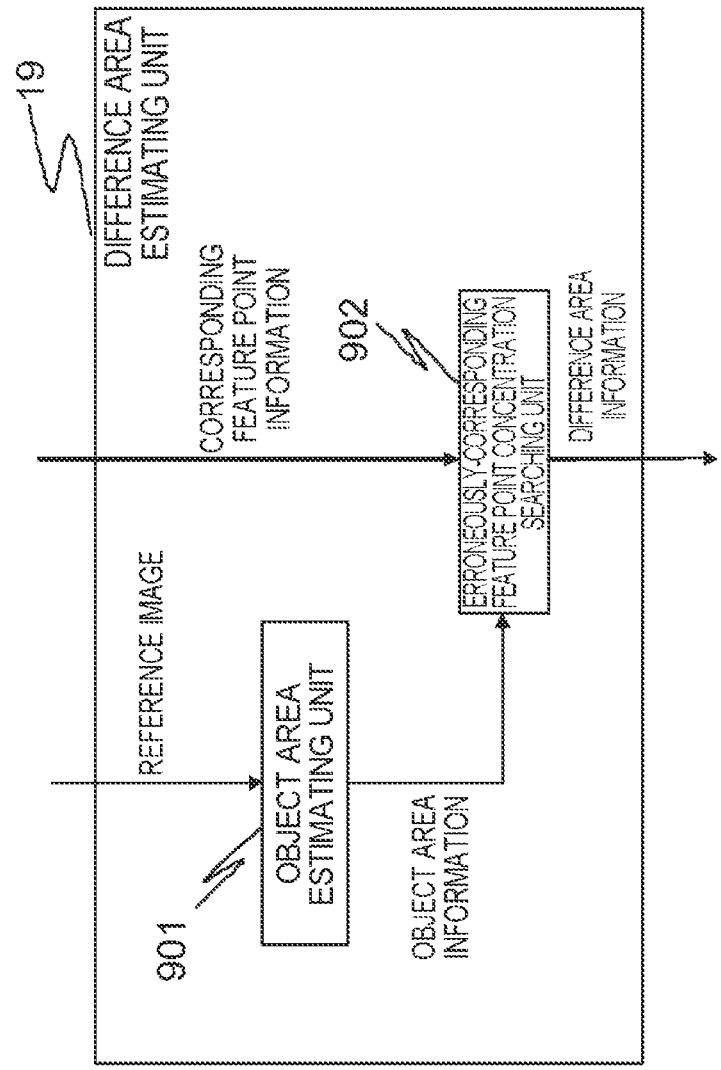
FIG. 17 is a block diagram representing a configuration example of a difference area estimating unit 19.

FIG. 17 is a block diagram representing a configuration example of the difference area estimating unit 19. As shown in FIG. 17, the difference area estimating unit 19 includes an object area estimating unit 901 and an erroneously-corresponding feature point concentration searching unit 902.

The object area estimating unit 901 receives a reference image corresponding to a local feature identified image ID outputted from the local descriptor matching unit 16 or a reference image group associated with the local feature identified image ID and outputs object area information that is information representing an area in which an object exists in a reference image. The reference image received at this point may be stored in advance in a database as shown in FIG. 16 or may be acquired from outside of the object identification apparatus. Conceivable examples of processes by the object area estimating unit 901 include a method of roughly estimating an object area by analyzing edge intensity in a reference image and a method involving learning an image pattern of a background area in advance and roughly estimating an object area as an area other than a background.

The erroneously-corresponding feature point concentration searching unit 902 is similar to the erroneously-corresponding feature point concentration searching unit 701 that is a component of the difference area estimating unit 17 shown in FIG. 14. However, the erroneously-corresponding feature point concentration searching unit 902 differs from the second embodiment in that object area information outputted from the object area estimating unit 901 is inputted in addition to corresponding feature point information received from the local descriptor matching unit 16. The erroneously-corresponding feature point concentration searching unit 902 only focuses on points inside an object area among corresponding feature points and searches for an area with a concentration of erroneously-corresponding feature points.

In other words, the erroneously-corresponding feature point concentration searching unit 902 estimates a difference area from inside an object area in a reference image. Therefore, in the present embodiment, a difference area in the reference image can be estimated without being affected by an erroneously-corresponding feature point that appears from an area other than the object. Specifically, a difference area (prescribed area) in the reference image is an area including an area that is determined by the local descriptor matching unit 16 to have a concentration of erroneously-corresponding feature points among an area showing an object among the reference image. In addition, since a range in which an area with a concentration of erroneously-corresponding feature points is to be searched among the reference image is limited, the erroneously-corresponding feature point concentration searching unit 902 is capable of performing a process at a higher speed than the erroneously-corresponding feature point concentration searching unit 701 whose search range is an entire reference image.

According to the present embodiment, in a similar manner to the second embodiment, since a difference area in a reference image can be estimated even without having to register the difference area in the reference image in a database in advance, the present embodiment is effective when information regarding a difference area cannot be registered in advance in an article inspection system that utilizes object identification (for example, when exclusively distinguishing products with a defect in one part or another from among a large number of products). In addition, while estimation of a difference area in the reference image according to the present embodiment can be performed regardless of whether the difference area is an entire object or a part of the object, since the difference area can be estimated with high accuracy without being affected by an erroneously-corresponding feature point that appears from an area other than the object, the present embodiment is particularly effective in cases of the examples shown in FIGS. 10 and 11.

Fourth Embodiment

A fourth embodiment of the present invention will be described with reference to the drawings. In the fourth embodiment, a case in which another method is used as a difference area estimation method will be described.

Figure 18:
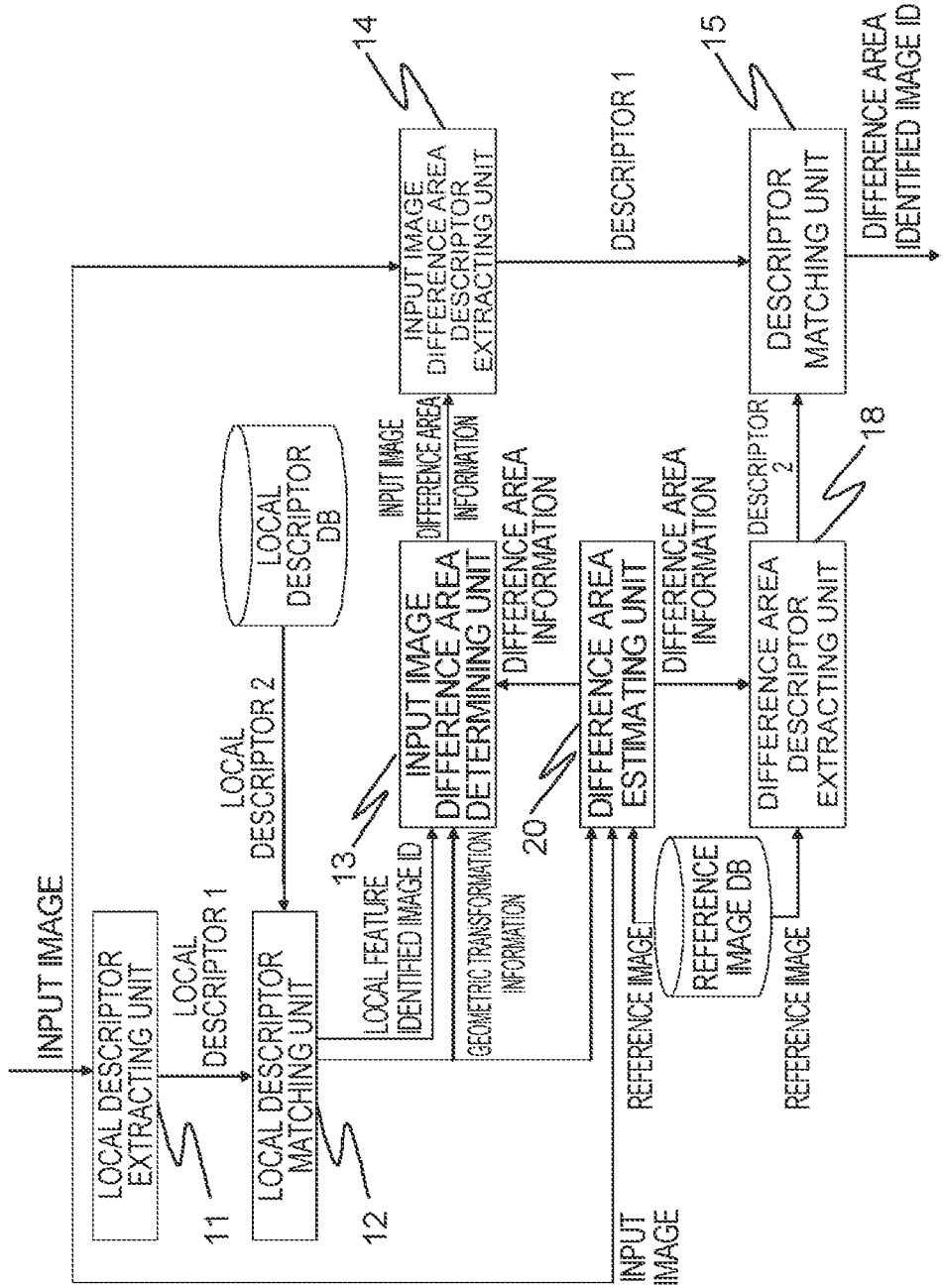
FIG. 18 is a block diagram representing a configuration example of an object identification apparatus according to a fourth embodiment.

FIG. 18 is a block diagram showing a configuration of an object identification apparatus according to the fourth embodiment of the present invention. As shown in FIG. 18, the object identification apparatus according to the fourth embodiment includes a local descriptor extracting unit 11, a local descriptor matching unit 12, an input image difference area determining unit 13, an input image difference area descriptor extracting unit 14, a descriptor matching unit 15, a difference area estimating unit 20, and a difference area descriptor extracting unit 18. As described above, the object identification apparatus according to the fourth embodiment differs from the third embodiment in that the local descriptor matching unit 16 and the difference area estimating unit 19 of the object identification apparatus according to the third embodiment has been changed to the local descriptor matching unit 12 and the difference area estimating unit 20. The local descriptor matching unit 12 is similar to the local descriptor matching unit 12 of the object identification apparatus according to the first embodiment and a detailed description thereof will be omitted. Details of the difference area estimating unit 20 will be described later. Since other components are similar to those of the third embodiment, the components will be denoted by same reference symbols and a detailed description thereof will be omitted.

Figure 19:
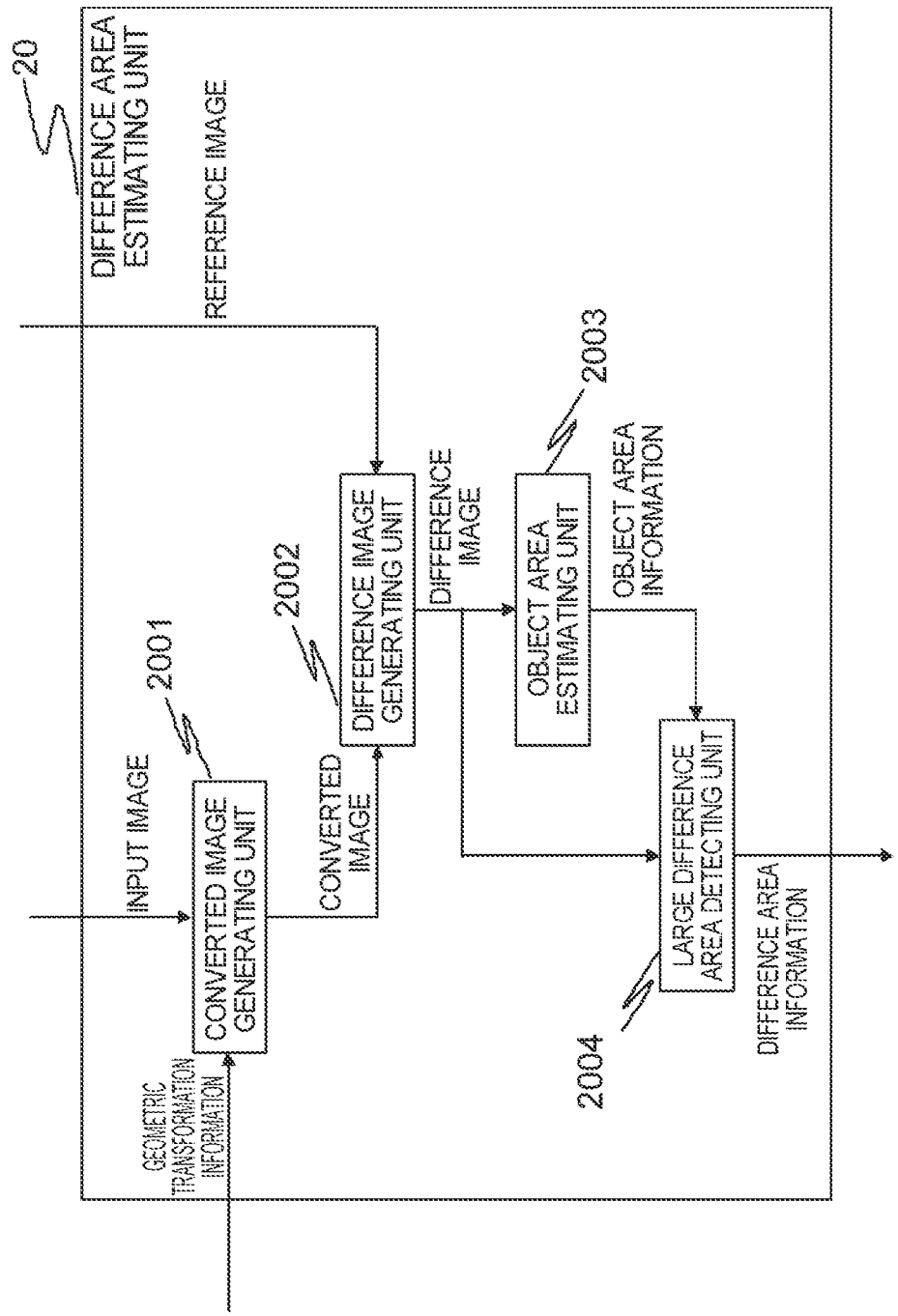
FIG. 19 is a block diagram representing a configuration example of a difference area estimating unit 20.

FIG. 19 is a block diagram representing a configuration example of the difference area estimating unit 20. As shown in FIG. 19, the difference area estimating unit 20 includes a converted image generating unit 2001, a difference image generating unit 2002, an object area estimating unit 2003, and a large difference area detecting unit 2004.

The converted image generating unit 2001 receives an input image and geometric transformation information outputted from the local descriptor matching unit 12, performs a geometric transformation indicated by the geometric transformation information on the input image, and outputs a converted image. The converted image outputted at this point is generated by, for example, performing a geometric transformation indicated by the geometric transformation information on each pixel in the input image and projecting each pixel in the input image onto an image with a same size as a reference image. In this case, pixel values of pixels in the projection destination image onto which a pixel in the input image is not projected are filled with zero or the like to generate the converted image. In addition, when the geometric transformation information outputted from the local descriptor matching unit 12 is information with respect to a transformation of a coordinate in the reference image to a coordinate in the input image, the geometric transformation information to be applied by the converted image generating unit 2001 must be information for performing an opposite transformation. Specifically, when the geometric transformation information outputted from the local descriptor matching unit 12 is a 3×3 matrix that converts a coordinate in the reference image to a coordinate in the input image, an inverse matrix thereof is used as the geometric transformation information to be applied by the converted image generating unit 2001.

The difference image generating unit 2002 receives a reference image corresponding to a local feature identified image ID outputted from the local descriptor matching unit 12 (or a reference image group associated with the local feature identified image ID) and the converted image outputted from the converted image generating unit 2001. The difference image generating unit 2002 outputs an image representing a difference between the reference image and the converted image as a difference image. Moreover, when calculating the difference between the reference image and the converted image, for example, the difference may be calculated after correcting brightness of one of the images so that average values of brightness of both images are consistent with each other. The reference image received at this point may be stored in advance in a database as shown in FIG. 18 or may be acquired from outside of an article identification apparatus.

The object area estimating unit 2003 receives the difference image from the difference image generating unit 2002 and estimates and outputs object area information (information representing an area in which an object exists in the reference image) in the difference image. The object area information outputted at this point can be estimated by, for example, searching an area with a small difference value among the difference value from the image. This is because an area with a small difference value among the difference value is conceivably an area in which it is highly likely that a same object is shown in the reference image and the converted image. To estimate an object area, for example, when a rectangular window with a certain size is considered, the rectangular window is moved in the difference image, and the number of pixels with small pixel values in the rectangular window is equal to or larger than a certain number, an area of the rectangular window can be assumed to be an object area. Other methods may be used instead.

The large difference area detecting unit 2004 receives the difference image outputted from the difference image generating unit 2002 and the object area information outputted from the object area estimating unit 2003. The large difference area detecting unit 2004 determines that a location with an increased difference value in the difference image among the object area is highly likely to be a location where there is a difference between the object shown in the reference image and the object shown in the converted image. Therefore, the large difference area detecting unit 2004 searches a location with a large difference value from among the image and outputs area information of the location as difference area information. To search a location with a large difference value (in other words, a difference area), for example, when a rectangular window with a certain size is defined, the rectangular window is moved in an object area of the difference image, and the number of pixels with large pixel values in the rectangular window is equal to or larger than a certain number, an area of the rectangular window can be assumed to be a difference area. Other methods may be used instead.

As described above, according to the present embodiment, the converted image generating unit 2001 performs a geometric transformation for correcting a geometric deviation between an input image and a reference image on the input image and outputs a converted image. The large difference area detecting unit 2004 outputs information on an area including an area in which a difference between the converted image and the reference image is equal to or larger than a prescribed value as difference area information. In addition, the large difference area detecting unit 2004 can output information on an area including an area in which a difference between the converted image and the reference image is equal to or larger than a prescribed value among an area in which an object exists among the reference image as difference area information.

According to the present embodiment, in a similar manner to the second and third embodiments, since a difference area in a reference image can be estimated even without having to register the difference area in the reference image in a database in advance, the present embodiment is effective when information regarding a difference area cannot be registered in advance in an article inspection system that utilizes object identification (for example, when exclusively distinguishing products with a defect in one part or another from among a large number of products). In addition, while estimation of a difference area in the reference image according to the present embodiment can be performed regardless of whether the difference area is an entire object or a part of the object, since the difference area is estimated after removing the influence of a background by first estimating an object area in a similar manner to the third embodiment, the difference area can be estimated with high accuracy. Accordingly, the present embodiment is particularly effective in cases such as the examples shown in FIGS. 10 and 11.

Fifth Embodiment

A fifth embodiment of the present invention will be described with reference to the drawings.

Figure 20:
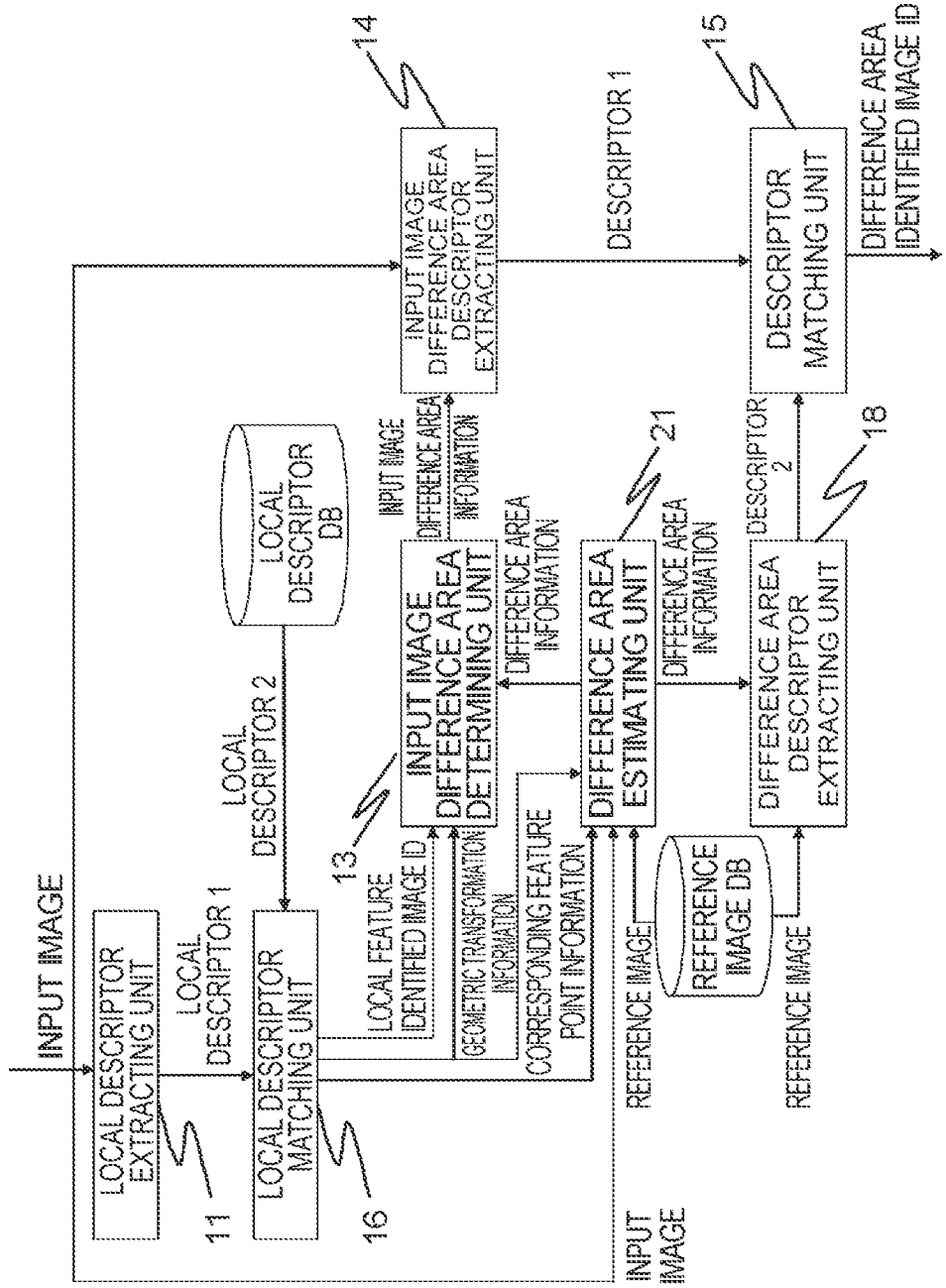
FIG. 20 is a block diagram representing a configuration example of an object identification apparatus according to a fifth embodiment.

FIG. 20 is a block diagram showing a configuration of an object identification apparatus according to the fifth embodiment of the present invention. As shown in FIG. 20, the object identification apparatus according to the fifth embodiment includes a local descriptor extracting unit 11, a local descriptor matching unit 16, an input image difference area determining unit 13, an input image difference area descriptor extracting unit 14, a descriptor matching unit 15, a difference area estimating unit 21, and a difference area descriptor extracting unit 18. As described above, the object identification apparatus according to the fifth embodiment is configured so as to combine the object identification apparatus according to the third embodiment and the object identification apparatus according to the fourth embodiment. The object identification apparatus according to the fifth embodiment differs from the object identification apparatus according to the third embodiment in that the difference area estimating unit 19 has been changed to the difference area estimating unit 21. Details of the difference area estimating unit 21 will be described later. Since other components are similar to those of the third embodiment, the components will be denoted by same reference symbols and a detailed description thereof will be omitted.

FIGS. 21 to 24 are block diagrams representing configuration examples of the difference area estimating unit 21. Each drawing will be described below.

Figure 21:
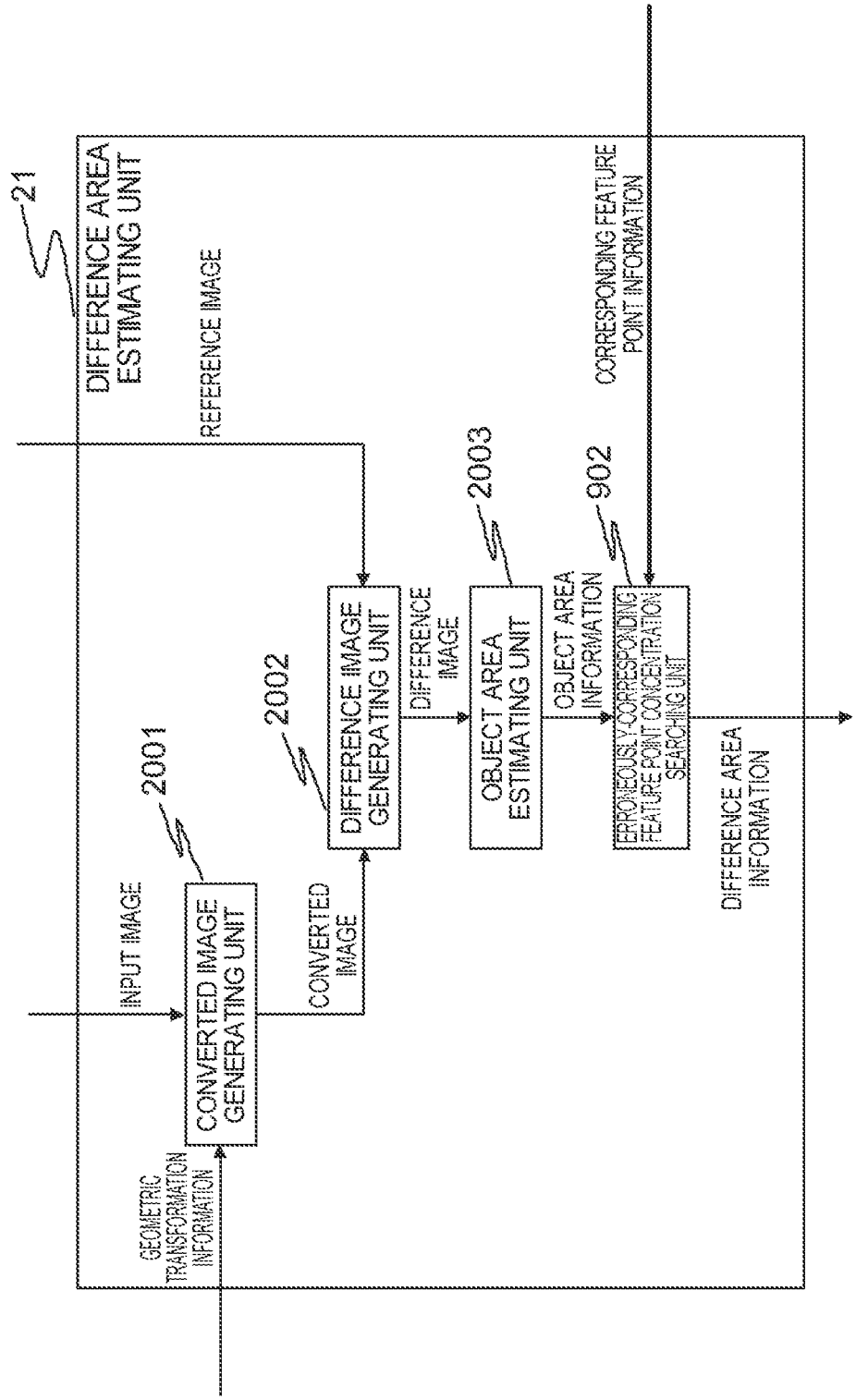
FIG. 21 is a block diagram representing a configuration example of a difference area estimating unit 21.

The difference area estimating unit 21 shown in FIG. 21 includes a converted image generating unit 2001, a difference image generating unit 2002, an object area estimating unit 2003, and an erroneously-corresponding feature point concentration searching unit 902. The converted image generating unit 2001, the difference image generating unit 2002, and the object area estimating unit 2003 shown in FIG. 21 are the same as the converted image generating unit 2001, the difference image generating unit 2002, and the object area estimating unit 2003 that are components of the difference area estimating unit 20 shown in FIG. 19 and a detailed description thereof will be omitted. In addition, the erroneously-corresponding feature point concentration searching unit 902 shown in FIG. 21 is the same as the erroneously-corresponding feature point concentration searching unit 902 that is a component of the difference area estimating unit 19 shown in FIG. 17 and a detailed description thereof will be omitted.

Specifically, instead of searching for an area with a concentration of erroneously-corresponding feature points among an object area that is estimated by only using a reference image as in the case of the difference area estimating unit 19, the difference area estimating unit 21 estimates a difference area by searching for an area with a concentration of erroneously-corresponding feature points among an object area that is estimated by using a difference between a converted input image and a reference image.

Figure 22:
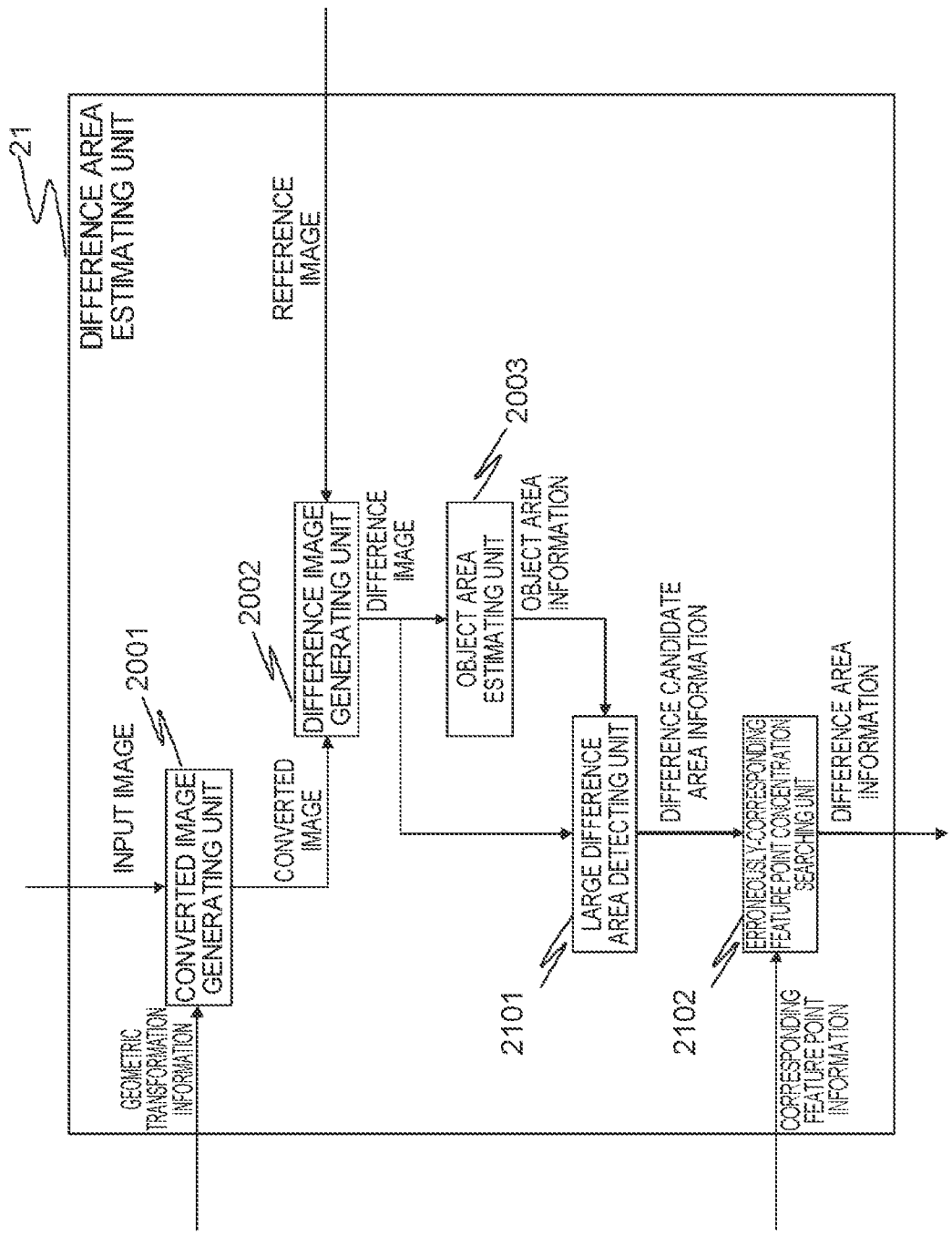
FIG. 22 is a block diagram representing a configuration example of the difference area estimating unit 21.

In addition, the difference area estimating unit 21 shown in FIG. 22 includes a converted image generating unit 2001, a difference image generating unit 2002, an object area estimating unit 2003, a large difference area detecting unit 2101, and an erroneously-corresponding feature point concentration searching unit 2102. The converted image generating unit 2001, the difference image generating unit 2002, and the object area estimating unit 2003 shown in FIG. 22 are the same as the converted image generating unit 2001, the difference image generating unit 2002, and the object area estimating unit 2003 that are components of the difference area estimating unit 20 shown in FIG. 19 and a detailed description thereof will be omitted.

The large difference area detecting unit 2101 shown in FIG. 22 is substantially the same as the large difference area detecting unit 2004 that is a component of the difference area estimating unit 20 shown in FIG. 19 but differs in that the large difference area detecting unit 2101 outputs difference candidate area information instead of difference area information. The difference candidate area information outputted by the large difference area detecting unit 2101 may be the same as difference area information outputted by the large difference area detecting unit 2004 or area information representing an area that is slightly larger than the difference area information may be adopted instead.

The erroneously-corresponding feature point concentration searching unit 2102 shown in FIG. 22 is similar to the erroneously-corresponding feature point concentration searching unit 902 that is a component of the difference area estimating unit 19 shown in FIG. 17 but differs in that difference candidate area information is inputted instead of object area information. For the difference area information that is outputted from the erroneously-corresponding feature point concentration searching unit 2102, since a difference area is further narrowed down by the erroneously-corresponding feature point concentration searching unit 2102 from difference candidate areas estimated by a combination of four units, namely, the converted image generating unit 2001, the difference image generating unit 2002, the object area estimating unit 2003, and the large difference area detecting unit 2101. Therefore, highly accurate difference area information is outputted.

Figure 23:
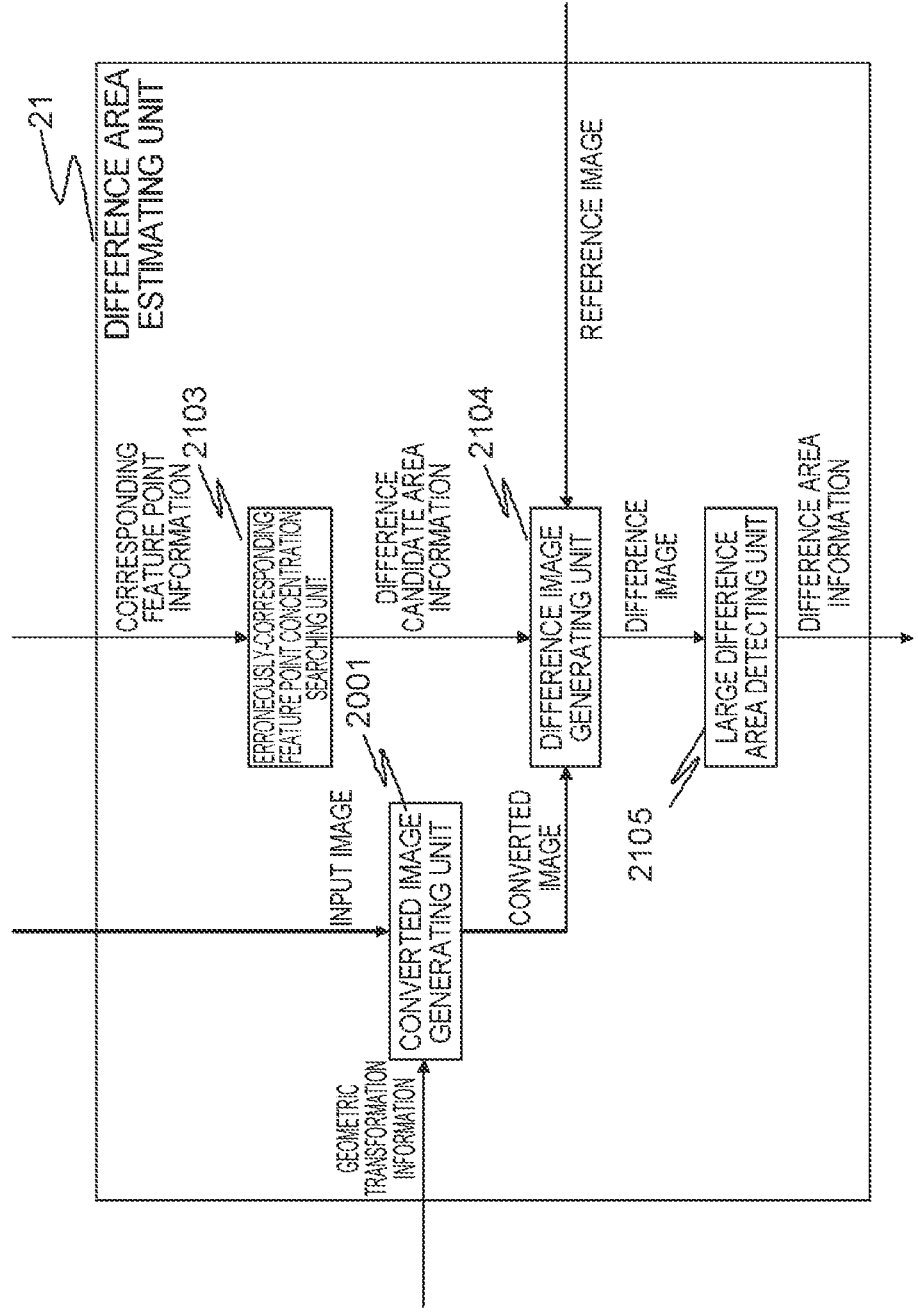
FIG. 23 is a block diagram representing a configuration example of the difference area estimating unit 21.

In addition, the difference area estimating unit 21 shown in FIG. 23 includes a converted image generating unit 2001, an erroneously-corresponding feature point concentration searching unit 2103, a difference image generating unit 2104, and a large difference area detecting unit 2105. The converted image generating unit 2001 shown in FIG. 23 is the same as the converted image generating unit 2001 that is a component of the difference area estimating unit 20 shown in FIG. 19 and a detailed description thereof will be omitted.

The erroneously-corresponding feature point concentration searching unit 2103 shown in FIG. 23 is substantially the same as the erroneously-corresponding feature point concentration searching unit 701 that is a component of the difference area estimating unit 17 shown in FIG. 14 but differs in that the erroneously-corresponding feature point concentration searching unit 2103 outputs difference candidate area information instead of difference area information. The difference candidate area information outputted by the erroneously-corresponding feature point concentration searching unit 2103 may be the same as difference area information outputted by the erroneously-corresponding feature point concentration searching unit 701 or area information representing an area slightly larger than the difference area information may be adopted instead.

The difference image generating unit 2104 shown in FIG. 23 is similar to the difference image generating unit 2002 that is a component of the difference area estimating unit 20 shown in FIG. 19 but differs in that difference candidate area information is inputted in addition to a reference image and a converted image. The difference image generating unit 2104 outputs, as a difference image, an image of an area indicated by difference candidate area information from a difference image generated by calculating a difference between the reference image and the converted image.

The large difference area detecting unit 2105 shown in FIG. 23 is similar to the large difference area detecting unit 2004 that is a component of the difference area estimating unit 20 shown in FIG. 19 but differs in that only a difference image is inputted. Since the difference image inputted to the large difference area detecting unit 2105 is a difference image outputted only with respect to an area that is already estimated to be a difference candidate area by the erroneously-corresponding feature point concentration searching unit 2103, even at this stage, the image already shows an entire object area or a part of an object area. Since the difference area information outputted from the large difference area detecting unit 2105 represents a difference area further narrowed down by the large difference area detecting unit 2402 from difference candidate areas estimated by the erroneously-corresponding feature point concentration searching unit 2103, difference area information with high reliability is outputted.

Figure 24:
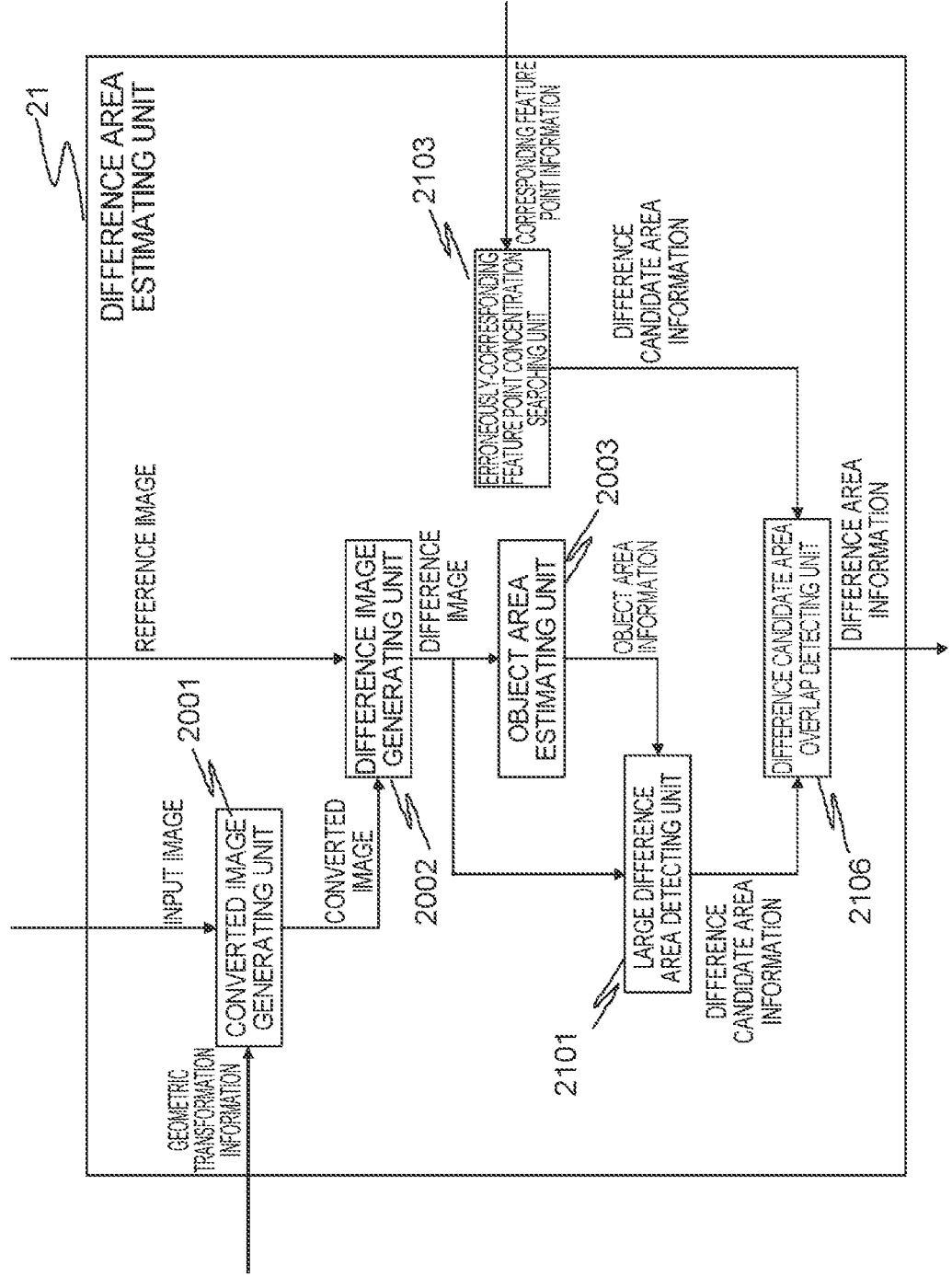
FIG. 24 is a block diagram representing a configuration example of the difference area estimating unit 21.

In addition, the difference area estimating unit 21 shown in FIG. 24 includes a converted image generating unit 2001, a difference image generating unit 2002, an object area estimating unit 2003, a large difference area detecting unit 2101, an erroneously-corresponding feature point concentration searching unit 2103, and a difference candidate area overlap detecting unit 2106. The converted image generating unit 2001, the difference image generating unit 2002, and the object area estimating unit 2003 shown in FIG. 24 are the same as the converted image generating unit 2001, the difference image generating unit 2002, and the object area estimating unit 2003 that are components of the difference area estimating unit 20 shown in FIG. 19 and a detailed description thereof will be omitted. The large difference area detecting unit 2101 shown in FIG. 24 is the same as the large difference area detecting unit 2101 shown in FIG. 22 and a detailed description thereof will be omitted. In addition, the erroneously-corresponding feature point concentration searching unit 2103 shown in FIG. 24 is the same as the erroneously-corresponding feature point concentration searching unit 2103 shown in FIG. 23 and a detailed description thereof will be omitted.

The difference candidate area overlap detecting unit 2106 shown in FIG. 24 receives the difference candidate area information outputted from the large difference area detecting unit 2101 and the difference candidate area information outputted from the erroneously-corresponding feature point concentration searching unit 2103, determines that an overlapping area of the two difference candidate areas to be a difference area, and outputs difference area information thereof. Since the difference area information outputted from the difference candidate area overlap detecting unit 2106 is information regarding an area determined to be a difference candidate area by both the large difference area detecting unit 2101 and the erroneously-corresponding feature point concentration searching unit 2103, highly reliable difference area information is outputted.

According to the present embodiment, in a similar manner to the second, third, and fourth embodiments, since a difference area in a reference image can be estimated even without having to register the difference area in the reference image in a database in advance, the present embodiment is effective in cases where information regarding a difference area cannot be registered in advance in an article inspection system that utilizes object identification such as when exclusively distinguishing products with a defect in one part or another from among a large number of products. In addition, while a difference area in a reference image can be estimated according to the present embodiment regardless of whether the difference area is an entire object or a part of the object, since a highly reliable difference area can be obtained as compared to the second embodiment and the like, highly accurate identification can be achieved. Moreover, in the present embodiment, an object area estimating unit may be added in front of the erroneously-corresponding feature point concentration searching unit 2103 if the difference area estimating unit 21 is configured as shown in FIG. 23 or 24. In such a case, a difference candidate area is to be estimated by performing an erroneously-corresponding feature point concentration search among an estimated object area. At this point, since a difference area can be estimated after first removing the influence of a background in a similar manner to the third and fourth embodiments, the present embodiment is particularly effective in cases such as the examples shown in FIGS. 10 and 11.

Sixth Embodiment

A sixth embodiment of the present invention will be described with reference to the drawings.

Figure 25:
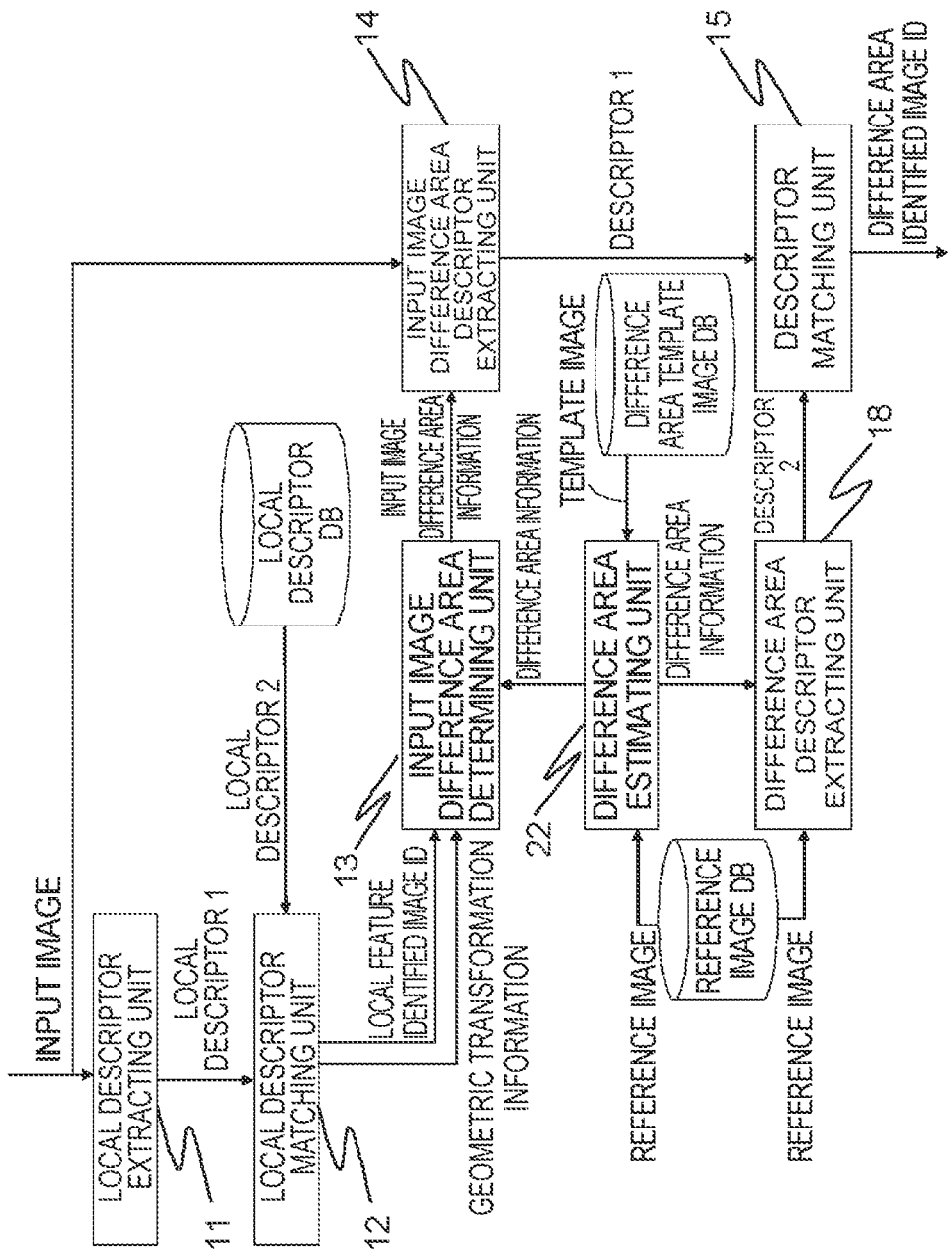
FIG. 25 is a block diagram representing a configuration example of an object identification apparatus according to a sixth embodiment.

FIG. 25 is a block diagram showing a configuration of an object identification apparatus according to the sixth embodiment of the present invention. As shown in FIG. 25, the object identification apparatus according to the sixth embodiment includes a local descriptor extracting unit 11, a local descriptor matching unit 12, an input image difference area determining unit 13, an input image difference area descriptor extracting unit 14, a descriptor matching unit 15, a difference area estimating unit 22, and a difference area descriptor extracting unit 18. As described above, the object identification apparatus according to the sixth embodiment differs from the fourth embodiment in that the difference area estimating unit 20 of the object identification apparatus according to the fourth embodiment has been changed to the difference area estimating unit 22. Details of the difference area estimating unit 22 will be described later. Since other components are similar to those of the fourth embodiment, the components will be denoted by same reference symbols and a detailed description thereof will be omitted.

Figure 26:
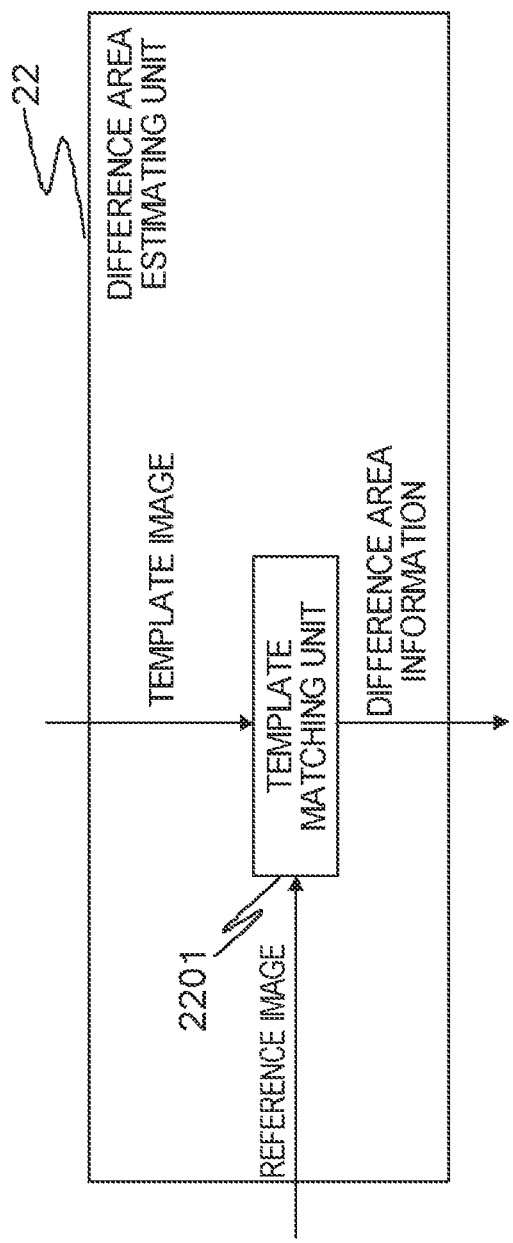
FIG. 26 is a block diagram representing a configuration example of a difference area estimating unit 22.
Figure 27:
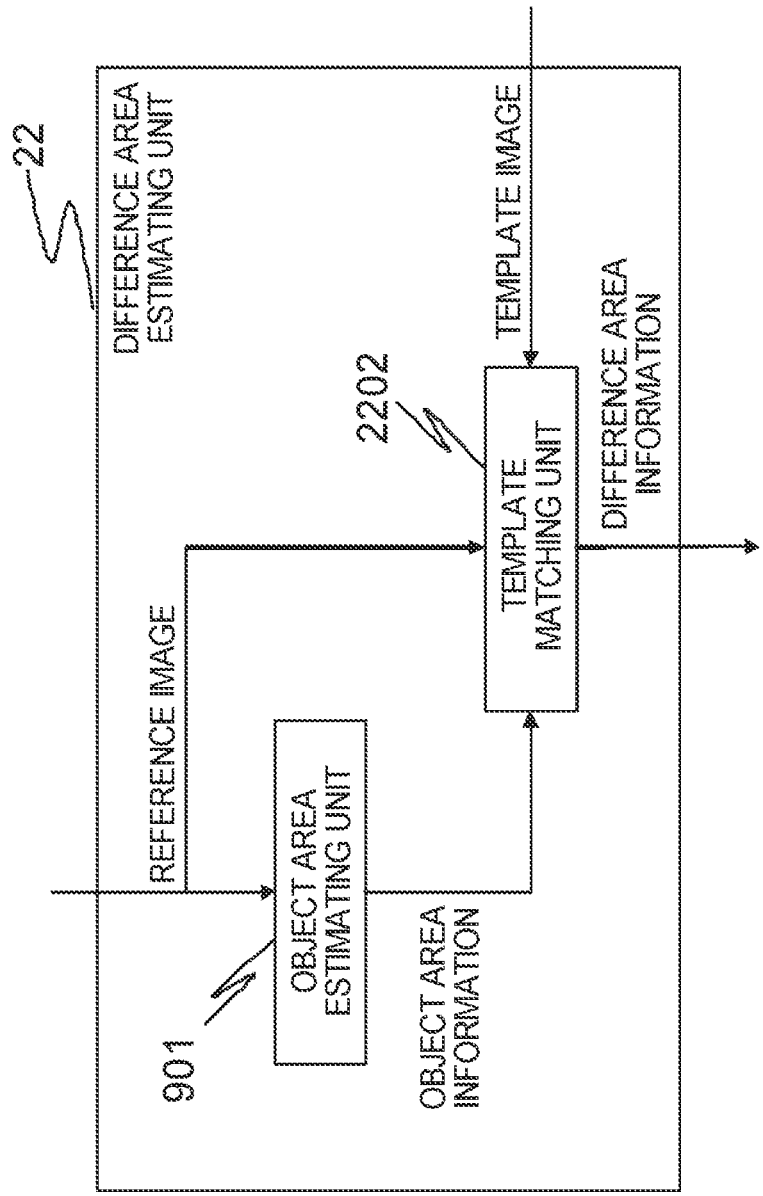
FIG. 27 is a block diagram representing a configuration example of the difference area estimating unit 22.

FIGS. 26 and 27 are block diagrams representing configuration examples of the difference area estimating unit 22. Each drawing will be described below.

As shown in FIG. 26, the difference area estimating unit 22 includes a template matching unit 2201. The template matching unit 2201 receives a reference image corresponding to a local feature identified image ID outputted from the local descriptor matching unit 12 (or a reference image group associated with the local feature identified image ID) and, at the same time, receives a template image of a difference area corresponding to the local feature identified image ID outputted from the local descriptor matching unit 12 (or a template image group associated with the local feature identified image ID), and outputs difference area information based on the received image group. Specifically, the template image is an image pattern that is typically observed in a periphery of a difference area. The template matching unit 2201 estimates a difference area in a reference image by performing a template matching process in which each area in the reference image is matched with the template image and an area most similar to the template image is searched. In other words, an area whose degree of similarity with a prescribed pattern image is equal to or higher than a prescribed value among the reference image is set as the difference area in the reference image. The template image may be stored in advance in a database as shown in FIG. 25 or may be acquired from outside of the object identification apparatus.

Alternatively, as a modification, the difference area estimating unit 22 may include an object area estimating unit 901 and a template matching unit 2202 as shown in FIG. 27. The object area estimating unit 901 shown in FIG. 27 is the same as the object area estimating unit 901 that is a component of the difference area estimating unit 19 shown in FIG. 17 and a detailed description thereof will be omitted.

The template matching unit 2202 is similar to the template matching unit 2201 that is a component of the difference area estimating unit 22 shown in FIG. 26. The template matching unit 2202 differs from the template matching unit 2201 in that object area information outputted from the object area estimating unit 901 is inputted in addition to the reference image corresponding to the local feature identified image ID outputted from the local descriptor matching unit 12 and the template image of a difference area corresponding to the local feature identified image ID outputted from the local descriptor matching unit 12. The template matching unit 2202 can estimate a difference area in a reference image by performing template matching using a template image only on an object area in the reference image. In addition, with the template matching unit 2202, since a range of an area in the reference image to be matched with the template image is limited, the template matching unit 2202 is capable of performing processes at a higher speed than the template matching unit 2201 which matches a range of an area equal to the entire reference image with the template image.

In the present embodiment, while a difference area in a reference image need not be registered in advance in a database in a similar manner to the second to fifth embodiments, if an image pattern typically observed in the difference area is known in advance, the difference area can be estimated by using the image pattern as a template image. For example, when exclusively identifying specific mail from among a plurality of mail images which show a same envelope and only differ from one another in addresses, an area where the address is described can be defined as an image pattern in which a layout of character strings representing a postal code, an address, an addressee, and the like is more or less determined. Therefore, in such cases, the present embodiment is effective. In addition, while estimation of a difference area in the reference image according to the present embodiment can be performed regardless of whether the difference area is an entire object or a part of the object, since the difference area can be estimated after removing the influence of a background by first estimating an object area in a similar manner to the third to fifth embodiments when the difference area estimating unit 22 is configured as shown in FIG. 27, the difference area can be estimated with high accuracy. Accordingly, the present embodiment is particularly effective in cases such as the examples shown in FIGS. 10 and 11.

Seventh Embodiment

A seventh embodiment of the present invention will be described with reference to the drawings.

Figure 28:
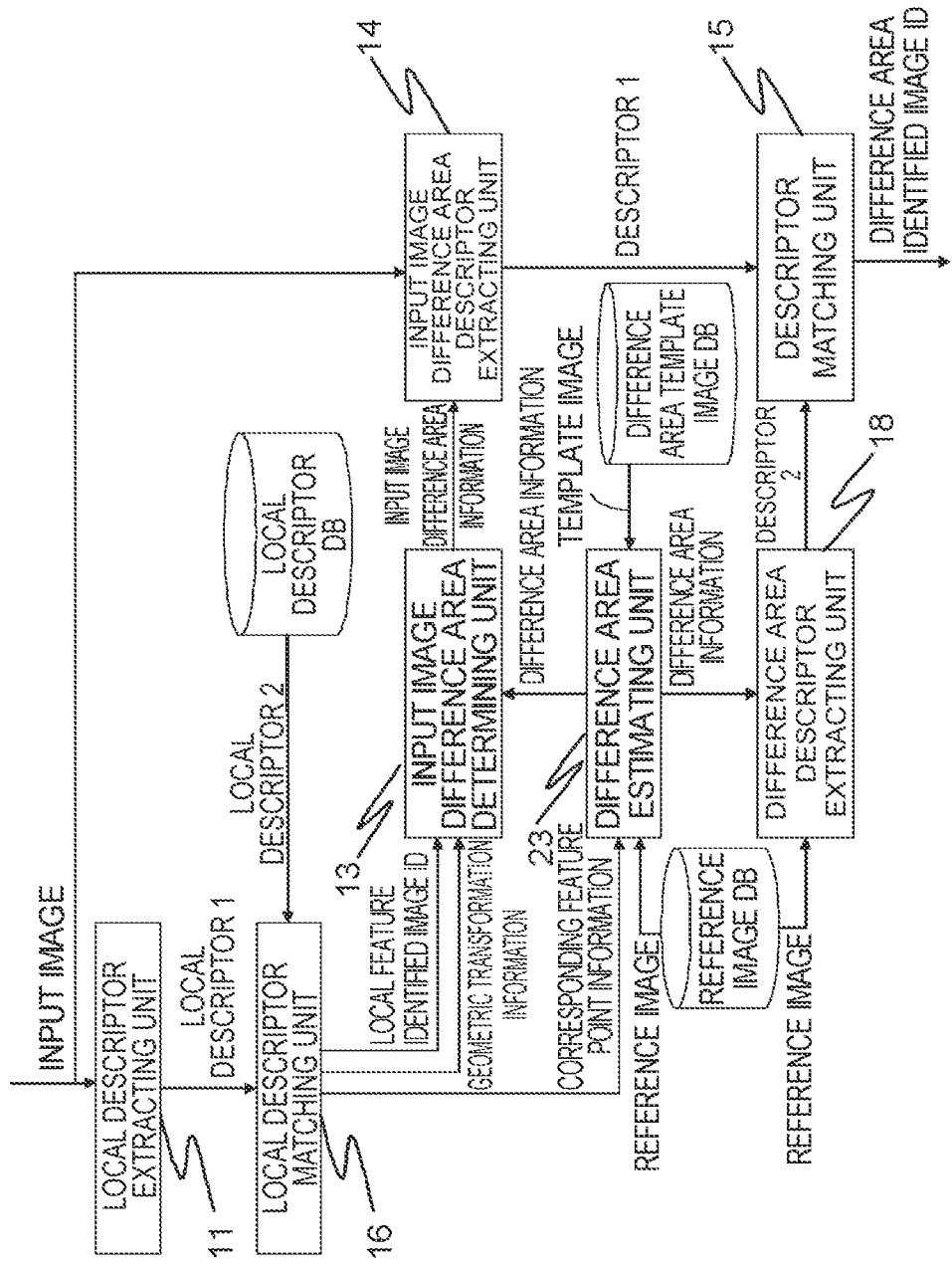
FIG. 28 is a block diagram representing a configuration example of an object identification apparatus according to a seventh embodiment.

FIG. 28 is a block diagram showing a configuration of an object identification apparatus according to the seventh embodiment of the present invention. As shown in FIG. 28, the object identification apparatus according to the seventh embodiment includes a local descriptor extracting unit 11, a local descriptor matching unit 16, an input image difference area determining unit 13, an input image difference area descriptor extracting unit 14, a descriptor matching unit 15, a difference area estimating unit 23, and a difference area descriptor extracting unit 18. As described above, the object identification apparatus according to the seventh embodiment is configured so as to combine the object identification apparatus according to the second embodiment and the object identification apparatus according to the sixth embodiment. The object identification apparatus according to the seventh embodiment differs from the object identification apparatus according to the second embodiment in that the difference area estimating unit 17 has been changed to the difference area estimating unit 23. Details of the difference area estimating unit 23 will be described later. Since other components are similar to those of the second embodiment, the components will be denoted by same reference symbols and a detailed description thereof will be omitted.

Figure 29:
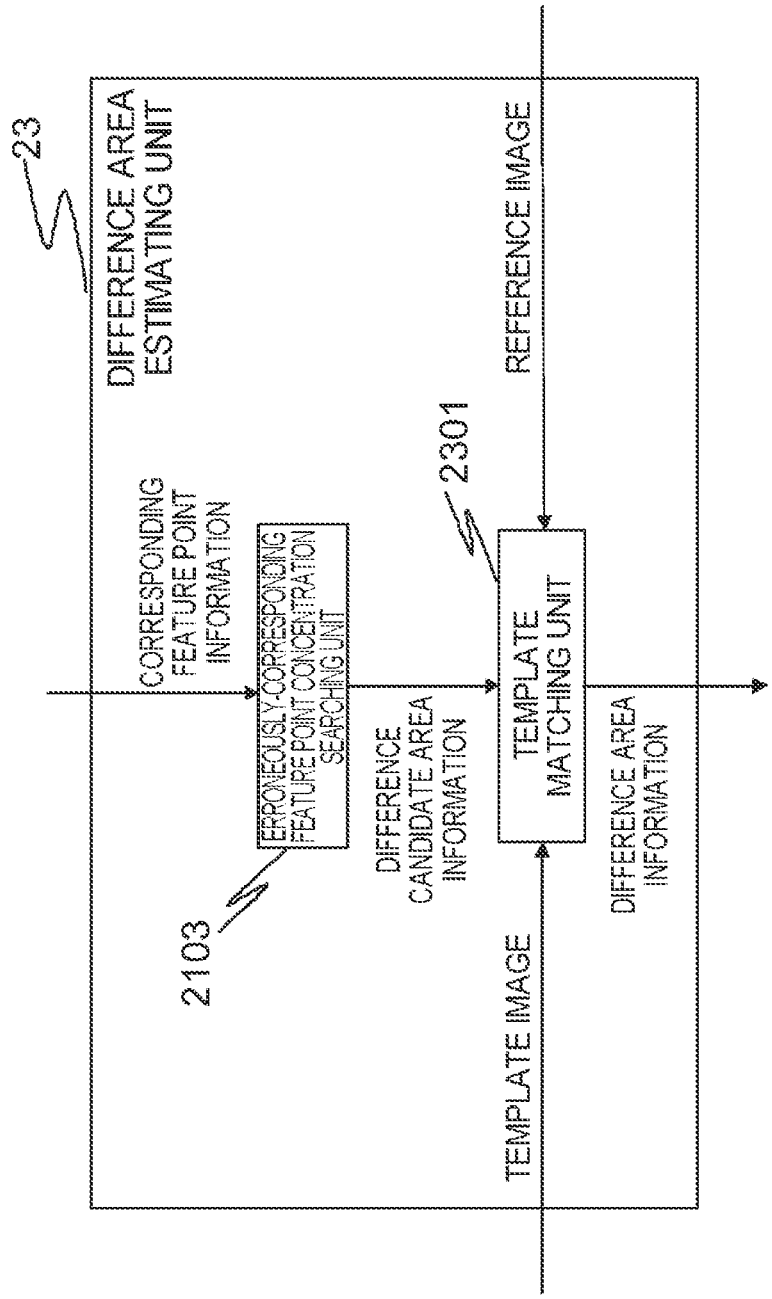
FIG. 29 is a block diagram representing a configuration example of a difference area estimating unit 23.
Figure 30:
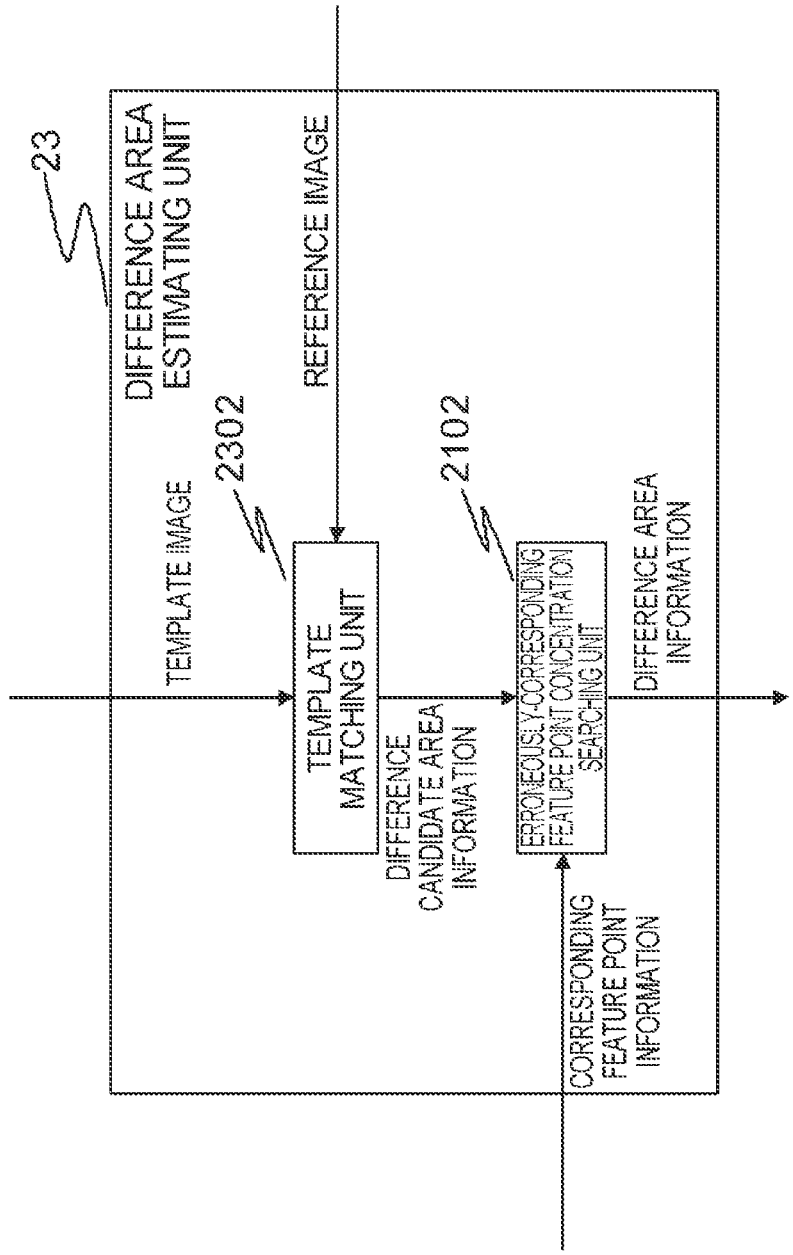
FIG. 30 is a block diagram representing a configuration example of the difference area estimating unit 23.
Figure 31:
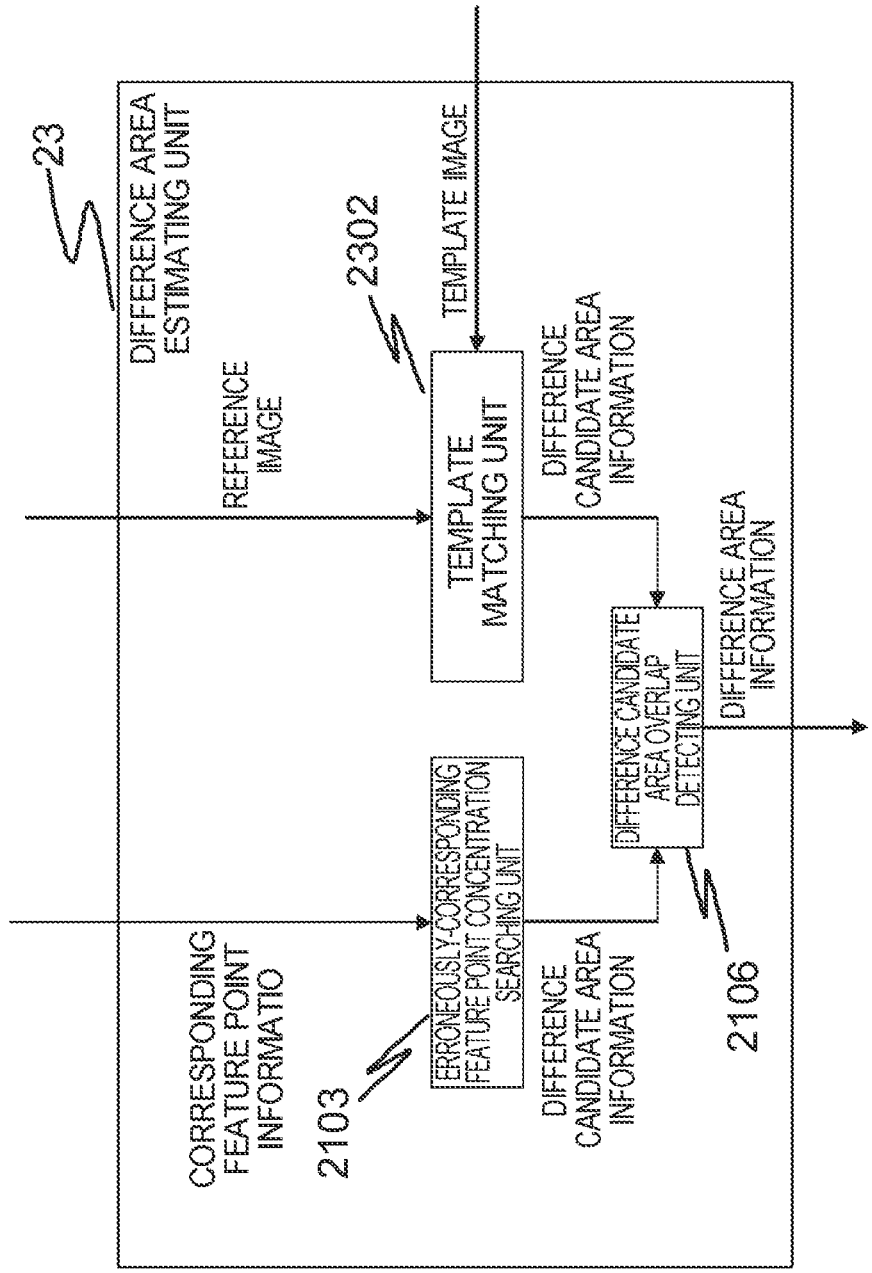
FIG. 31 is a block diagram representing a configuration example of the difference area estimating unit 23.

FIGS. 29, 30, and 31 are block diagrams representing configuration examples of the difference area estimating unit 23. Each drawing will be described below.

The difference area estimating unit 23 shown in FIG. 29 includes an erroneously-corresponding feature point concentration searching unit 2103 and a template matching unit 2301. The erroneously-corresponding feature point concentration searching unit 2103 shown in FIG. 29 is the same as the erroneously-corresponding feature point concentration searching unit 2103 that is a component of the difference area estimating unit 21 shown in FIG. 23 and a detailed description thereof will be omitted.

In addition, the template matching unit 2301 shown in FIG. 29 is similar to the template matching unit 2202 that is a component of the difference area estimating unit 22 shown in FIG. 27 but differs in that difference candidate area information is inputted instead of object area information. In other words, the template matching unit 2301 shown in FIG. 29 estimates a difference area in a reference image by performing template matching using a template image only on a difference candidate area in the reference image that is estimated by the erroneously-corresponding feature point concentration searching unit 2103. Since the difference area information outputted from the template matching unit 2301 represents a difference area further narrowed down by the template matching unit 2301 from difference candidate areas estimated by the erroneously-corresponding feature point concentration searching unit 2103, difference area information with high reliability is outputted.

Furthermore, the difference area estimating unit 23 shown in FIG. 30 can also be constituted by a template matching unit 2302 and an erroneously-corresponding feature point concentration searching unit 2102. The template matching unit 2302 shown in FIG. 30 is substantially the same as the template matching unit 2201 that is a component of the difference area estimating unit 22 shown in FIG. 26 but differs from the template matching unit 2201 in that the template matching unit 2302 outputs difference candidate area information instead of difference area information. The difference candidate area information outputted by the template matching unit 2302 may be the same as difference area information outputted by the template matching unit 2201 or area information representing an area slightly larger than the difference area information may be adopted instead.

In addition, the erroneously-corresponding feature point concentration searching unit 2102 shown in FIG. 30 is the same as the erroneously-corresponding feature point concentration searching unit 2102 that is a component of the difference area estimating unit 21 shown in FIG. 22 and a detailed description thereof will be omitted. Specifically, the erroneously-corresponding feature point concentration searching unit 2102 shown in FIG. 30 focuses only on points existing inside a difference candidate area in the reference image that is estimated by the template matching unit 2302 among corresponding feature points, searches for an area with a concentration of erroneously-corresponding feature points, and estimates a difference area. Since the difference area information outputted from the erroneously-corresponding feature point concentration searching unit 2102 represents a difference area further narrowed down by the erroneously-corresponding feature point concentration searching unit 2102 from difference candidate areas estimated by the template matching unit 2302, difference area information with high reliability is outputted.

Furthermore, the difference area estimating unit 23 shown in FIG. 31 includes an erroneously-corresponding feature point concentration searching unit 2103, a template matching unit 2302, and a difference candidate area overlap detecting unit 2106. The erroneously-corresponding feature point concentration searching unit 2103 shown in FIG. 31 is the same as the erroneously-corresponding feature point concentration searching unit 2103 that is a component of the difference area estimating unit 21 shown in FIG. 23 and a detailed description thereof will be omitted. The template matching unit 2302 shown in FIG. 31 is the same as the template matching unit 2302 that is a component of the difference area estimating unit 23 shown in FIG. 30 and a detailed description thereof will be omitted. The difference candidate area overlap detecting unit 2106 is the same as the difference candidate area overlap detecting unit 2106 that is a component of the difference area estimating unit 21 shown in FIG. 24 and a detailed description thereof will be omitted.

Since the difference area information outputted from the difference candidate area overlap detecting unit 2106 in the configuration shown in FIG. 31 is information regarding an area determined to be a difference candidate area by both the erroneously-corresponding feature point concentration searching unit 2103 and the template matching unit 2302, highly reliable difference area information is outputted.

In the present embodiment, while a difference area in a reference image need not be registered in advance in a database in a similar manner to the second to sixth embodiments, if an image pattern typically observed in the difference area is known in advance in a similar manner to the sixth embodiment, the difference area can be estimated by using the image pattern as a template image. For example, when exclusively identifying specific mail from among a plurality of mail images which show a same envelope and only differ from one another in addresses, an area where the address is described can be defined as an image pattern in which a layout of character strings representing a postal code, an address, an addressee, and the like is more or less determined. Therefore, in such cases, the present embodiment is effective. In addition, while a difference area in a reference image can be estimated according to the present embodiment regardless of whether the difference area is an entire object or a part of the object, since a highly reliable difference area can be obtained in a similar manner to the fifth embodiment as compared to the second embodiment and the like, highly accurate identification can be achieved. Moreover, while the present embodiment described heretofore represents a configuration combining the object identification apparatus according to the second embodiment with the object identification apparatus according to the sixth embodiment, the configuration shown in FIG. 28 may be considered as a configuration combining the object identification apparatus according to the third embodiment with the object identification apparatus according to the sixth embodiment. Specifically, when the difference area estimating unit 23 is configured as shown in FIGS. 29, 30, and 31, an object area estimating unit can be added in front of the erroneously-corresponding feature point concentration searching unit 2103 and the template matching unit 2302. In this case, since a difference area is to be estimated from among an object area after removing the influence of a background, the configuration is particularly effective in cases such as the examples shown in FIGS. 10 and 11.

Eighth Embodiment

An eighth embodiment of the present invention will be described with reference to the drawings.

Figure 32:
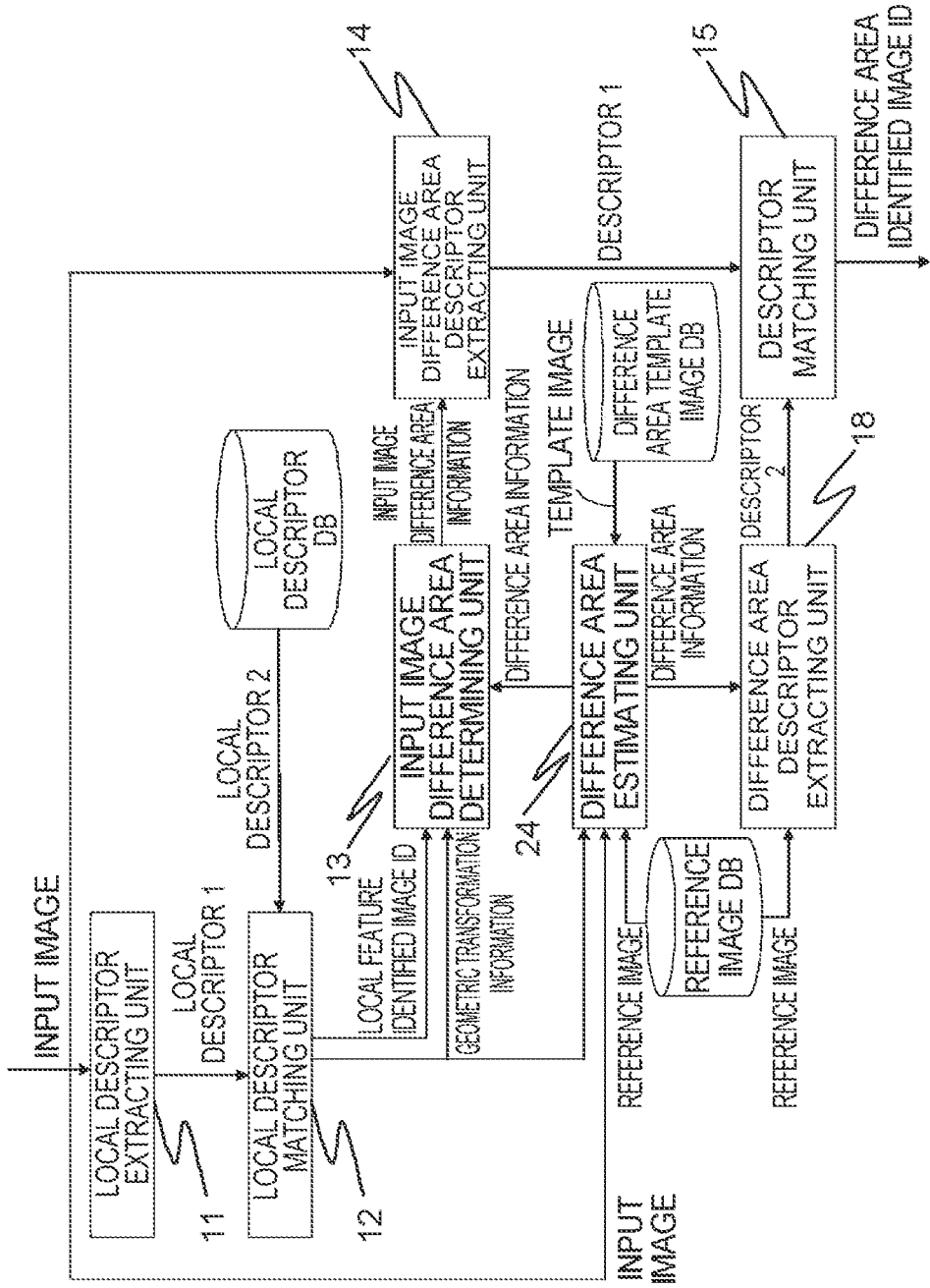
FIG. 32 is a block diagram representing a configuration example of an object identification apparatus according to an eighth embodiment.

FIG. 32 is a block diagram showing a configuration of an object identification apparatus according to the eighth embodiment of the present invention. As shown in FIG. 32, the object identification apparatus according to the eighth embodiment includes a local descriptor extracting unit 11, a local descriptor matching unit 12, an input image difference area determining unit 13, an input image difference area descriptor extracting unit 14, a descriptor matching unit 15, a difference area estimating unit 24, and a difference area descriptor extracting unit 18. As described above, the object identification apparatus according to the eighth embodiment is configured so as to combine the object identification apparatus according to the fourth embodiment with the object identification apparatus according to the sixth embodiment. The object identification apparatus according to the eighth embodiment differs from the object identification apparatus according to the fourth embodiment in that the difference area estimating unit 20 has been changed to the difference area estimating unit 24. Details of the difference area estimating unit 24 will be described later. Since other components are similar to those of the fourth embodiment, the components will be denoted by same reference symbols and a detailed description thereof will be omitted.

Figure 33:
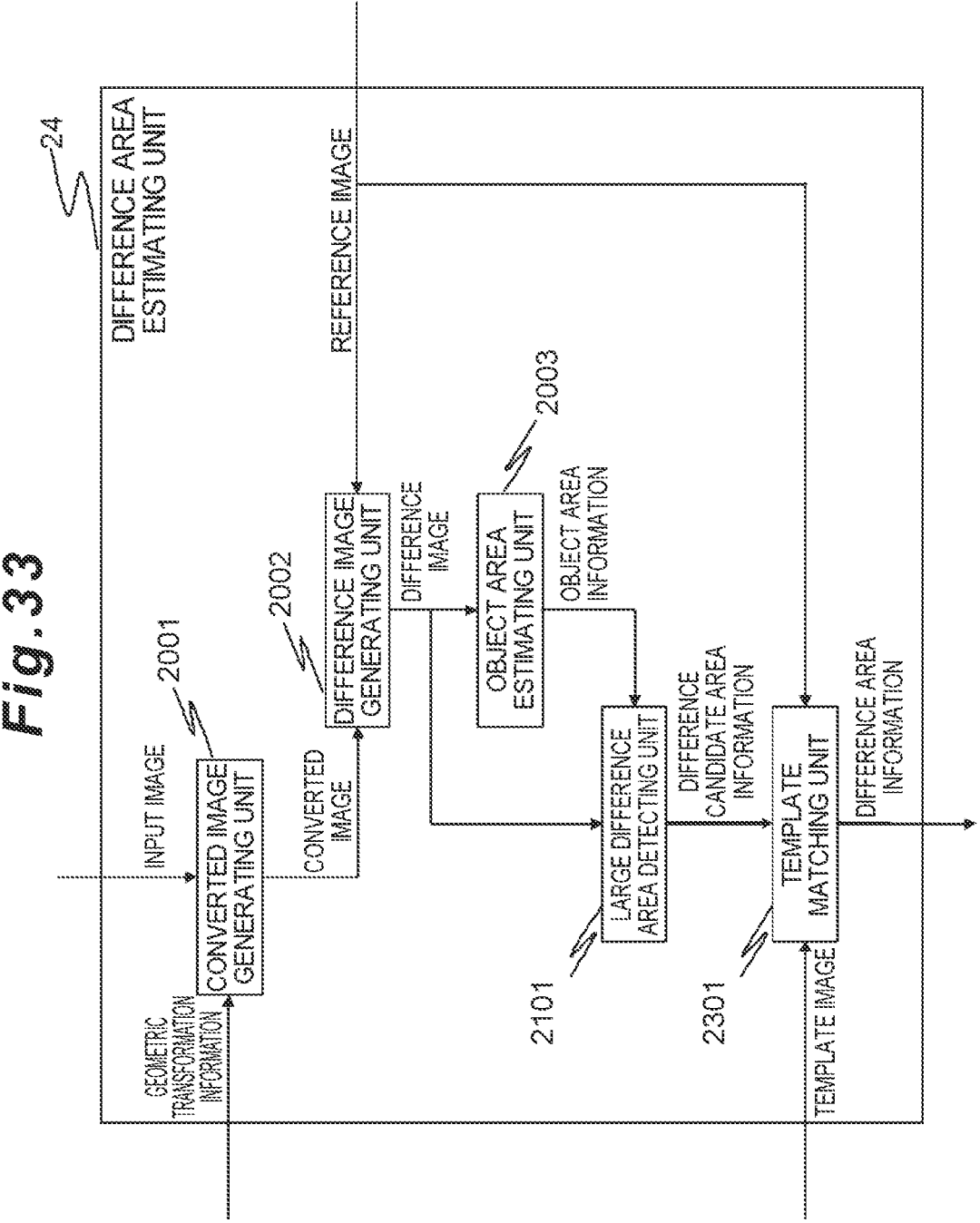
FIG. 33 is a block diagram representing a configuration example of a difference area estimating unit 24.
Figure 34:
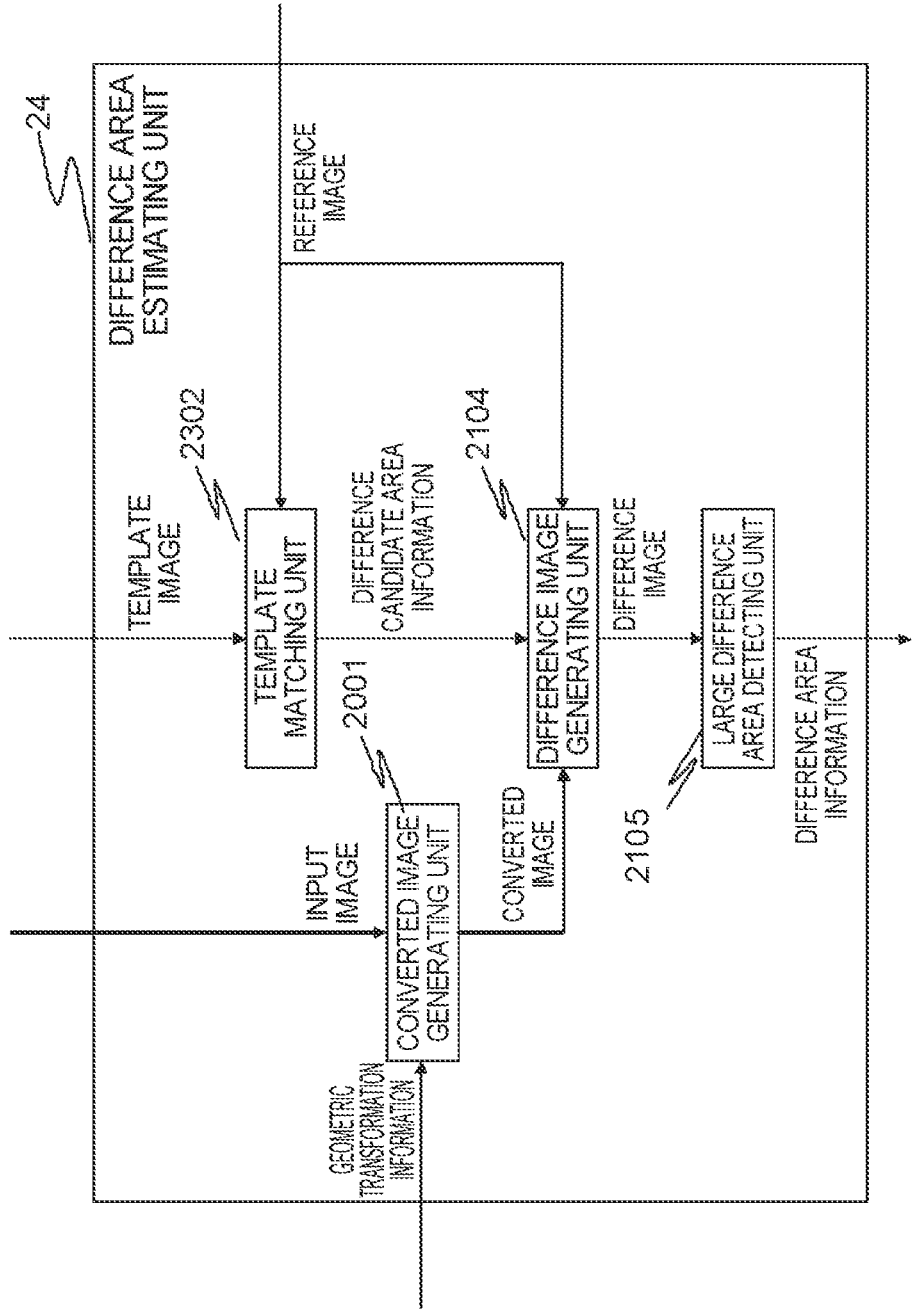
FIG. 34 is a block diagram representing a configuration example of the difference area estimating unit 24.
Figure 35:
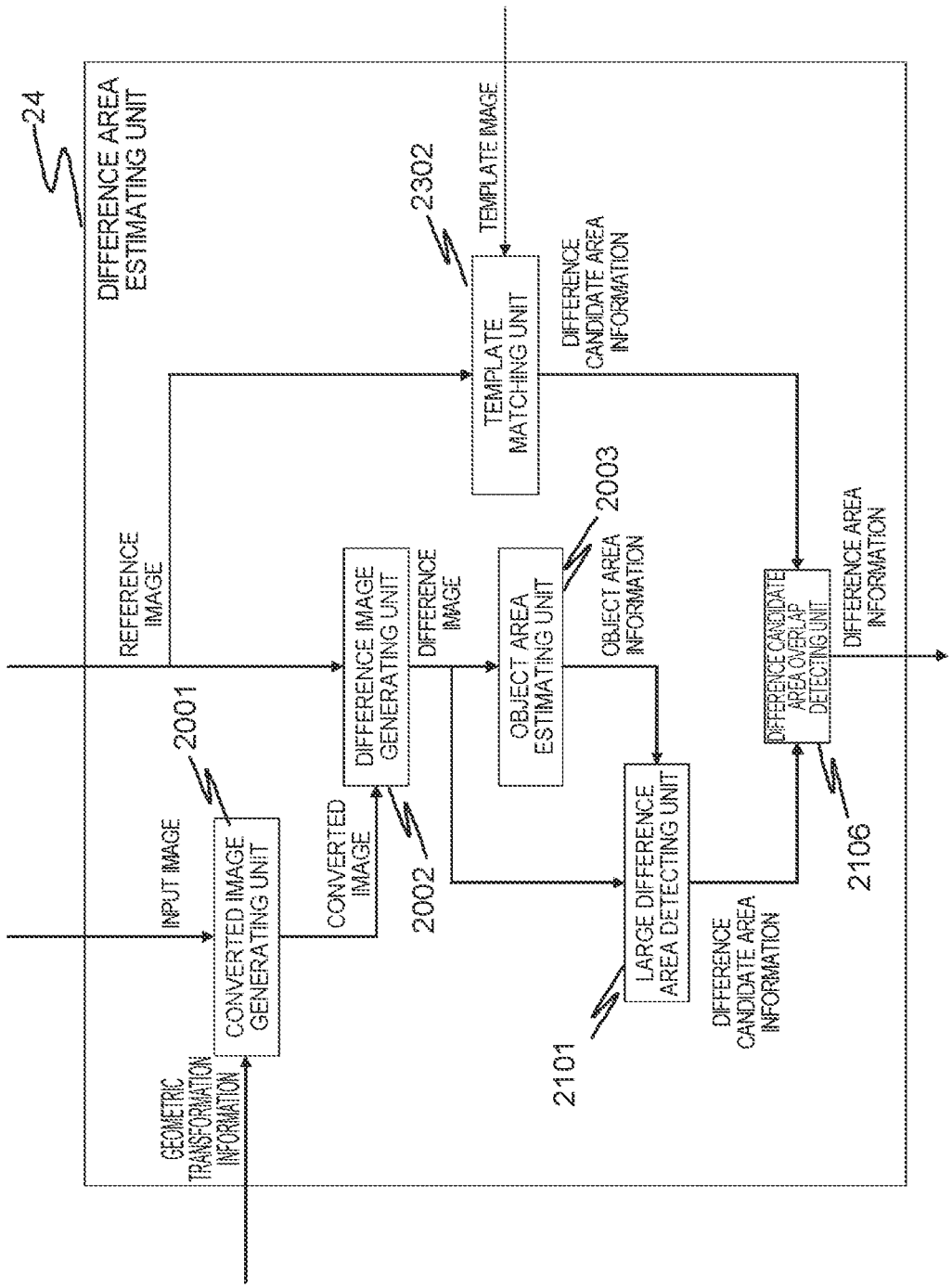
FIG. 35 is a block diagram representing a configuration example of the difference area estimating unit 24.

FIGS. 33 to 35 are block diagrams representing configuration examples of the difference area estimating unit 24. Each drawing will be described below.

The difference area estimating unit 24 shown in FIG. 33 includes a converted image generating unit 2001, a difference image generating unit 2002, an object area estimating unit 2003, a large difference area detecting unit 2101, and a template matching unit 2301. The converted image generating unit 2001, the difference image generating unit 2002, and the object area estimating unit 2003 shown in FIG. 33 are the same as the converted image generating unit 2001, the difference image generating unit 2002, and the object area estimating unit 2003 that are components of the difference area estimating unit 20 shown in FIG. 19 and a detailed description thereof will be omitted. The large difference area detecting unit 2101 shown in FIG. 33 is the same as the large difference area detecting unit 2101 that is a component of the difference area estimating unit 21 shown in FIG. 22 and a detailed description thereof will be omitted. In addition, the template matching unit 2301 shown in FIG. 33 is the same as the template matching unit 2301 that is a component of the difference area estimating unit 23 shown in FIG. 29 and a detailed description thereof will be omitted.

In other words, the template matching unit 2301 shown in FIG. 33 estimates a difference area in a reference image by performing template matching using a template image only on a difference candidate area in the reference image that is estimated by the large difference area detecting unit 2101. Since the difference area information outputted from the template matching unit 2301 represents a difference area further narrowed down by the template matching unit 2301 from difference candidate areas estimated by the large difference area detecting unit 2101, difference area information with high reliability is outputted.

Furthermore, the difference area estimating unit 24 shown in FIG. 34 includes a converted image generating unit 2001, a template matching unit 2302, a difference image generating unit 2104, and a large difference area detecting unit 2105. The converted image generating unit 2001 shown in FIG. 34 is the same as the converted image generating unit 2001 that is a component of the difference area estimating unit 20 shown in FIG. 19 and a detailed description thereof will be omitted. In addition, the template matching unit 2302 shown in FIG. 34 is the same as the template matching unit 2302 that is a component of the difference area estimating unit 23 shown in FIG. 30 and a detailed description thereof will be omitted. The difference image generating unit 2104 and the large difference area detecting unit 2105 shown in FIG. 34 are respectively the same as the difference image generating unit 2104 and the large difference area detecting unit 2105 that are components of the difference area estimating unit 21 shown in FIG. 23 and a detailed description thereof will be omitted.

Since the difference area information outputted from the large difference area detecting unit 2105 represents a difference area further narrowed down by the large difference area detecting unit 2105 from difference candidate areas estimated by the template matching unit 2302, difference area information with high reliability is outputted.

In addition, the difference area estimating unit 24 shown in FIG. 35 includes a converted image generating unit 2001, a difference image generating unit 2002, an object area estimating unit 2003, a large difference area detecting unit 2101, a template matching unit 2302, and a difference candidate area overlap detecting unit 2106.

The converted image generating unit 2001, the difference image generating unit 2002, and the object area estimating unit 2003 shown in FIG. 35 are the same as the converted image generating unit 2001, the difference image generating unit 2002, and the object area estimating unit 2003 that are components of the difference area estimating unit 20 shown in FIG. 19 and a detailed description thereof will be omitted.

In addition, the large difference area detecting unit 2101 shown in FIG. 35 is the same as the large difference area detecting unit 2101 that is a component of the difference area estimating unit 21 shown in FIG. 22 and a detailed description thereof will be omitted. Furthermore, the template matching unit 2302 shown in FIG. 35 is the same as the template matching unit 2302 that is a component of the difference area estimating unit 23 shown in FIG. 30 and a detailed description thereof will be omitted. Moreover, the difference candidate area overlap detecting unit 2106 shown in FIG. 35 is the same as the difference candidate area overlap detecting unit 2106 that is a component of the difference area estimating unit 21 shown in FIG. 24 and a detailed description thereof will be omitted.

Since the difference area information outputted from the difference candidate area overlap detecting unit 2106 in the configuration shown in FIG. 35 is information regarding an area determined to be a difference candidate area by both the large difference area detecting unit 2101 and the template matching unit 2302, highly reliable difference area information is outputted.

In the present embodiment, a difference area in a reference image need not be registered in advance in a database in a similar manner to the second to seventh embodiments, and if an image pattern typically observed in the difference area is known in advance in a similar manner to the sixth and seventh embodiments, the difference area can be estimated by using the image pattern as a template image. For example, when exclusively identifying specific mail from among a plurality of mail images which show a same envelope and only differ from one another in addresses, an area where the address is described can be defined as an image pattern in which a layout of character strings representing a postal code, an address, an addressee, and the like is more or less determined. Therefore, in such cases, the present embodiment is effective. In addition, while a difference area in a reference image can be estimated according to the present embodiment regardless of whether the difference area is an entire object or a part of the object, since a highly reliable difference area can be obtained in a similar manner to the fifth and seventh embodiments as compared to the second embodiment and the like, highly accurate identification can be achieved. Moreover, in the present embodiment, when the difference area estimating unit 24 is configured as shown in FIG. 34 or 35, an object area estimating unit can be added in front of the template matching unit 2302. In this case, since a difference area is to be estimated from among an object area after removing the influence of a background, the configuration is particularly effective in the cases shown in FIGS. 10 and 11.

Ninth Embodiment

A ninth embodiment of the present invention will be described with reference to the drawings.

Figure 36:
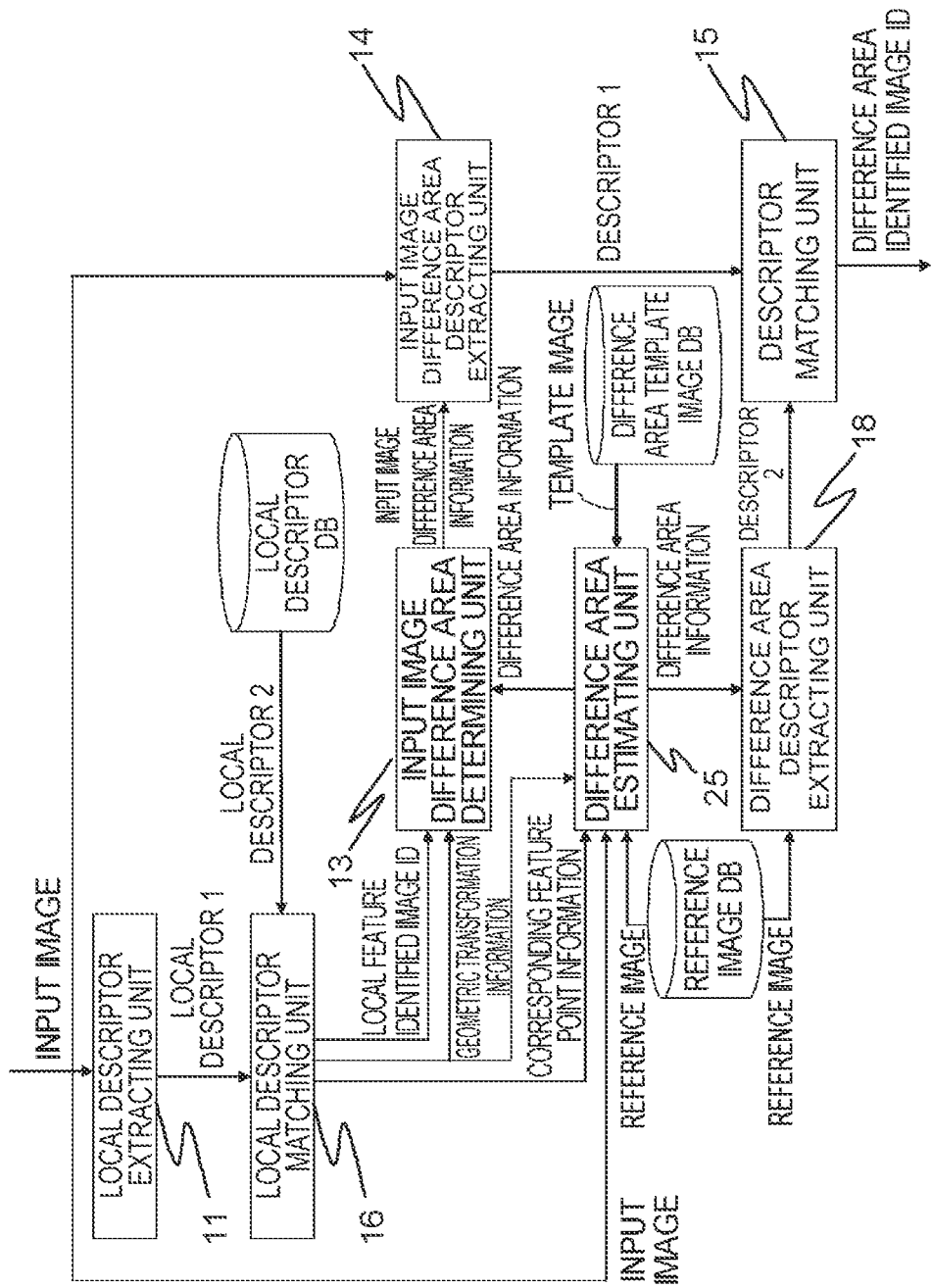
FIG. 36 is a block diagram representing a configuration example of an object identification apparatus according to a ninth embodiment.

FIG. 36 is a block diagram showing a configuration of an object identification apparatus according to the ninth embodiment of the present invention. As shown in FIG. 36, the object identification apparatus according to the ninth embodiment includes a local descriptor extracting unit 11, a local descriptor matching unit 16, an input image difference area determining unit 13, an input image difference area descriptor extracting unit 14, a descriptor matching unit 15, a difference area estimating unit 25, and a difference area descriptor extracting unit 18.

As described above, the object identification apparatus according to the ninth embodiment is configured so as to combine the object identification apparatus according to the fifth embodiment and the object identification apparatus according to the sixth embodiment. The object identification apparatus according to the ninth embodiment differs from the object identification apparatus according to the fifth embodiment in that the difference area estimating unit 21 has been changed to the difference area estimating unit 25. Details of the difference area estimating unit 25 will be described later. Since other components are similar to those of the fifth embodiment, the components will be denoted by same reference symbols and a detailed description thereof will be omitted.

The difference area estimating unit 25 can be configured as a combination of a configuration in which a difference area is estimated solely by the erroneously-corresponding feature point concentration searching unit 701 as shown in FIG. 14, a configuration in which a difference area is estimated by the converted image generating unit 2001, the difference image generating unit 2002, the object area estimating unit 2003, and the large difference area detecting unit 2004 as shown in FIG. 19, and a configuration in which a difference area is estimated solely by the template matching unit 2201 as shown in FIG. 26. When the three configurations for estimating a difference area are configured so that, after difference candidate areas are estimated by one configuration, the difference candidate areas are further narrowed down by another configuration, the three configurations for estimating a difference area may be configured in any order. Alternatively, the three configurations for estimating a difference area may be configured so that a difference candidate area is estimated by each configuration and an overlapping area of the difference candidate areas estimated by the respective configurations is outputted as a final difference area. Alternatively, the three configurations for estimating a difference area may be configured so that difference candidate areas are first estimated by one configuration, the difference candidate areas are respectively narrowed down by the two remaining configurations, and an overlapping area of the difference candidate areas estimated by the two configurations is outputted as a final difference area. Alternatively, the three configurations for estimating a difference area may be configured so that difference candidate areas are first estimated by two configurations, a difference candidate area is narrowed down by the one remaining configuration from overlapping areas of the difference candidate areas estimated by the two configurations, and a narrowed-down area is outputted as a final difference area.

Figure 37:
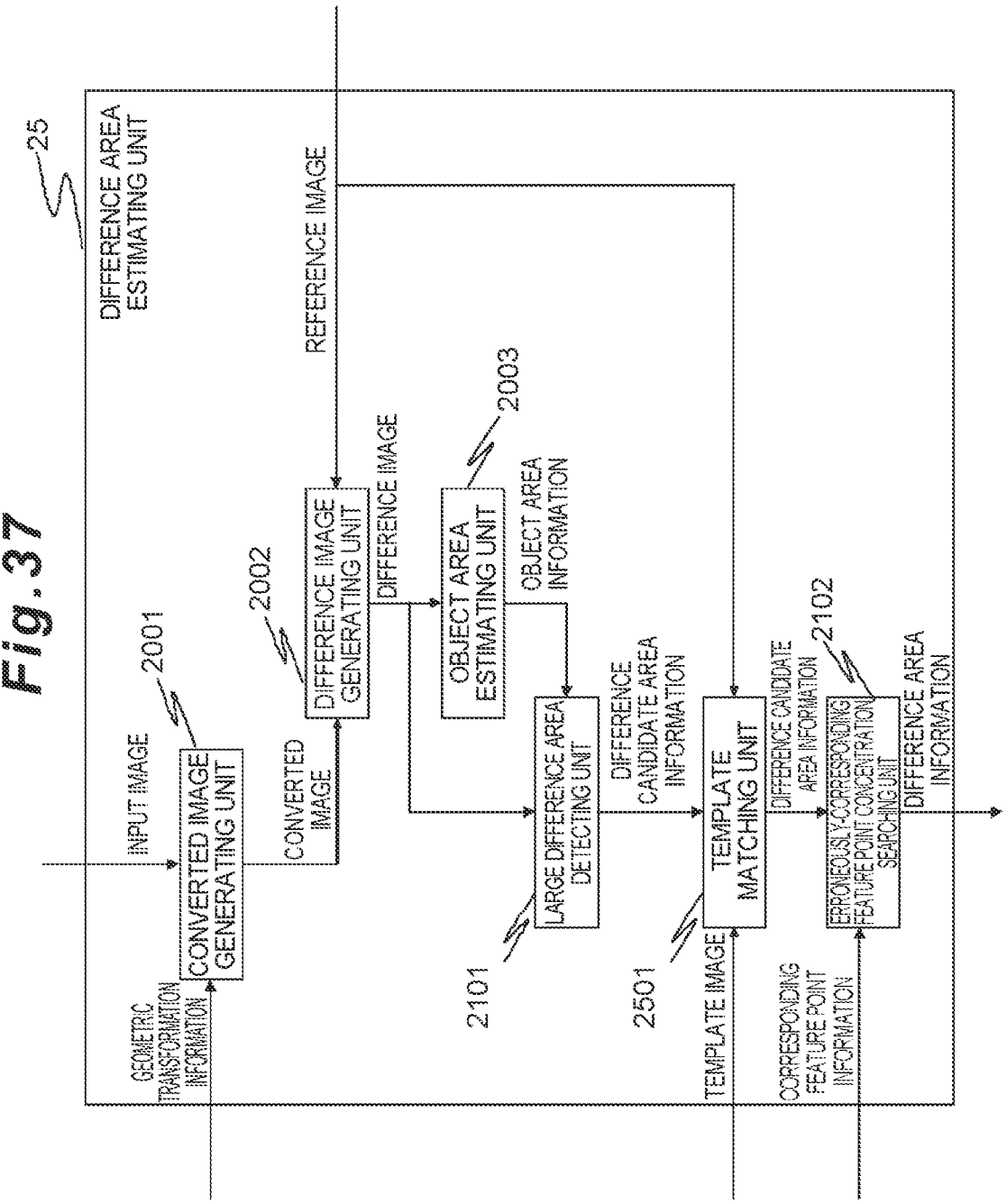
FIG. 37 is a block diagram representing a configuration example of a difference area estimating unit 25.
Figure 38:
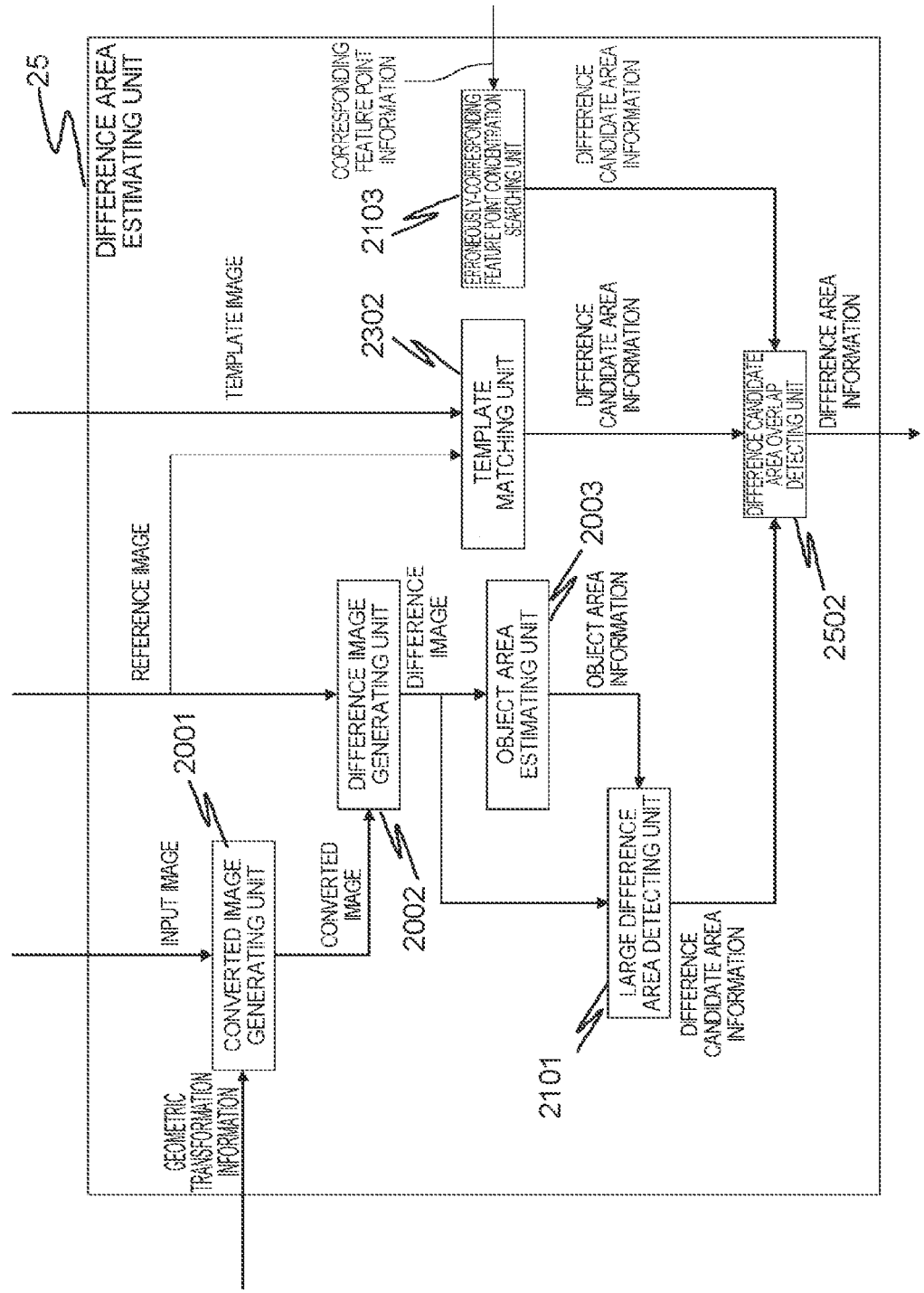
FIG. 38 is a block diagram representing a configuration example of the difference area estimating unit 25.

FIGS. 37 and 38 are block diagrams representing configuration examples of the difference area estimating unit 25. Each drawing will be described below.

As shown in FIG. 37, the difference area estimating unit 25 includes a converted image generating unit 2001, a difference image generating unit 2002, an object area estimating unit 2003, a large difference area detecting unit 2101, a template matching unit 2501, and an erroneously-corresponding feature point concentration searching unit 2102.

The converted image generating unit 2001, the difference image generating unit 2002, and the object area estimating unit 2003 shown in FIG. 37 are the same as the converted image generating unit 2001, the difference image generating unit 2002, and the object area estimating unit 2003 that are components of the difference area estimating unit 20 shown in FIG. 19 and a detailed description thereof will be omitted. The large difference area detecting unit 2101 shown in FIG.

37 is the same as the large difference area detecting unit 2101 shown in FIG. 22 and a detailed description thereof will be omitted.

The template matching unit 2501 shown in FIG. 37 is substantially the same as the template matching unit 2301 that is a component of the difference area estimating unit 23 shown in FIG. 29 but differs in that the template matching unit 2501 outputs difference candidate area information instead of difference area information.

The erroneously-corresponding feature point concentration searching unit 2102 shown in FIG. 37 is the same as the erroneously-corresponding feature point concentration searching unit 2102 that is a component of the difference area estimating unit 21 shown in FIG. 22 and a detailed description thereof will be omitted. Specifically, the erroneously-corresponding feature point concentration searching unit 2102 shown in FIG. 37 focuses only on points existing inside a difference candidate area in the reference image that is estimated by the template matching unit 2501 among corresponding feature points, searches for an area with a concentration of erroneously-corresponding feature points, and estimates a difference area. In addition, the template matching unit 2501 similarly estimates a difference area candidate in a reference image by performing template matching using a template image only on a difference candidate area in the reference image that is estimated by the large difference area detecting unit 2101. Since the difference area information outputted from the erroneously-corresponding feature point concentration searching unit 2102 represents a difference area further narrowed down by the erroneously-corresponding feature point concentration searching unit 2102 from difference candidate areas estimated by the large difference area detecting unit 2101 and the template matching unit 2501, difference area information with high reliability is outputted.

In addition, as shown in FIG. 38, the difference area estimating unit 25 can also be constituted by a converted image generating unit 2001, a difference image generating unit 2002, an object area estimating unit 2003, a large difference area detecting unit 2101, a template matching unit 2302, an erroneously-corresponding feature point concentration searching unit 2103, and a difference candidate area overlap detecting unit 2502. The converted image generating unit 2001, the difference image generating unit 2002, and the object area estimating unit 2003 shown in FIG. 38 are the same as the converted image generating unit 2001, the difference image generating unit 2002, and the object area estimating unit 2003 that are components of the difference area estimating unit 20 shown in FIG. 19 and a detailed description thereof will be omitted. In addition, the large difference area detecting unit 2101 shown in FIG. 38 is the same as the large difference area detecting unit 2101 that is a component of the difference area estimating unit 21 shown in FIG. 22 and a detailed description thereof will be omitted. Furthermore, the template matching unit 2302 shown in FIG. 38 is the same as the template matching unit 2302 that is a component of the difference area estimating unit 23 shown in FIG. 30 and a detailed description thereof will be omitted. Moreover, the erroneously-corresponding feature point concentration searching unit 2103 shown in FIG. 38 is the same as the erroneously-corresponding feature point concentration searching unit 2103 that is a component of the difference area estimating unit 21 shown in FIG. 23 and a detailed description thereof will be omitted.

The difference candidate area overlap detecting unit 2502 shown in FIG. 38 is similar to the difference candidate area overlap detecting unit 2106 that is a component of the difference area estimating unit 21 shown in FIG. 24. The difference candidate area overlap detecting unit 2502 shown in FIG. 38 differs from the difference candidate area overlap detecting unit 2106 in that the difference candidate area overlap detecting unit 2502 receives three pieces of difference candidate area information respectively outputted from the large difference area detecting unit 2101, the template matching unit 2302, and the erroneously-corresponding feature point concentration searching unit 2103, determines that an overlapping area of the three difference candidate areas to be a difference area, and outputs difference area information thereof. Since the difference area information outputted from the difference candidate area overlap detecting unit 2502 is information regarding an area determined to be a difference candidate area by all of the large difference area detecting unit 2101, the template matching unit 2302, and the erroneously-corresponding feature point concentration searching unit 2103, highly reliable difference area information is outputted.

Moreover, the difference area estimating unit 25 can adopt a configuration other than those shown in FIGS. 37 and 38. For example, with respect to difference candidate areas first estimated by the erroneously-corresponding feature point concentration searching unit 2103, the template matching unit 2501 may further narrow down the difference candidate areas. Final difference area information may be further estimated from among the narrowed down difference candidate areas by a combination of the converted image generating unit 2001, the difference image generating unit 2104, and the large difference area detecting unit 2105. In addition, the processing order of estimation of a difference candidate area using an erroneously-corresponding feature point concentration search, estimation of a difference candidate area using template matching, and estimation of a difference candidate area using a large difference area detection may differ from the order followed in the configuration examples described heretofore.

In the present embodiment, while a difference area in a reference image need not be registered in advance in a database in a similar manner to the second to eighth embodiments, if an image pattern typically observed in the difference area is known in advance in a similar manner to the sixth to eighth embodiments, the difference area can be estimated by using the image pattern as a template image. For example, when exclusively identifying specific mail from among a plurality of mail images which show a same envelope and only differ from one another in addresses, an area where the address is described can be defined as an image pattern in which a layout of character strings representing a postal code, an address, an addressee, and the like is more or less determined. Therefore, in such cases, the present embodiment is effective. In addition, while a difference area in a reference image can be estimated according to the present embodiment regardless of whether the difference area is an entire object or a part of the object, since a highly reliable difference area can be obtained in a similar manner to the fifth, seventh, and eighth embodiments as compared to the second embodiment and the like, highly accurate identification can be achieved. Moreover, in the present embodiment, when the difference area estimating unit 25 is configured as shown in FIG. 38, an object area estimating unit can be added in front of the template matching unit 2302 and the erroneously-corresponding feature point concentration searching unit 2103. In this case, since a difference area is to be estimated from among an object area after removing the influence of a background, the configuration is particularly effective in the cases shown in FIGS. 10 and 11.

Tenth Embodiment

A tenth embodiment of the present invention will be described with reference to the drawings.

Figure 39:
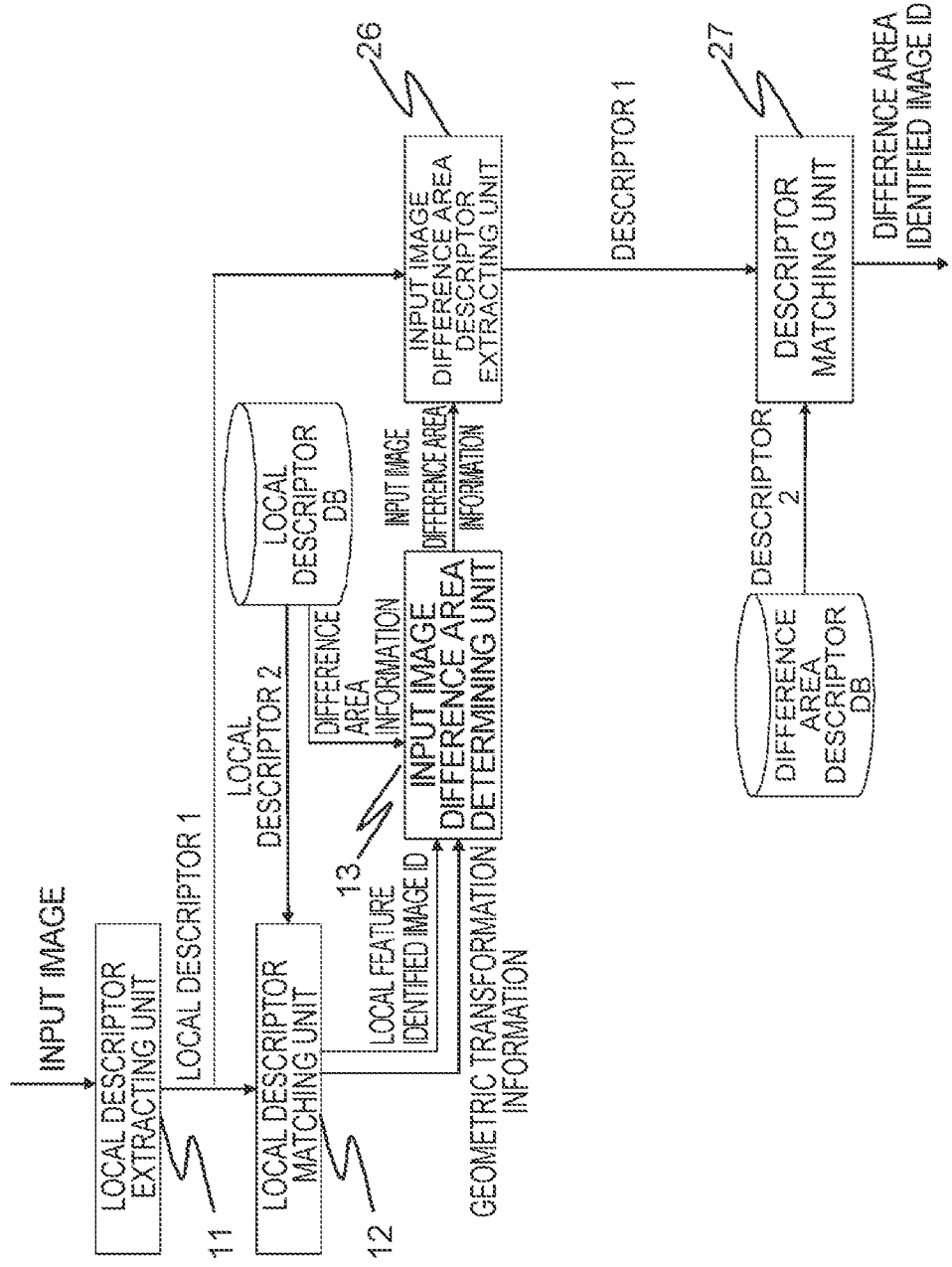
FIG. 39 is a block diagram representing a configuration example of an object identification apparatus according to a tenth embodiment.

FIG. 39 is a block diagram showing a configuration example of an object identification apparatus according to the tenth embodiment of the present invention. As shown in FIG. 39, the object identification apparatus according to the tenth embodiment includes a local descriptor extracting unit 11, a local descriptor matching unit 12, an input image difference area determining unit 13, an input image difference area descriptor extracting unit 26, and a descriptor matching unit 27.

As described above, the object identification apparatus according to the tenth embodiment differs from the object identification apparatus according to the first embodiment in that the input image difference area descriptor extracting unit 14 and the descriptor matching unit 15 have been changed to the input image difference area descriptor extracting unit 26 and the descriptor matching unit 27. Details of the input image difference area descriptor extracting unit 26 and the descriptor matching unit 27 will be described later. Since other components are similar to those of the first embodiment, the components will be denoted by same reference symbols and a detailed description thereof will be omitted.

Figure 40:
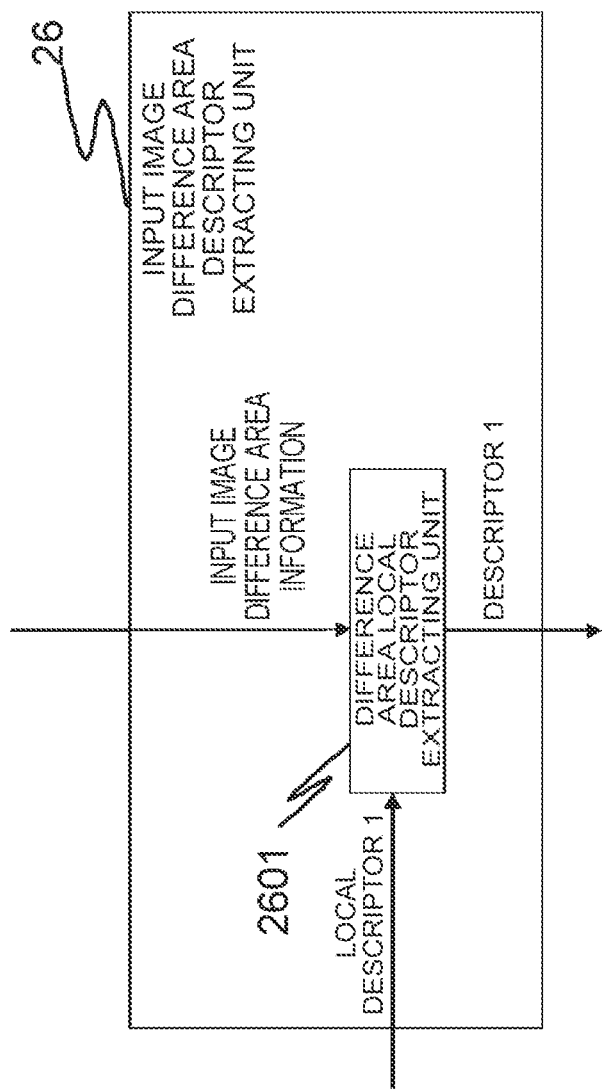
FIG. 40 is a block diagram representing a configuration example of an input image difference area descriptor extracting unit 26.

FIG. 40 is a block diagram representing a configuration example of the input image difference area descriptor extracting unit 26. As shown in FIG. 40, the input image difference area descriptor extracting unit 26 includes a difference area local descriptor extracting unit 2601.

The difference area local descriptor extracting unit 2601 receives input image difference area information outputted from the input image difference area determining unit 13 and a local descriptor 1 that is a local descriptor extracted from an input image by the local descriptor extracting unit 11, and extracts a descriptor 1 based on the received input image difference area information and the local descriptor. As the descriptor 1 extracted at this point, a feature point existing in a difference area in the input image is searched based on coordinate information of a feature point that forms a basis when describing the local descriptor 1 and a descriptor describing information in a periphery of the feature point as a local descriptor is outputted as the descriptor 1. In other words, the descriptor 1 extracted at this point is a descriptor generated by cutting out a part of the local descriptor 1. In the present embodiment, a descriptor 2 to be matched with the descriptor 1 by the descriptor matching unit 27 is a descriptor generated in a similar manner to the descriptor 1 by cutting out a part of a local descriptor 2 that is a local descriptor extracted from a reference image.

Figure 41:
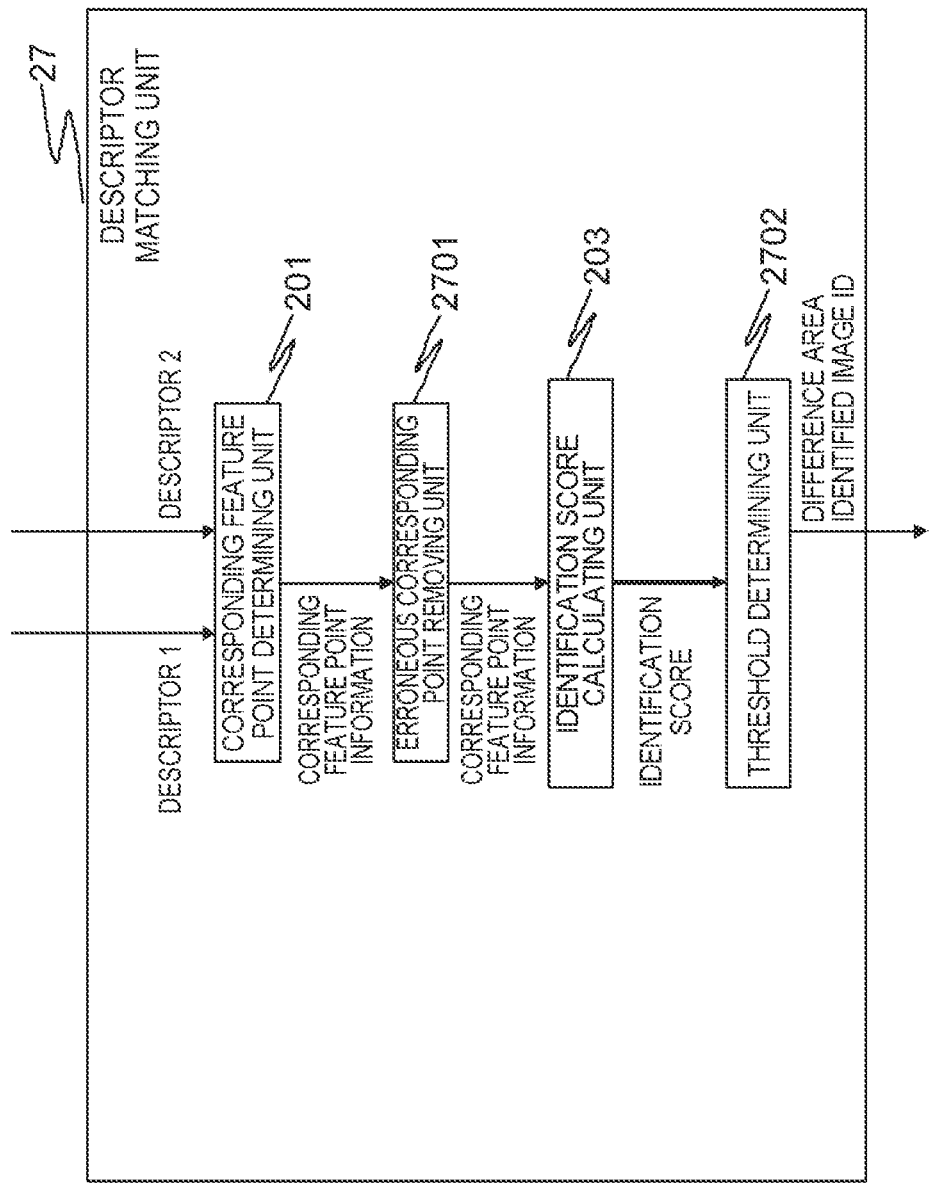
FIG. 41 is a block diagram representing a configuration example of a descriptor matching unit 27.

FIG. 41 is a block diagram representing a configuration example of the descriptor matching unit 27. As shown in FIG. 41, the descriptor matching unit 27 includes a corresponding feature point determining unit 201, an erroneous corresponding point removing unit 2701, an identification score calculating unit 203, and a threshold determining unit 2702. The corresponding feature point determining unit 201 and the identification score calculating unit 203 shown in FIG. 41 are the same as the corresponding feature point determining unit 201 and the identification score calculating unit 203 that are components of the local descriptor matching unit 12 shown in FIG. 4 and a detailed description thereof will be omitted.

The erroneous corresponding point removing unit 2701 shown in FIG. 41 is substantially the same as the erroneous corresponding point removing unit 202 that is a component of the local descriptor matching unit 12 shown in FIG. 4 but differs therefrom in that the erroneous corresponding point removing unit 2701 does not output geometric transformation information and exclusively outputs corresponding feature point information. The threshold determining unit 2702 shown in FIG. 41 is substantially the same as the threshold determining unit 204 that is a component of the local descriptor matching unit 12 shown in FIG. 4 but differs therefrom in that the threshold determining unit 2702 outputs a difference area identified image ID instead of a local feature identified image ID.

As described above, in the present embodiment, a descriptor of the input image and a descriptor of the reference image that are used in the matching by the descriptor matching unit 27 are respectively parts of a descriptor of the input image and a descriptor of the reference image that are used in the matching (determination) by the local descriptor matching unit 12.

Unlike the first to ninth embodiments, in the present embodiment, a descriptor generated by cutting out a part of a local descriptor is used to identify a difference area. Therefore, when generating a descriptor with the input image difference area descriptor extracting unit, a local descriptor extracted from an input image need only be inputted and the input image itself is not required. As a result, when an object identification apparatus is configured as a server-client system in which only extraction of a local descriptor is performed by a client and all other processes are performed by a server, according to the present embodiment, only a local descriptor that is lighter in weight than an input image need be transmitted to the server and a processing time until obtaining an identification result can be reduced. In addition, while the descriptor matching unit according to the present embodiment performs substantially the same process as the local descriptor matching unit, since the descriptor matching unit removes influence due to correspondence of feature points detected outside a difference area and a matching limited to the difference area can be performed, a difference inside an object can be distinguished more clearly and, as a result, identification with higher accuracy can be achieved as compared to conventional systems that use an entire local descriptor extracted from an entire image. Moreover, while FIG. 39 described heretofore in an orderly manner as a configuration example of the present embodiment is a configuration based on the first embodiment, a configuration respectively based on the second to ninth embodiments can be similarly adopted. In other words, a configuration can be adopted in which the local descriptor 1 is inputted instead of an input image to the input image difference area descriptor extracting unit 14 in the configuration examples according to the second to ninth embodiments.

Eleventh Embodiment

An eleventh embodiment of the present invention will be described with reference to the drawings.

Figure 42:
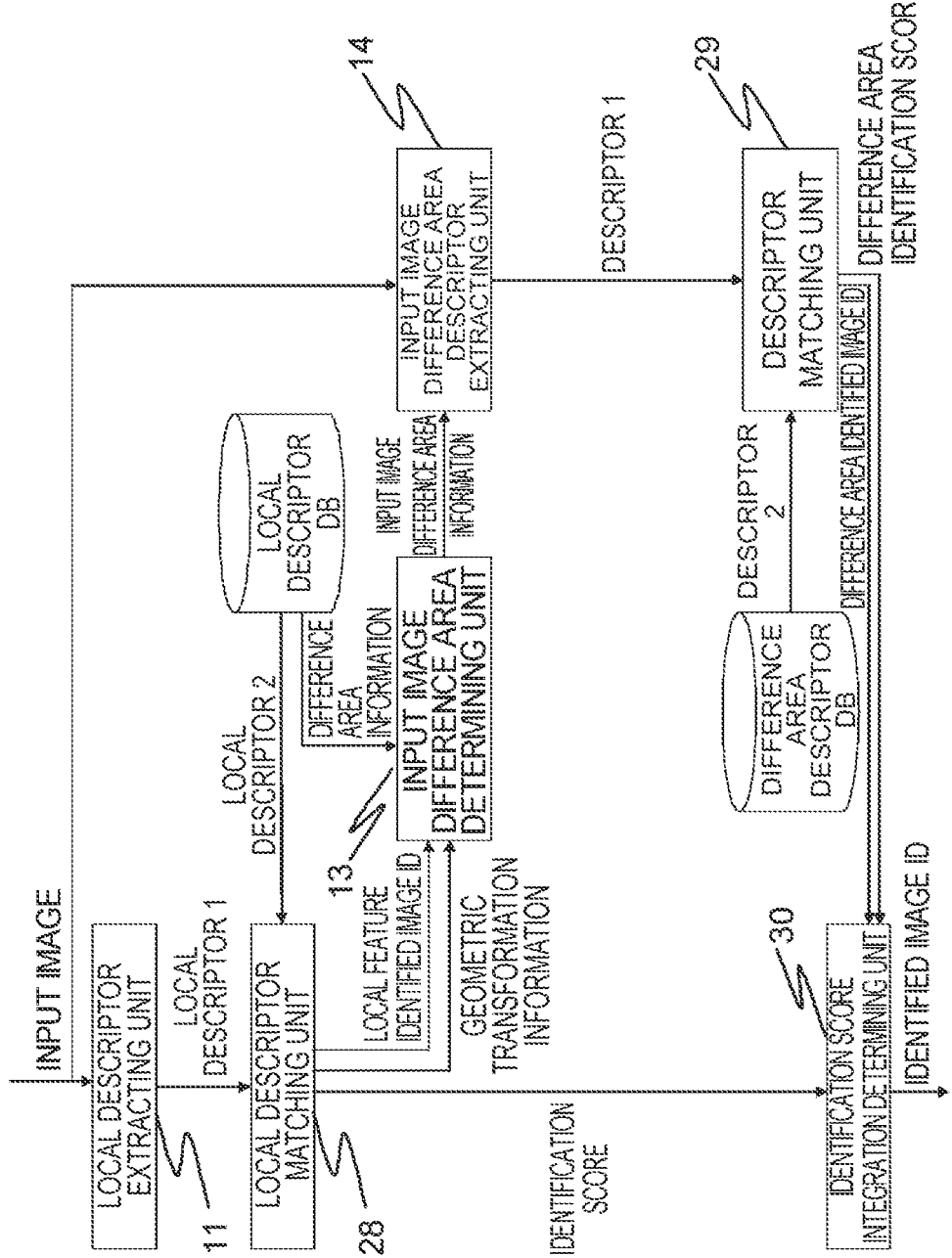
FIG. 42 is a block diagram representing a configuration example of an object identification apparatus according to an eleventh embodiment.

FIG. 42 is a block diagram showing a configuration example of an object identification apparatus according to the eleventh embodiment of the present invention. As shown in FIG. 42, the object identification apparatus according to the eleventh embodiment includes a local descriptor extracting unit 11, a local descriptor matching unit 28, an input image difference area determining unit 13, an input image difference area descriptor extracting unit 14, a descriptor matching unit 29, and an identification score integration determining unit 30.

As described above, the object identification apparatus according to the eleventh embodiment differs from the first embodiment in that the local descriptor matching unit 12 and the descriptor matching unit 15 of the object identification apparatus according to the first embodiment have been changed to the local descriptor matching unit 28 and the descriptor matching unit 29 and that the identification score integration determining unit 30 has been added as a new component. Details of the local descriptor matching unit 28, the descriptor matching unit 29, and the identification score integration determining unit 30 will be described later. Since other components are similar to those of the first embodiment, the components will be denoted by same reference symbols and a detailed description thereof will be omitted.

Figure 43:
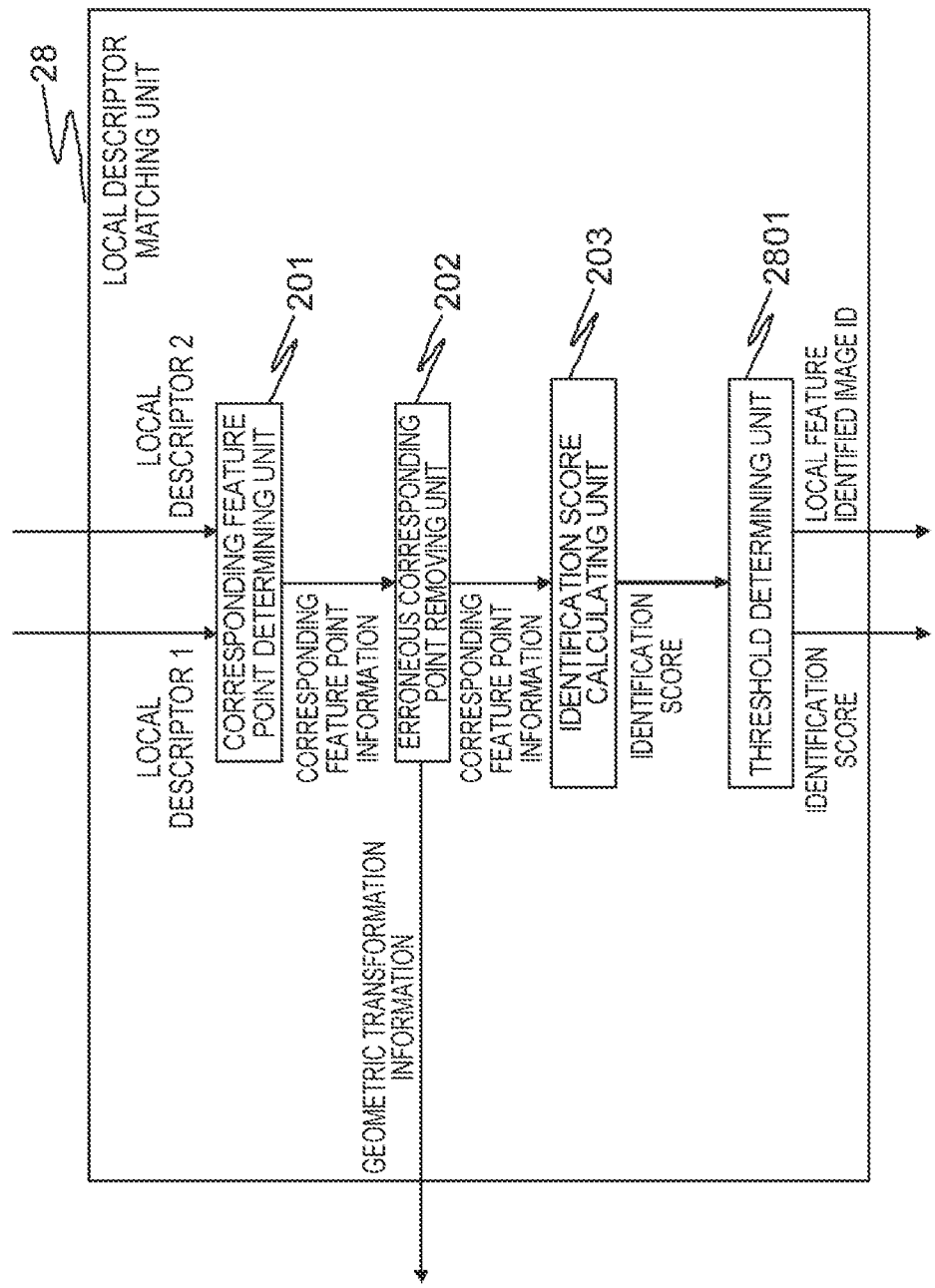
FIG. 43 is a block diagram representing a configuration example of a local descriptor matching unit 28.

FIG. 43 is a block diagram representing a configuration example of the local descriptor matching unit 28. As shown in FIG. 43, the local descriptor matching unit 28 includes a corresponding feature point determining unit 201, an erroneous corresponding point removing unit 202, an identification score calculating unit 203, and a threshold determining unit 2801.

The corresponding feature point determining unit 201, the erroneous corresponding point removing unit 202, and the identification score calculating unit 203 shown in FIG. 43 are the same as the corresponding feature point determining unit 201, the erroneous corresponding point removing unit 202, and the identification score calculating unit 203 that are components of the local descriptor matching unit 12 shown in FIG. 4 and a detailed description thereof will be omitted.

The threshold determining unit 2801 shown in FIG. 43 is substantially the same as the threshold determining unit 204 that is a component of the local descriptor matching unit 12 shown in FIG. 4 but differs in that the threshold determining unit 2801 outputs not only a local feature identified image ID but also an identification score with a local feature extracted from a reference image corresponding to the local feature identified image ID (or a reference image group associated with the local feature identified image ID). A threshold set by the threshold determining unit 2801 may be set laxer than the threshold set by the threshold determining unit 204 so that a large number of local feature identified image IDs and identification scores are outputted.

Figure 44:
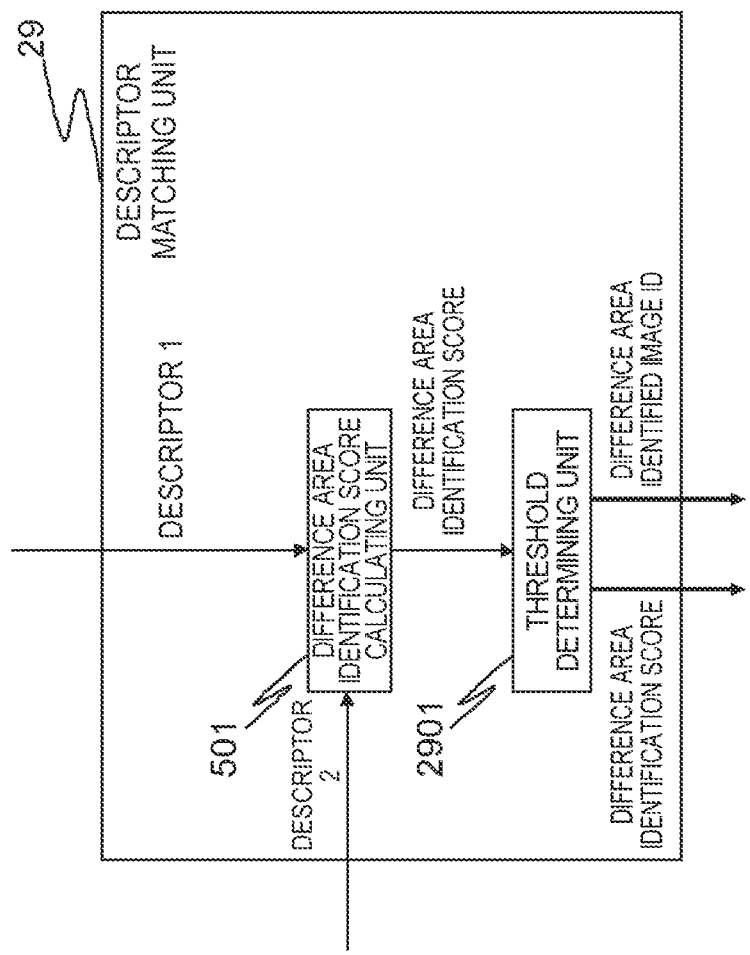
FIG. 44 is a block diagram representing a configuration example of a descriptor matching unit 29.

FIG. 44 is a block diagram representing a configuration example of the descriptor matching unit 29. As shown in FIG. 44, the descriptor matching unit 29 includes a difference area identification score calculating unit 501 and a threshold determining unit 2901. The difference area identification score calculating unit 501 shown in FIG. 44 is the same as the difference area identification score calculating unit 501 that is a component of the descriptor matching unit 15 shown in FIG. 6 and a detailed description thereof will be omitted.

The threshold determining unit 2901 shown in FIG. 44 is substantially the same as the threshold determining unit 502 that is a component of the descriptor matching unit 15 shown in FIG. 6 but differs in that the threshold determining unit 2901 outputs not only a difference area identified image ID but also a difference area identification score with a local feature extracted from a difference area of a reference image corresponding to the difference area identified image ID or a reference image group associated with the difference area identified image ID. A threshold set by the threshold determining unit 2901 may be set laxer than the threshold set by the threshold determining unit 502 so that a large number of difference area identified image IDs and difference area identification scores are outputted.

FIG. 45 is a block diagram representing a configuration example of the identification score integration determining unit 30. As shown in FIG. 45, the identification score integration determining unit 30 includes an identification score integrating unit 3001 and a threshold determining unit 3002.

The identification score integrating unit 3001 receives an identification score outputted from the local descriptor matching unit 28 and a difference area identification score outputted from the descriptor matching unit 29 and calculates and outputs an integrated score based on the received scores. At this point, for example, a product of an identification score and a difference area identification score corresponding to a same image ID may be calculated and a value thereof may be outputted as an integrated score.

The threshold determining unit 3002 shown in FIG. 45 is substantially the same as the threshold determining unit 204 that is a component of the local descriptor matching unit 12 shown in FIG. 4 or the threshold determining unit 502 that is a component of the local descriptor matching unit 15 shown in FIG. 6. The threshold determining unit 3002 differs from the threshold determining unit 204 and the threshold determining unit 502 in that the threshold determining unit 3002 compares the integrated score outputted from the identification score integrating unit 3001 with a prescribed threshold, determines that the input image and the reference image are images that share a same object as subjects when the integrated score is equal to or higher than the threshold and outputs an image ID of the input image as an identified image ID, and determines that the input image and the reference image are not images that share a same object as subjects when the integrated score is lower than the threshold. In other words, the threshold determining unit 3002 determines whether or not the input image and the reference image are images that share a same object as subjects based on a result of matching by the local descriptor matching unit 28 and a result of matching by the descriptor matching unit 29.

Unlike the first to tenth embodiments, in the present embodiment, a final identification result is not determined solely based on a difference area identification score but is determined based on a score that integrates the difference area identification score with an identification score from a local descriptor. When images showing a same object are photographed in an adverse environment (for example, a dark environment) and other similar objects are photographed in an ideal environment, if the similar objects are similar not only in texture but also in color, a correct identification cannot be performed by only using a descriptor extracted from a difference area. However, by combining with a result of an identification based on a local descriptor, an identification result with respect to a same object can be relatively improved. Moreover, while FIG. 42 described heretofore in an orderly manner as a configuration example of the present embodiment is a configuration based on the first embodiment, a configuration respectively based on the second to tenth embodiments can be similarly adopted. In other words, in the configuration examples of the second to tenth embodiments, configurations can be adopted in which an identification score is outputted from a local descriptor matching unit, a difference area identification score is outputted from a descriptor matching unit, and both the identification score and the difference area identification score are inputted to an identification score integration determining unit.

It should be noted that specific configurations of the present invention are not limited to those of the embodiments described above and that various modifications and changes made to the present invention without departing from the spirit and scope thereof are to be included in the present invention.

The present application claims priority on the basis of Japanese Patent Application No. 2012-184534 filed on Aug. 23, 2012, the entire contents of which are incorporated herein by reference.

While the present invention has been described with reference to embodiments, the present invention is not intended to be limited to the embodiments described above. Various modifications to configurations and details of the present invention will occur to those skilled in the art without departing from the scope of the present invention.

A part of or all of the embodiments above may also be described as, but not limited to, the appendices provided below.

APPENDIX 1

An object identification apparatus including:

a local descriptor matching unit for determining whether or not respective descriptors of feature points extracted from an input image and respective descriptors of feature points extracted from a reference image correctly correspond to one another;

an input image difference area descriptor extracting unit for extracting a descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly by the local descriptor matching unit is equal to or larger than a prescribed value; and a descriptor matching unit for matching the descriptor extracted by the input image difference area descriptor extracting unit with a descriptor extracted from the prescribed area of the reference image, and for outputting a matching result.

APPENDIX 2

The object identification apparatus according to Appendix 1, further including a storage unit for storing information regarding the prescribed area of the reference image.

APPENDIX 3

The object identification apparatus according to Appendix 1, wherein the prescribed area of the reference image is an area including a feature point in the reference image, to which a descriptor is determined to correspond erroneously by the local descriptor matching unit.

APPENDIX 4

The object identification apparatus according to Appendix 1, wherein the prescribed area of the reference image is an area including a feature point in the reference image, to which a descriptor is determined to correspond erroneously by the local descriptor matching unit, in an area showing an object.

APPENDIX 5

The object identification apparatus according to Appendix 1, wherein the prescribed area of the reference image includes an area in which a difference between an image obtained by performing a geometric transformation for correcting a geometric deviation between the input image and the reference image on the input image and the reference image is equal to or greater than a prescribed value.

APPENDIX 6

The object identification apparatus according to Appendix 1, wherein the prescribed area of the reference image is an area which includes a feature point, to which a descriptor is determined to correspond erroneously by the local descriptor matching unit, in an area showing an object, and which includes an area in which a difference between an image obtained by performing a geometric transformation for correcting a geometric deviation between the input image and the reference image on the input image and the reference image is equal to or greater than a prescribed value.

APPENDIX 7

The object identification apparatus according to Appendix 1, wherein the prescribed area of the reference image is an area including an area whose degree of similarity with a prescribed pattern image is equal to or greater than a prescribed value in the reference image.

APPENDIX 8

The object identification apparatus according to Appendix 1, wherein the prescribed area of the reference image is an area which includes an area, to which a descriptor is determined to correspond erroneously by the local descriptor matching unit and whose degree of similarity with a prescribed pattern image is equal to or greater than a prescribed value in the reference image.

APPENDIX 9

The object identification apparatus according to Appendix 1, wherein the prescribed area of the reference image is an area including an area in which a difference between an image obtained by performing a geometric transformation for correcting a geometric deviation between the input image and the reference image on the input image and the reference image is equal to or greater than a prescribed value and whose degree of similarity with a prescribed pattern image is equal to or greater than a prescribed value in the reference image.

APPENDIX 10

The object identification apparatus according to Appendix 1, wherein the prescribed area of the reference image is an area which includes a feature point to which a descriptor is determined to correspond erroneously by the local descriptor matching unit, and which includes an area in which a difference between an image obtained by performing a geometric transformation for correcting a geometric deviation between the input image and the reference image on the input image and the reference image is equal to or greater than a prescribed value, and moreover whose degree of similarity with a prescribed pattern image is equal to or greater than a prescribed value in the reference image.

APPENDIX 11

The object identification apparatus according to any one of Appendices 1 to 10, wherein a descriptor of the input image and a descriptor of the reference image that are used in a matching by the descriptor matching unit are respectively parts of the descriptor of the input image and the descriptor of the reference image that have been used in the determination by the local descriptor matching unit.

APPENDIX 12

The object identification apparatus according to any one of Appendices 1 to 11, further including an integration determining unit for determining whether or not the input image and the reference image are images sharing a same object as subjects based on a result of the determination by the local descriptor matching unit and a result of the matching by the descriptor matching unit.

APPENDIX 13

An object identification method including:
a local descriptor matching step of determining whether or not respective descriptors of feature points extracted from an input image and respective descriptors of feature points extracted from a reference image correctly correspond to one another;
an input image difference area descriptor extracting step of extracting a descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly in the determining step is equal to or larger than a prescribed value; and
a descriptor matching step of matching the descriptor extracted in the extracting step with a descriptor extracted from the prescribed area of the reference image, and outputting a matching result.

APPENDIX 14

A program causing a computer to function as:
a local descriptor matching unit for determining whether or not respective descriptors of feature points extracted from an input image and respective descriptors of feature points extracted from a reference image correctly correspond to one another;
an input image difference area descriptor extracting unit for extracting a descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly by the local descriptor matching unit is equal to or larger than a prescribed value; and
a descriptor matching unit for matching the descriptor extracted by the input image difference area descriptor extracting unit with a descriptor extracted from the prescribed area of the reference image, and for outputting a matching result.

With conventional object identification that only uses a local descriptor, it is difficult to accurately identify products which belong to a same brand and which only differ from each other in colors of packages or a part of characters and accurately identify mail which share a same envelope and only differ from one another in addresses. However, according to the present invention, fine differences that cannot be identified by conventional matching using only a local descriptor can now be distinguished and images showing a same object can be exclusively identified. Accordingly, the present invention can be applied to a barcode-less POS system, an article inspection system, an automatic mail sorting system, and the like.

11 local descriptor extracting unit
12 local descriptor matching unit
13 input image difference area determining unit
14 input image difference area descriptor extracting unit
15 descriptor matching unit
16 local descriptor matching unit
17 difference area estimating unit
18 difference area descriptor extracting unit
19, 20, 21, 22, 23, 24, 25 difference area estimating unit
26 input image difference area descriptor extracting unit
27 descriptor matching unit
28 local descriptor matching unit
29 descriptor matching unit
30 identification score integration determining unit
101 brightness information extracting unit
102 local feature point detecting unit
103 local descriptor generating unit
201 corresponding feature point determining unit
202 erroneous corresponding point removing unit
203 identification score calculating unit
204 threshold determining unit
401 difference area image generating unit
402 difference area descriptor calculating unit
501 difference area identification score calculating unit
502 threshold determining unit
701 erroneously-corresponding feature point concentration searching unit
801 difference area image generating unit
802 difference area descriptor calculating unit
901 object area estimating unit
902 erroneously-corresponding feature point concentration searching unit
2001 converted image generating unit
2002 difference image generating unit
2003 object area estimating unit
2004, 2101 large difference area detecting unit
2102, 2103 erroneously-corresponding feature point concentration searching unit
2104 difference image generating unit
2105 large difference area detecting unit
2106 difference candidate area overlap detecting unit
2201, 2202, 2301, 2302, 2501 template matching unit
2502 difference candidate area overlap detecting unit
2601 difference area local descriptor extracting unit
2701 erroneous corresponding point removing unit
2702, 2801, 2901, 3002 threshold determining unit
3001 identification score integrating unit

I claim:
1. An object identification apparatus comprising:
a processor; and
a memory coupled to the processor;
wherein the memory stores instructions that cause the processor to:
determine whether or not respective descriptors of feature points extracted from an input image and respective descriptors of feature points extracted from a reference image correctly correspond to one another;
extract a first descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly is equal to or larger than a prescribed value;

match the first descriptor with a second descriptor extracted from the prescribed area of the reference image; and output a matching result, wherein the first descriptor and the second descriptor are respectively parts of the descriptor of the input image and the descriptor of the reference image that have been used in the determination of whether or not the descriptors of feature points extracted from an input image and respective descriptors of feature points extracted from a reference image correctly correspond to one another.

2. The object identification apparatus according to claim 1, wherein information regarding the prescribed area of the reference image is stored.

3. The object identification apparatus according to claim 1, wherein the prescribed area of the reference image is an area including a feature point in the reference image, to which a descriptor is determined to correspond erroneously.

4. The object identification apparatus according to claim 1, wherein the prescribed area of the reference image is an area including a feature point in the reference image, to which a descriptor is determined to correspond erroneously, in an area showing an object.

5. The object identification apparatus according to claim 1, wherein the prescribed area of the reference image includes an area in which a difference between an image obtained by performing a geometric transformation for correcting a geometric deviation between the input image and the reference image on the input image and the reference image is equal to or greater than a prescribed value.

6. The object identification apparatus according to claim 1, wherein the prescribed area of the reference image is an area which includes a feature point, to which a descriptor is determined to correspond erroneously, in an area showing an object, and which includes an area in which a difference between an image obtained by performing a geometric transformation for correcting a geometric deviation between the input image and the reference image on the input image and the reference image is equal to or greater than a prescribed value.

7. The object identification apparatus according to claim 1, wherein the prescribed area of the reference image is an area including an area whose degree of similarity with a prescribed pattern image is equal to or greater than a prescribed value in the reference image.

8. An object identification method comprising:

a local descriptor matching step of determining whether or not respective descriptors of feature points extracted from an input image and respective descriptors of feature points extracted from a reference image correctly correspond to one another;

an input image difference area descriptor extracting step of extracting a descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly in the determining step is equal to or larger than a prescribed value; and a descriptor matching step of matching the descriptor extracted in the extracting step with a descriptor extracted from the prescribed area of the reference image, and outputting a matching result, wherein a descriptor of the input image and a descriptor of the reference image that are used in a matching in the descriptor matching step are respectively parts of the descriptor of the input image and the descriptor of the reference image that have been used in the determination in the local descriptor matching step.

9. A non-transitory computer-readable medium that stores a program causing a computer to:

determine whether or not respective descriptors of feature points extracted from an input image and respective descriptors of feature points extracted from a reference image correctly correspond to one another;

extract a first descriptor of an area in the input image corresponding to a position of an image area obtained by performing a geometric transformation for correcting a geometric deviation between the input image and the reference image on a prescribed area of the reference image when a score based on the number of combinations of descriptors determined to correspond correctly is equal to or larger than a prescribed value;

match the first descriptor with a second descriptor extracted from the prescribed area of the reference image; and output a matching result, wherein the first descriptor and the second descriptor are respectively parts of the descriptor of the input image and the descriptor of the reference image that have been used in the determination of whether or not the descriptors of feature points extracted from an input image and respective descriptors of feature points extracted from a reference image correctly correspond to one another.

* * * * *